US005684940A

United States Patent [19]

Freeman et al.

[11] Patent Number: 5,684,940

[45] Date of Patent: Nov. 4, 1997

[54] COMPUTER-IMPLEMENTED METHOD AND APPARATUS FOR AUTOMATICALLY LABELING AREA REGIONS OF MAPS USING TWO-STEP LABEL PLACING PROCEDURE AND FOR CURVED LABELING OF POINT FEATURES

[75] Inventors: Herbert Freeman, Cranbury; Aruna Vedula, Tinton Falls, both of N.J.

[73] Assignee: Rutgers, The States University of New Jersey, New Brunswick, N.J.

[21] Appl. No.: 404,185

[22] Filed: Mar. 13, 1995

[51] Int. Cl.[6] ..................................................... G06T 3/00
[52] U.S. Cl. ........................... 395/138; 395/161; 364/432; 364/443
[58] Field of Search ..................................... 395/138, 161, 395/136; 364/420, 432, 443; 340/990, 991, 992, 995

[56] References Cited

U.S. PATENT DOCUMENTS

| 5,355,314 | 10/1994 | Feigenbaum | 364/420 |
|---|---|---|---|
| 5,420,968 | 5/1995 | Johri | 395/133 |
| 5,428,733 | 6/1995 | Carr | 395/159 |

OTHER PUBLICATIONS

"Label Conflict Detection and Resolution", Enclosure in Jan. 17, 1995 letter mailed to H. Freeman.
"Automatic Labeling of Area Features in Soil Survey Maps", paper Abstract #20, 9th Annual GRASS/GIS Conference and Exhibition, Mar. 14–18, 1994.
"Automatic Labeling of Area Features in Soil Survey Maps", in Freeman, M. Pandya and A. Vedula, submitted for the Mar. 16, 1994, Reston, VA Conference.
"On The Automatic Labeling of Maps", H. Freeman, Submitted for the Oct. 4–6, 1994 conference in Israel.
"Cartographic Name Placement", CAIP Update. Apr. 20, 1994, p. 2.

"Generating Skeletons and Centerlines from the Distance Transform", Niblack, Gibbons and Capson, CVGIP: Graphical Models and Image Processing, vol. 54, No. 5, Sep. 1992, pp. 420–437.
"Reconsidering Rules for Point–Feature Name Placement", Wu and Buttenfield, Cartographica, vol. 28, No. 1, 1991, pp. 10–27.
"On the Problem of Placing Names in a Geographic Map", Freeman and Ahn, International Jounral of Pattern Recognition and Artificial Intelligence, vol. 1, 1987, pp. 121–140.
"An Algorith for Locating Candidate Labeling Boxes Within A Polygon," van Roessel, The American Cartographer, vol. 16, No. 3, 1989, pp. 201–209.
"Expert Systems and the Map Label Placement Problem", Zoraster, Cartographica, vol. 28, No. 1, 1991, pp. 1–9.

(List continued on next page.)

Primary Examiner—Heather R. Herndon
Assistant Examiner—Stephen Hong
Attorney, Agent, or Firm—Lerner, David, Littenberg, Krumholz & Mentlik

[57] ABSTRACT

A computer-implemented method and apparatus for automatically labeling maps in accordance with predefined label criteria provides automated labeling of any number of different types of maps with point, line and region features. For automatically labeling area regions, a two step process is used where, in the first step, one or more approximate label positions for each region are selected based in part on the skeleton graph of the region. Once the approximate label positions are selected, a second final label placement step is implemented in which test locations in the neighborhood surrounding each of the approximate label positions are searched to see if the label can be placed without overlapping other labels or other features within the area. If so, the labels are placed at the selected test location without regard to the contour of the region's skeleton. A method and apparatus for curved and angled point feature labeling are also provided.

12 Claims, 37 Drawing Sheets

OTHER PUBLICATIONS

"An Expert System for the Automatic Placement of Names on a Geographic Map", H. Freeman, Information Sciences, vol. 45, 1988, pp. 367–378.

"Autonap—An Expert System for Automatic Map Name Placement", H. Freeman, J. Ahn, International Symposium on Spatial Data Handling, Aug. 1984, pp. 20–24.

"A System for Automatic Name Placement", Freeman, Ahn, Proc. 4th Jerusalem Conference on Information Technology, Jerusalem, Israel, May, 1984, pp. 20–25.

"The Automatic Labeling of Georgraphic Maps—A Problem in Computer Aesthetics", Freeman, Proc. Graphics Interface '85, Montreal, Quebec, Canada, May, 1985, pp. 27–31.

"The Logic of Automated Map Lettering", Yoeli, Tel–Aviv University, Israel, pp. 99–108, Jan. 1986.

"Labeling Point Features on Maps and Diagrams Using Simulated Annealing", Christensen, Marks and Shieber, Harvard University Center for Research in Computing Technology, Jan., 1992, pp. 1–11.

"A Rule–Based System for Dense–Map Name Placement", Doerschler and Freeman, Communications of the ACM, vol. 35, No. 1, Jan., 1992, pp. 68–79.

"Automatic Name Placement of Canadian Census Map", Lee, a Thesis submitted to the Graduate School–New Brunswick, Rutgers, New Brunswick, New Jersey, Sep. 1986, pp. ii–iv, 1–44.

"Automated Cartographic Name Placement for High–Density Point Features", Abbasi, Computer Engineering, Thesis submitted to the Department of Electrical and Computer Engineering, Rutgers University, Jan. 4, 1995, pp. ii–vii, 1–41.

"Automated Name Placement on Soil–Survey Maps", Pandva, Computer Engineering, Thesis submitted to the Department of Electrical and Computer Engineering, Rutgers University, Jul. 19, 1994, pp. ii–v, 1–38.

"Automatic Positioning of Area–Feature Names on Special–Purpose Maps", Vedula, Computer Engineering, Thesis submitted to the Department of Electrical and Computer Engineering, Rutgers University, Apr. 12, 1994, pp. ii–xi, 1–71.

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 0  | 0 | 0 | 0 | 0 | 0 | 0 | 0 | 0 | 0 | 0 | 0  | 0  | 0  | 0  |
| 1  | 0 | 0 | 0 | 0 | 0 | 0 | 0 | 0 | 1 | 1 | 1  | 1  | 1  | 0  |
| 2  | 0 | 0 | 0 | 0 | 0 | 0 | 0 | 1 | 1 | 1 | 1  | 1  | 1  | 0  |
| 3  | 0 | 0 | 0 | 0 | 0 | 0 | 1 | 1 | 1 | 1 | 1  | 1  | 1  | 0  |
| 4  | 0 | 0 | 0 | 0 | 0 | 0 | 1 | 1 | 1 | 1 | *  | 1  | 1  | 0  |
| 5  | 0 | 0 | 0 | 0 | 0 | 1 | 1 | 1 | 1 | * | 1  | 1  | 1  | 0  |
| 6  | 0 | 1 | 1 | 1 | 1 | 1 | 1 | 1 | 1 | * | 1  | 1  | 1  | 0  |
| 7  | 0 | 1 | 1 | 1 | 1 | 1 | 1 | 1 | * | * | 1  | 1  | 1  | 0  |
| 8  | 0 | 1 | 1 | * | * | * | * | 1 | 1 | * | 1  | 1  | 1  | 0  |
| 9  | 0 | 1 | 1 | 1 | 1 | 1 | 1 | 1 | 1 | 1 | 1  | 1  | 1  | 0  |
| 10 | 0 | 1 | 1 | 1 | 1 | 1 | 1 | 1 | 1 | 1 | 1  | 1  | 1  | 0  |
| 11 | 0 | 1 | 1 | 1 | 1 | 1 | 0 | 0 | 1 | 1 | 1  | 1  | 1  | 0  |
| 12 | 0 | 0 | 0 | 0 | 0 | 0 | 0 | 0 | 0 | 1 | 1  | 1  | 0  | 0  |
| 13 | 0 | 0 | 0 | 0 | 0 | 0 | 0 | 0 | 0 | 0 | 0  | 0  | 0  | 0  |

―80

```
------1221-----
-----12321-----
-----12321-----
----123321-----
----121.121----
----121.121----
---1221.1221---
---1221.12321--
---1221.12321--
---1221.12321--
--123321.12321-
--123321.12321-
--123321.12321-
-1234321.12321-
-1234321.12321-
```

271

COMPUTER-IMPLEMENTED METHOD AND APPARATUS FOR AUTOMATICALLY LABELING AREA REGIONS OF MAPS USING TWO-STEP LABEL PLACING PROCEDURE AND FOR CURVED LABELING OF POINT FEATURES

FIELD OF THE INVENTION

The present invention relates to a computer-implemented method and apparatus for automatically labeling maps in accordance with predefined label criteria. Although the method and apparatus of the present invention can be used for automated labeling of any number of different types of maps with point, line and region features, the method and apparatus are particularly useful for automatically labeling regions of soil maps in order to meet specific soil map labeling guidelines set forth by the U.S. Department of Agriculture. A method and apparatus for curved and angled point feature labeling are also provided by the present invention.

A portion of the disclosure of the patent document contains material which is subject to copyright protection. The copyright owner has no objection to the facsimile reproduction by anyone of the patent disclosure, as it appears in the Patent and Trademark Office patent file or records, but otherwise reserves all rights whatsoever.

BACKGROUND OF THE INVENTION

A map is a medium of communication that uses graphics and text labels to convey spatial relationships among point, line, and area features to its reader. Area features are distinct spatial regions with either explicitly shown or clearly implied boundaries. Countries, states, lakes, oceans, soil regions on a soil map and continents are some examples. Line features, as the name suggests, are features that, at the selected map scale, must be shown by extended lines or curves. Rivers, canals, highways, railroads, and streets tend to fall into this category. Point features are spatial entities that, at the scale of map, are so small that they can only be represented by a point symbol. Examples of point features include cities, towns, mountain peaks, historic sites, parks and villages. The map symbol for a point feature may be a dot or circle, (for cities, towns, and villages), a tree (for parks), or a small square with grid lines for historic sites or buildings.

A map's usefulness is measured by the ease and reliability with which it communicates information about spatial relationships, and this is much influenced by the quality of the graphics and text. A map is said to serve its purpose well if there is no ambiguity between the point, line, and area features and their corresponding text labels. Therefore, the label associated with each feature should be placed so as to create a prominent and unambiguous relation between the two. The label of an area feature is typically spread out over the area so that it reflects the size, shape and extent of the area. For a line feature the name may be placed intermittently at a number of locations along the length of the feature. For a point feature the name should be placed near the point to create an unambiguous association with it. The size of a point feature's symbol depends on the kind of place the feature represents. For example, the symbol used to represent an important city will typically be of a larger size than that used for a small town. Normally, this will also apply to the size of its associated name; i.e., the name of a city will be written in a larger font than that of a town.

The process of map making can be divided into two parts, including (a) generation of the graphics and (b) labeling of the map features. As a result of the extensive developments in the field of computer graphics during the past two decades, map generation today is in a highly sophisticated state. However, this is not true of map-feature labeling. To this day, virtually all labeling of maps is done manually, either literally by manual scribing or paste-up, or through the use of interactive software on a computer workstation. Annotating maps with labels of features is a time-consuming, painstaking task, and an art which has been developed over hundreds of years by cartographers. Cartographers have derived a set of rules for labeling maps which combine considerations of aesthetics as well as legibility. For automatic labeling to be effective, however, it must be able to emulate the judgment of an expert cartographer. In particular, labels should be placed so as to achieve an unambiguous association between the label and the feature to which it refers, avoid overlap with other labels and map features, facilitate easy comprehension, and conform to the applicable standards and conventions.

There exists an extensive body of computer algorithms for generating a map's graphics, but not for labeling maps, which is considered to be an unusually difficult problem. For instance, the labeling of regions requires that the computer have an "understanding" of the shape, size, and extent of the regions. A label should be placed well within the confines of the region, it should be easily perceived as the label for that region, it generally should not overlap other labels or features, and it should strive to obey the cartographic conventions that are applicable to the particular kind of map. There is a great need for a system that is able to achieve automatic, computerized label placement and do so with a performance that approaches that of an expert cartographer.

The problem of automatic cartographic label placement has been addressed in the past. Freeman and Ahn, in "A program for automatic name placement," Proc. AUTO-CARTO V1, Ottawa, October 1983 and "AUTONAP—an expert system for automatic name placement," *Proc. Int'l Symposium on Spatial Data Handling*, Zurich, Aug. 20–24, 1984, and later, Doerschler and Freeman, in "A rule-based system for dense-map name placement," *Communications of the ACM*, 35(1) January 1992, developed complete label placement systems for general maps such as road maps or those found in atlases. Both systems labeled point features, such as cities and towns; line features, such as roads or rivers; and area features, such as counties or states. Some of the rules implemented by these system included stretching the label in an area feature to span the feature and curving the label to conform to the shape of the region. The font size for a label was assigned depending on the characteristics of the feature being labeled and spaces were added between characters in a label when required. Also, the aesthetics of placement was considered. The rules implemented in these systems, however, are not applicable to all types of maps. There are many classes of maps and every class of maps has its own particular set of criteria for labeling.

One prior labeling approach was described by van Roessel in "An algorithm for locating candidate labeling boxes within a polygon," *American Cartographer*, 16(3), 1989. This approach uses essentially a vector-based approach, where a polygon is divided into horizontal strips which are used to find places where the labels will fit, and is designed for multiline labels. There are disadvantages, however, to using van Roessel's technique for labeling soil regions. First, large regions could potentially require that a great many strips be generated and searched. Second, van Roessel does not consider angled placement, which is common in soil maps. Van Roessel also does not consider the case where a label cannot fit inside a region and must be placed outside with a "leader" pointing into the region. Van Roessel's technique basically finds all the places where a label can fit and then chooses one or more among them. This approach is useful for large multiline labels which may have few options for being placed inside a region, but it is unsuitable for small soil symbols used for soil maps. In soil regions, especially large ones, it might be possible to find an enormous number of places to fit a label. For these reasons, a different approach is greatly needed and is provided by the present invention.

There is a great need to solve the automated label placement problem for particular kinds of maps such as the soil survey maps produced by the U.S. Department of Agriculture. These maps have highly specialized properties and requirements, which make automatic label placement especially challenging. With these maps, the regions can vary in size from tiny to very large, they tend to be of extremely complex shape, large regions must have multiple label placements, and for regions too small to accommodate a label, the label must be leadered-in from a neighboring region.

The problem of overlapping labels must also be addressed. An area feature normally has the least freedom for name placement because its name tends to be spread out, and, hence, typically needs to have its name placed first. A point feature has somewhat more freedom for name placement than an area feature; the name should be close enough to relate to the point but far enough so as not to overlap with the point. However, if the feature density of a map is high, it becomes increasingly difficult to create one-to-one correspondences between the names of point features and their respective points without overlapping a name or a point feature. A line feature has the most freedom for name placement; its name can be written at different places along the length of it. If there is too much congestion in one spot, the name can be placed above or below the congested area as long as it is written along the flow of the line feature.

For point-feature name placement, the most important factor is clear identification with its associated point. Each name must stand out to correspond to its point. In the past, efforts towards automating point-feature name placement have generally been directed towards horizontal name placement; i.e., the name for a point feature is placed horizontally or parallel to latitude lines, on the left, right, above or below a point. In a high feature-density map, however, it is oftentimes difficult to place the names of all point features. As a result, such point features are either deleted from the map or these maps are manually edited to fit the name. Thus, there is a long-felt need for automatic angled and curved point-feature name placement to allow names to be placed either horizontally, at angle or along a selected curvature. Thus, if there is insufficient space near a point feature to place its name horizontally, the name should be automatically curved to permit placement at a position that might not be otherwise possible. Also, in a map with high point-feature density where points are extremely close to each other, the names placed for the points might not seem to represent them, creating potential ambiguity between points and their names. Curving a name provides an additional capability for eliminating ambiguity.

SUMMARY OF THE INVENTION

The present invention provides a computer-implemented method of automatically labeling a map in accordance with predefined label positioning and placement criteria. The map includes a plurality of features to be labeled with corresponding labels in accordance with the label positioning and placement criteria. The method includes the steps of (a) entering into the computer (i) map data including feature data for the features to be labeled and (ii) label data including the corresponding label for each of the features; (b) performing an approximate label positioning step for each of the features by analyzing the input data with the computer to determine at least one approximate label position for each of the features satisfying the label positioning criteria; and (c) performing a final label placement step for each determined approximate label position by (i) selecting at least one label test location in the vicinity of the approximate label position, (ii) testing whether the selected label test location satisfies the label placement criteria, selecting the label test location as the final label position if the label placement criteria are satisfied, and (iii) repeating the selecting and testing steps with a different label test location until the label placement criteria are satisfied, if possible.

Preferably, the testing step above includes the step of creating a primary placement window centered about the recommended label position, the test locations being disposed within the primary placement window, and the step of testing the label test locations is conducted in an outwardly spiraling fashion within the primary placement window beginning from the recommended label position. More preferably, the method includes the step of determining one or more possible angular label orientations for each said label in accordance with the label placement criteria and repeating the testing step in a predetermined order with one or more of the angular label orientations at different label test locations until the label placement criteria are satisfied, if possible.

The method also preferably includes a step of generating output data containing the final label positions. The output data is preferably inputted into a map plotting program where each label is plotted on the map at its corresponding final label position.

The present invention also provides for labeling region features encompassing points within the region and bounded by region boundary points. Preferably, an approximate label positioning step is performed for each region by: (a) computing a distance transform for the region by incorporating for the points within the region a height which is a measure of the distance from a given point to the nearest region boundary point; (b) computing a skeleton for the region comprising one or more points within the region which are midway between opposing boundary points of the region; (c) combining the distance transform and skeleton to generate a skeleton graph having a set of vertices between each pair of mutually adjacent vertices and edges defining one or more paths, each of the paths consisting of one or more edges and having a corresponding path length; (d) computing a shortest path for each pair of vertices, the shortest path being a sequence of edges connecting vertices such that the path length of the shortest path is less than the path length of any other possible paths between the vertices; (e) determining a total weight of each shortest path from the path length and height of the points along the selected shortest path and choosing a best path corresponding to the shortest path with the largest total weight; (f) computing at least one unweighted location on the best path based only path length; (g) testing one or more of the points included in the best path and determining a suitability value for each tested point to provide a measure of how desirable the point is for placing the label; and (h) selecting a weighted location corresponding to each unweighted location selected on the basis of the suitability value as well as proximity to previously placed labels so as to satisfy the label positioning criteria. Preferably, the suitability value is a function of distance from the desired label position to such point and a function of height of such point, wherein height is a measure of the distance from such point to the nearest region boundary point.

The unweighted positions for each region are preferably determined by the steps of: (a) calculating the number of labels required for the region; Co) calculating a separation distance $u_{sep}$ between the labels, (c) calculating the displacement $u_{disp}$ of the first and last labels from the beginning and end of the path, and (d) choosing the unweighted positions in accordance with the formula: $u_j=u_{disp}+j*u_{sep}$, wherein $u_j$ is the distance of the unweighted location j from the beginning of the path.

In another preferred embodiment of the present invention, a method of placing a label on a map is provided including the steps of: (a) providing map data defining at least one region encompassing a plurality of points within the region and bounded by region boundary points; (b) providing data defining one or more desired label positions within the region; (c) selecting a best label position corresponding to each desired label position by calculating a suitability value for one or more of the points within the region adjacent to the desired label position so that the suitability value is a function of distance from the desired label position to such point and a function of height of such point; and (d) placing the label at a recommended label location at the best label position on the map.

In yet another preferred method of placing a label on a map which include a plurality of features to be labeled with a corresponding label in accordance with label placement criteria, the method includes the steps of: (a) providing at least one approximate label position for each of the features; (b) selecting at least one label test location in the vicinity of the approximate label position; (c) testing whether the selected label test location satisfies the label placement criteria, selecting the label test location as the final label position if the label placement criteria are satisfied; (d) repeating the selecting and testing steps with a different label test location until the label placement criteria are satisfied if possible; and (e) placing the label on the map at a selected final label position.

Preferably, the testing step includes the step of creating a primary placement window centered about the recommended label position, with the test locations being disposed within the primary placement window. More preferably, the testing of the label test locations is conducted in an outwardly spiraling fashion within the primary placement window beginning from the recommended label position.

In an even more preferred embodiment of the present invention, a step of leadered placement of labels is provided for labels which cannot be placed entirely within a primary region. The leadered placement method includes: (a) creating an enlarged placement window centered about the recommended label position extending outside the primary placement window and encompassing at least a part of one region bordering the primary region; (b) performing the testing step at locations outside the primary region but within the enlarged placement window to determine the final label position; and (c) placing a leader extending from the final label position to the primary region to which the label refers.

Point feature labeling is also provided by the present invention, through a computer-implemented method of automatically labeling point features on map in accordance with predefined point feature labeling criteria, the map including a plurality of point features to be labeled with corresponding point feature names in accordance with the criteria. The method includes the steps of: (a) entering into the computer (i) map data including point feature data for the point features to be labeled and (ii) label data including the corresponding point feature name for each of the point features, the point feature name comprising one or more characters; (b) performing a horizontal placement step for each point feature to first determine whether the corresponding name can be placed in a horizontal position near the point feature; (c) performing a curved placement step if the point feature name cannot be placed in accordance with the horizontal placement step. The curved placement step including the steps of (i) selecting a rectangular region for each character of the name, each rectangular region surrounding each such character and having a length and width, (ii) calculating a total length of the point feature name corresponding to a sum of the widths of the selected rectangular regions, and selecting an angle of curvature in accordance with the point feature labeling criteria, (iii) determining a radius of curvature by dividing the width by the angle of curvature, and (iv) performing a character placement step for each character of the point feature name by rotating each rectangular region individually to fit along the radius of curvature. The method further includes the steps of (d) testing whether the selected test location satisfies the criteria; and (e) selecting the test location as a final point feature name position if the criteria are satisfied, repeating the testing and selecting steps with a different test location until the label placement criteria are satisfied if possible.

Preferably, the method also includes a step of creating at least two intersecting placement regions to contain the curved name and selecting a name placement test location to place the curved name on the map. More preferably, a first placement region is provided and extends from a first character of the name to a central character of the name, and a second placement region is likewise provided and extends from said the central character to a last character in the name. At least one different angle of curvature is preferably selected for names which cannot be placed to satisfy the criteria and the curved placement step is repeated to attempt to select the final name position which satisfies the criteria.

More preferably, the step of character placement includes the steps of: (a) calculating a step angle by dividing the length of rectangular region by the radius of curvature; (b) determining a rotation angle for rotating the rectangular region by adding the step angle to an accumulated sum of step angles corresponding to the rectangular regions previously determined for the characters of the point feature name; (c) placing the rectangular region of a first character of the point feature name at a distance equal to the radius from a chosen center of rotation; and (d) rotating the rectangular region for each subsequent character of the point feature name by the rotation angle and placing the rotated rectangular region for each subsequent character at a distance equal to the radius from the chosen center of rotation and adjacent to the previously-placed rectangular region. Preferably, the rotated rectangular region is placed to the right of the lower right coordinates of a previously-placed rectangular region.

The present invention also provides a computer system for automatically labeling a map in accordance with predefined label positioning and placement criteria including (a) input means for inputting map data including location data for the locations to be labeled and label data including the corresponding label for each of the locations; (b) first memory means for storing the map data and the location data; (c) processor means responsive to a control program for generating digital signals corresponding to approximate label positions for each of the locations satisfying the label positioning criteria and digital signals denoting final label positions for each of the locations satisfying the label placement criteria. The processor means is adapted to analyze the map and location data to determine the approximate label positions for each of the locations; select at least one label test location in the vicinity of the approximate label position and test whether it satisfies the label placement criteria; generate the digital signals corresponding to the final label position if the label placement criteria are satisfied; and repeat selecting and testing the approximate label positions with a different label test location until the label placement criteria are satisfied if possible; and (d) second memory means for storing the digital signals corresponding to the final label position of each label.

Preferably, the computer system further includes display means for displaying a graphic image of the map data together with a graphic image generated from the digital signals corresponding to the final label positions of each said label.

In accordance with another preferred embodiment, a computer system for automatically labeling point features on map in accordance with predefined point feature labeling is provided. The system includes: (a) input means for inputting map data including point feature data for the point features to be labeled and label data including the corresponding name for each of the point features, the name comprising one or more characters; (b) first memory means for storing the map and label data; (c) processor means responsive to a control program for generating digital signals denoting final name positions for each of the point features satisfying the criteria, the processor means being adapted to first determine whether the corresponding name can be placed in a horizontal position about the point feature, and if said name cannot be so placed, to next select a rectangular region for each character of the name, each the rectangular region surrounding each such character and having a length and width, calculate a total length of the name corresponding to a sum of the widths of the selected rectangular regions and selecting an angle of curvature in accordance with the point feature labeling criteria, determine a radius of curvature by dividing the width by the angle of curvature, place each character of the name by rotating each rectangular region individually to fit along the radius of curvature, test whether the selected test location satisfies the criteria, select the test location as a final name position if the criteria are satisfied, and repeat the testing and selecting with a different test location until the label placement criteria are satisfied if possible; and (d) second memory means for storing the digital signals corresponding to the final name positions of each label.

Preferably, the system further includes display means for displaying a graphic image of the map data together with a graphic image generated form the digital signals corresponding to the final name positions of each label.

The object, features and advantages of the present invention will be more readily apparent from the detailed description of preferred embodiments set forth below, taken in conjunction with the accompanying drawings.

DETAILED DESCRIPTION OF PREFERRED EMBODIMENTS

To solve the problem of automatic label placement for soil survey maps, it is possible to divide the process into two distinct tasks of label positioning and label placement. Name positioning determines how many labels are required for a particular region and makes a general recommendation as to where they should appear. Name placement examines each recommended location and makes the necessary fine determinations to place a label so as to avoid conflict with other features or labels, and, if interior placement is not possible, to lead the label in from a neighboring region.

Figure 1:
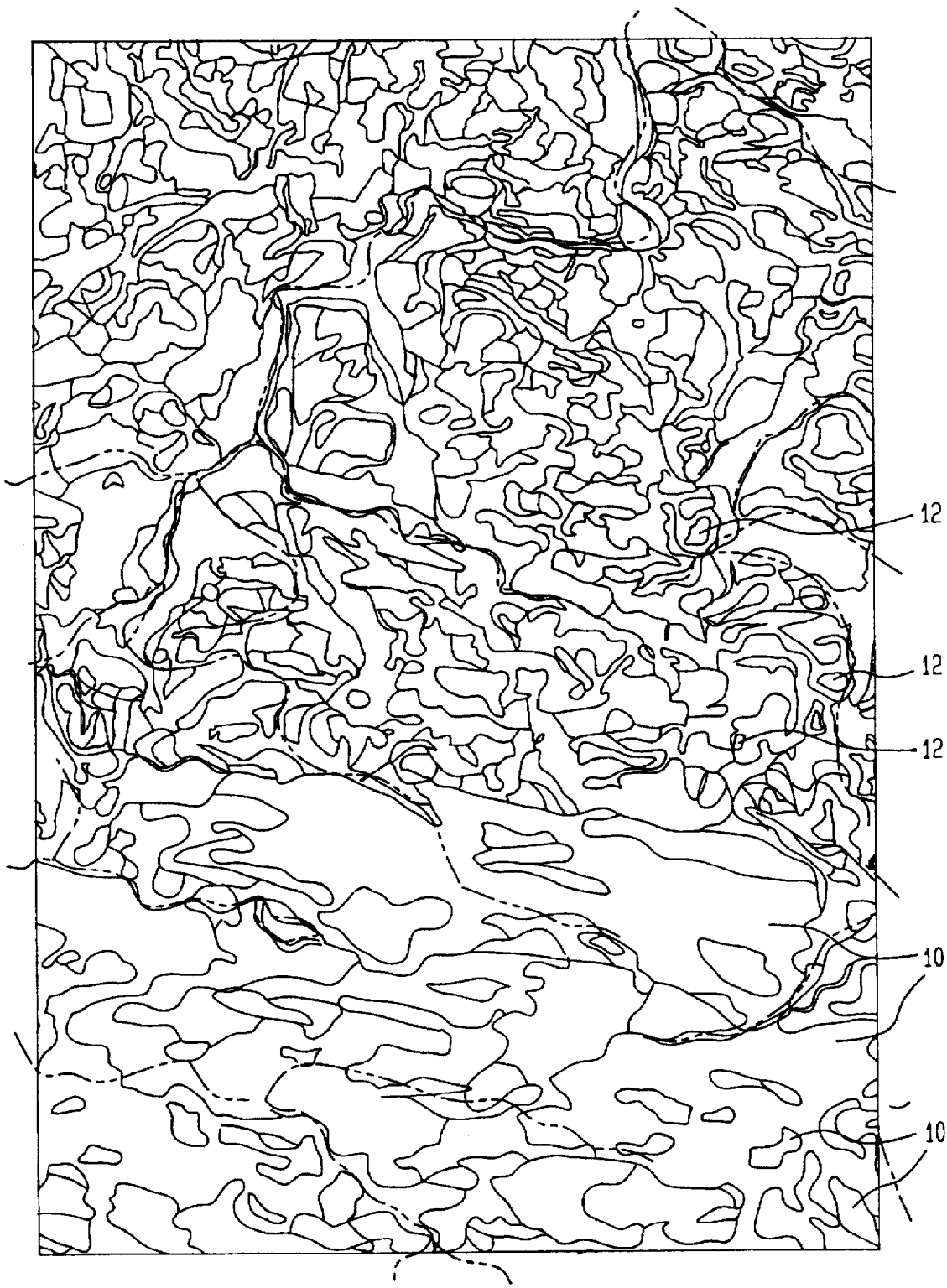
FIG. 1 shows an example of an unlabeled soil survey map.

A most useful application of the present invention relates to labeling soil survey maps produced by the Soil Conservation Service of the U.S. Department of Agriculture for every county in the U.S. These maps show, in the form of labeled polygons, the type of terrain and usage for every piece of land in the country. Soil survey maps are produced to very rigid specifications and differ from more conventional geographic maps in that the regions to be labeled may vary from tiny to extremely large, that the regions may be of extremely complex and multiply-connected shape, and that, depending on a region's size, its label may have to be assigned a multiple number of times. FIG. 1 shows the unlabeled regions 10 and 12 of a representative soil survey map.

The task of automatically labeling soil survey maps in accordance with the present invention consists of two distinct sub-tasks: label positioning and label placement. Label positioning, described above, is concerned with broadly determining how many labels are to be placed and how these should be distributed over a particular soil region. Label placement, in turn, is concerned with the precise determination of the location and orientation for each label, with due care to avoid overlap with a region boundary, with any hydrographic features, and with other labels that may appear in the region. Further, if there is insufficient space to place a label at the recommended general location within the region, the label placement procedure must attempt to find space in a neighboring region and use a "leader" to relate it to its associated region. Label placement in accordance with the present invention achieves fine adjustment of the recommended or approximate label position including translation and rotation to avoid obstacles such as hydrographic features, other labels and region boundaries. Preferably, if the label cannot be placed internally within a region then it is placed in the neighboring region and leadered to refer to the primary region.

Generally, each map has its own set of rules for label placement. The label placement criteria for soil maps must adhere to the rules specified in the soil map finishing guidelines. Regions may vary in size from very small to so large that they cover a major fraction of the entire map. Their shape may be very simple or highly complex. Shape-analysis tools like the skeleton and the distance transform are used to obtain an understanding of the shape of a region. Using the skeleton and distance, the initial recommended or approximate locations of a region's labels are first determined. For actual label placement, one then uses these recommended positions to begin a systematic search for label locations, and orientations where necessary, that satisfy the particular criteria as described below.

Figure 1A:
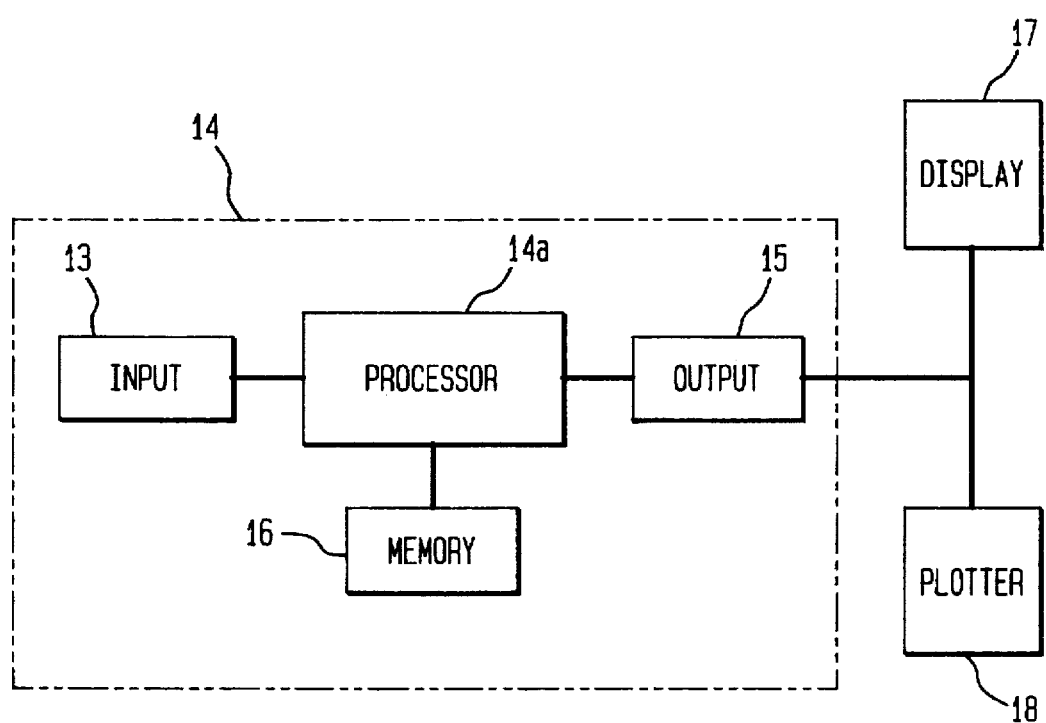
FIG. 1a shows a block diagram of the main components of the computer system used for automatically labeling maps in accordance with one embodiment of the present invention.

Referring to FIG. 1a, in accordance with a preferred embodiment of the present invention for automatically positioning and placing labels on maps, a conventional computer, generally designated as 14, can be used in conjunction with computer software which is loaded into computer 14. Computer 14 includes input 13, processor 14, output 15 and memory 16. The software program stored in memory configures the computer so that it reads a description of the map derived from data introduced at input 13, instructs the computer to label the map, and then writes the labeling information into output files at output 15 for input to a map plotting program which can display the labeled map on a display 17 as well as plot the map on a plotter 18.

Label Positioning

Figure 34:
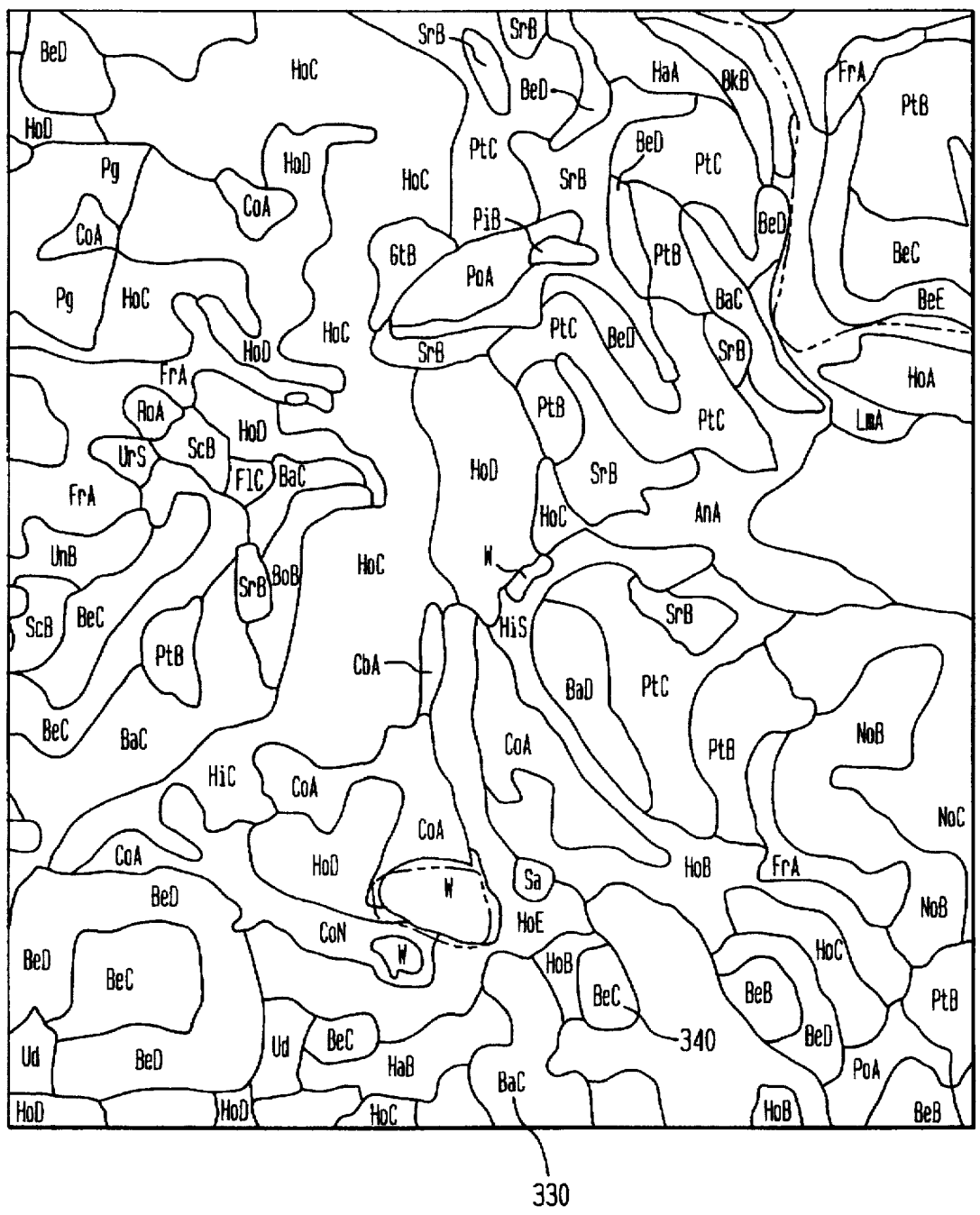
FIG. 34 shows the map of FIG. 33 with final label positions as placed in accordance with the label placement procedure present invention.

The label positioning method and apparatus is described herein in a preferred embodiment relating to special-purpose agricultural maps such as soil survey maps. An example such a labeled soil survey map, also called a soil map, is shown in FIG. 34 while an example of an unlabeled soil map is shown in FIG. 1. The predominant features on these maps are areas of uniform soil type or usage, whose names are usually short. Hundreds of soil survey maps are produced every year by the Soil Conservation Service and even a skilled cartographer requires a minimum of 8–10 hours to label each map. The effort needed to automate the labeling of soil maps is clearly warranted.

When labeling soil regions, several rules should be observed. Labels should preferably be placed horizontally, with more than one label in a region if the region is large or elongated. Labels which will not fit inside a region can be placed in a neighboring region with a line (called a leader) pointing into the region. The first task in labeling a soil region, denoted as label positioning, is to analyze each region and determine the number of labels required in the region and the approximate locations at which to place them so that all parts of the region are covered. Name positioning requires information about the size and shape of the region. Such information can be determined from the distance transform and skeleton of the region. The next task, denoted label placement, is to find the precise location of each label such that it does not overlap any region boundaries, other linear features, or other labels.

Referring to FIG. 1, on soil maps, the preponderance of features to be named are the soil regions, generally designated as 10. Soil regions 10 can be very irregularly shaped and vary in size from very small to very large, coveting almost an entire map. Some regions may themselves contain regions, the inner regions being known as islands, such as islands 12. Finally, regions may have narrow, elongated appendages, or they may have wide open parts, as illustrated in FIG. 1. To a lesser extent, these soil maps contain various other features which must be labeled in addition to the soil regions. These may include area features such as counties, and line features such as rivers and highways. Since these other features on a soil map are merely obstructions to placing labels but do not affect the distribution of labels in soil regions, they can be ignored for the purpose of label positioning; however, they must be considered during label placement.

Specifications to be followed in labeling soil survey maps have been defined by the Soil Conservation Service of the U.S. Department of Agriculture. Of these specifications, the label positioning criteria are as follows (1) names should be placed near the geometric center of the region if possible, and (2) if the region is large, irregular, or very elongated, multiple copies of the label may be required within the region.

The label positioning procedure is preferably implemented as part of a software system capable of producing a completely labeled soil map. Source code showing a preferred program used to implement the label position procedure is listed at the end of the detailed description. The software listed herein was developed primarily for demonstrating the feasibility of automatically labeling maps rather than as a highly optimized soil map labeling software package, and thus optimizing speed and space requirements were not given the highest priority. However, the modularity of the design will enable easy enhancement to the software package for improving resource utilization and performance. Also, the design and implementation of the label positioning procedure of the software was made general enough to be adapted for processing other similar types of maps, such as forestry maps, census maps, cadastral maps and maps used for land development.

Figure 2:
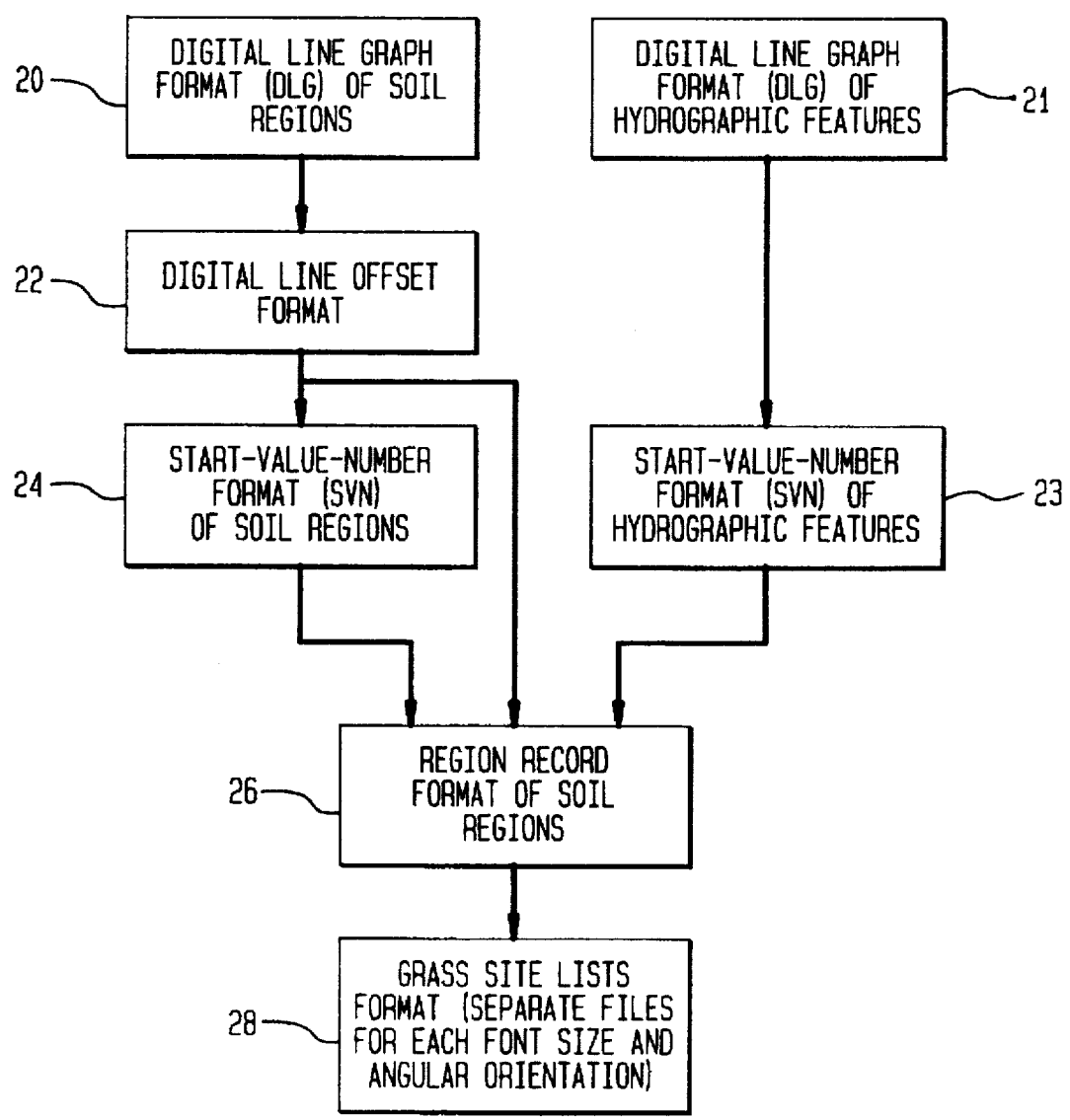
FIG. 2 shows the flow of data between files used in accordance with an aspect of present invention.

To facilitate understanding of the functional flow of the software system, knowledge of the data structures used is required. The flow of data between files used in the program is shown in FIG. 2. The flow of data used in memory for label positioning and placement is presented in FIG. 3 and is illustrated for lead-in placement in FIG. 4.

Digital Line Graph (DLG), shown in permanent data file 20 of FIG. 2, is the preferred format of the input data file of the soil regions. In this format, a complete geographical description of the map is given in vector format as a network graph description. Nodes are defined as points at which lines begin, end, or intersect, and areas are closed boundaries which start and end at the same node.

There are four major sections of a DLG file: the header, nodes, areas, and lines sections. The header section gives the extents of the map and the details of the map projection. The coordinates and attribute codes of nodes are in the nodes section, and the areas section lists the lines bounding an area and its islands as well as attribute codes of the area. The lines section lists the coordinates of all points comprising the line and its attribute codes. Attribute codes describe the type of point, line or area feature. Point features are represented by lines which start and end at the same node. Line features are represented by lines and area features are represented by areas. In the DLG files for soil maps, areas correspond to soil regions.

The DLG line-offset format, shown as temporary data file 22 of FIG. 2, is the format of an intermediate file needed for certain preprocessing functions which are described below. Since regions and lines are found in separate sections of the DLG file, the DLG line-offset file is used to speed up searching through the DLG file by collecting together line information for each region. In each DLG line-offset record, the extents of a region are given, followed by a list of the region's constituent lines and corresponding file offsets into the DLG file.

The software also makes use of a start-value-number (SVN) format, shown as temporary data file 24, which is a compressed data format used for compactly storing digitized map information. Each SVN record preferably contains four fields. The first field, Start, contains the x-y coordinates of the starting point of a series of row-wise contiguous cells belonging to the same region. One cell of data on the digitized map corresponds to one of the units used in the DLG file. The next field, Value, contains the identifying number of the region as specified in the DLG file. The third field contains an integer specifying the type of feature to which the series of cells belongs. Finally, the fourth field, Number, contains the number of cells in the series. When stored in a SVN file, the records are sorted first according to their y coordinate and then according to their x coordinate. In this way, adjacent series on each y value of the map are grouped together, allowing rapid expansion of the data into an array. Either a window of the map can be extracted by specifying a range of x-y values, or one particular region can be extracted by looking for SVN records which contain the region's identifying number in the Value field.

Use of the SVN temporary data file as an intermediate storage means is not essential but can be used as a matter of convenience. A preferred method, which can result in faster performance, omits the SVN file and provides map array data for a region or part of a region, without intermediate storage, directly to other parts of the program when and as needed.

A distance transform and skeleton (DTS) array is preferably used. The DTS array is a two-dimensional array used for calculating the distance transform and skeleton of a region. The distance transform and skeleton are discussed in more detail below. Preferably, the DTS array is a rectangular array of which the width and height are equal to one-quarter the maximum width and height of the region in the integer units used in the DLG file. The use of "one-quarter the maximum" is a particular choice to effect a combination of good precision and reasonable processing time. Other ratios, ranging form one-to-one to one-twentieth of maximum can be used when more appropriate for a particular map size and resolution. As data is extracted from the SVN file, every fourth cell is placed in the array. The resulting array is four times as coarse as an array containing the SVN data would be and, therefore, would have a coarseness factor of 4. The DTS array is preferably a temporary array which is created specifically for the region under consideration before label positioning, and is discarded after label positioning has been completed. The DTS array is not used for label placement.

Before calculating the distance transform and skeleton, the array consists of only 1's and 0's, where 1's indicate foreground cells (cells in the region) and 0's indicate background cells, i.e., cells outside the region. After computing the distance transform and skeleton, all foreground cells will have positive distance transform values, except for cells on the skeleton which will have negative distance transform values.

A local placement search (LPS) array is also preferably used and consists of a two-dimensional array containing a raster representation of pan or all of a region, centered at a preliminarily determined approximate label location. It is preferably a rectangular array for which the width and height are chosen to span the area within which the particular label may be relocated from the preliminarily determined location to avoid overlap with map features or other labels. Data for the LPS array can be extracted from the SVN or obtained directly form the source map data files. Since placement requires more precise information than positioning, a smaller coarseness factor, such as of 2 or 1 rather than 4, is used. If information about other features is to be considered, as required for leadered placement discussed below, data from their SVN files (or directly after scan conversion from the map data input files) are also extracted and placed in the LPS array with the same coarseness factor.

The LPS array is used for label placement only, and as the DTS array, is a temporary array which can be discarded after label placement has been completed for a region. Each cell in the array contains a value equal to the identifying number of the region to which it belongs or equal to a special code. Preferably, two special codes are used. Cells which belong to hydrographic or other linear features are given the value −1, and cells which belong to a label which has already been placed have the value −2.

In the case of label placement inside a region, denoted as internal label placement, the array covers a rectangular area approximately ½ by ½ inches, centered around the point selected by the label positioning method. In the case of placement outside a region, denoted as lead-in placement, the array preferably would be somewhat larger, such as ¾ by ¾ inches, centered around the point selected by the label positioning method.

An adjacency list in accordance with the instant invention is a data structure used to store the skeleton graph described below. The graph to be represented is a set of vertices and edges such that there is a path consisting of one or more edges between every two vertices in the graph. Each vertex has a position in the DTS array and a weight assigned to it. Furthermore, it contains a pointer to a list of all the edges which begin at the vertex. Each edge element has a weight and length assigned to it as well as pointing to a list of all the points belonging to the edge. Each point record contains the coordinates of the point, its distance transform value and its offset from the beginning of the edge.

For the purposes of finding the shortest path between any two vertices, it must be possible to traverse an edge in either direction. Therefore, every edge from vertex A to vertex B has an edge record attached to vertex A and also to vertex B. However, the list of points is not duplicated. In order to differentiate between the directions of the two edge records, each edge record has a second pointer to a reverse list. Therefore, if traversing the edge from A to B, the list is attached to the forward list pointer. When traversing the edge from B to A, the list is attached to the reverse list pointer. One can determine the correct offset of a point on the edge by knowing whether a forward list or a reverse list is being traversed. In searching a reverse list, the offset of a point is the total length of the edge less the offset stored in the point.

A region record, shown as temporary data file 26 of FIG. 2, preferably stores all the information about the region required during processing, except for the DTS and LPS arrays. Some of the information includes the extents of the region, any label information generated by label positioning or placement, and the region's file offset into the SVN file. The record of each region is preferably stored in memory for the duration of the program, and it is stored in a file, the record file, until the map is completely labeled. The record file can be manually edited, or used for interactive editing if label placements must be modified.

A place record is used for communication between the label positioning and placement modules. It is also used for intermediate storage of labeling information extracted from the region record or labeling information to be added to the region record. The place record stores the location chosen by the positioning module and the location assigned by the placement module if the label could be placed. There is also a flag indicating that placement was either successful or unsuccessful. In addition to these fields, the place record contains several other fields needed for processing. The technique described for handling hydrographic data can also be applied to handle other line feature data, such as roads or railroad lines if such data need be considered in the labeling of the map features.

Site list data in GRASS format, shown as permanent data file 28 in FIG. 2, is the preferred format of the output file which can be exported to MAPGEN, a software package, via GRASS, as discussed below, for plotting the map. Each record consists of the label location's coordinates in the same units as the original DLG file, its angular orientation, and its character string.

In an effort to make the automatic labeling software as compatible as possible with prior-art computer-aided cartographic systems, it is preferred that the input and output files are usable with common formats. DLG files, for example, are easily produced by the public domain Geographic Information System (GIS), Geographic Resources Analysis Support System (GRASS), and also easily exported to GRASS. The output site list format is also easily exported to GRASS which in turn has an interface to MAPGEN, a public domain software package used by the Soil Conservation Service for plotting maps.

Figure 5:
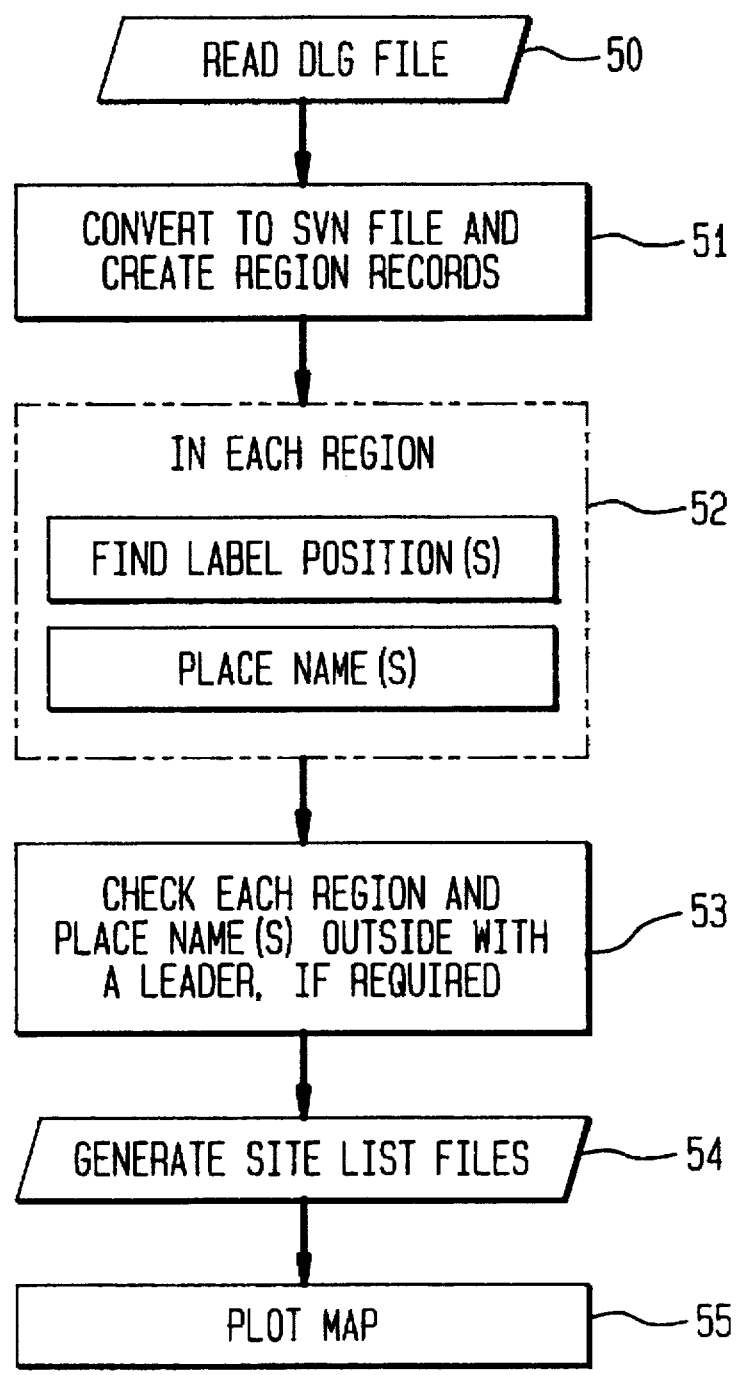
FIG. 5 shows an overview flow chart of the labeling software.

FIG. 5 shows a summary of the functional flow of the software. First, in step 50, the DLG file is read by the computer. Next, in step 51, the DLG file is converted to a SVN file and region records are then created. For each region, one or more label positions and place names are located as shown in step 52, and then in step 53 each region is checked and, as required, names are placed outside the region with a leader. Finally, the site list files are generated at step 54 and the map is plotted in step 55. Setting the input and output formats does not necessitate utilizing these formats for intermediate processing. Although DLG is a vector format, it is preferred that a raster-based approach to positioning and placement is used as it is more effective for two reasons. First, placement is primarily concerned with conflict resolution which requires precise information about the location of obstacles such as boundaries, other features, or other labels. Such precise information is more easily obtained from raster data in which every cell in a label can be checked for conflict with cells belonging to obstacles. Second, the distance transform and skeleton of a region, which are used for size and shape information, can be determined from raster data. Therefore, for consistency, raster data is preferably used for label positioning as well.

Therefore, the first task of the software is to convert vector DLG data to raster SVN data in a preprocessing stage. Preprocessing involves first reading the DLG file to produce a DLG Line-Offset file. Next, each region from the DLG line-offset file is converted one by one into a raster form, preferably done by using the scan line conversion algorithm described in Foley, van Dam, et al., *Computer Graphics Principles and Practice*, 2nd Edition, Addison-Wesley Pub., Reading, 1990, the disclosure of which is incorporated herein by reference.

The scan line conversion algorithm uses an edge table to store the vertices of all edges in a polygon. It then uses the idea of edge coherence to calculate the intersections of all edges of the polygon with the current scan line. The term edge coherence signifies that the x value of an edge can be calculated by knowing the slope of the edge and the x value of the edge on the previous scan line. Because of the use of edge coherence, the algorithm is quite fast. Also, since it uses only the vertices of the polygon and does not need an array for the filling, it does not use a large amount of memory. As each filled scan line of the region is computed, an SVN record is added to the SVN file. As each region is converted to a raster form, a region record is also created and added to the list of region records stored in memory. After all regions have been converted, the SVN file is sorted to become the compressed raster version of the entire map.

For hydrographic data, DLG hydrographic data, shown as permanent data file 21 in FIG. 2, is preferably converted to SVN format, as shown in temporary data file 23. However, instead of filling regions, since hydrographic features are line features, Bresenham's algorithm, generally described in Jordan and Barratt, "A scan conversion algorithm with reduced storage requirements" *in Tutorial and Selected Readings in Interactive Computer Graphics*, H. Freeman (ed.), IEEE Catalog No. EHO/56-0, IEEE Computer Society Press, Silver Spring, 1980, pp. 97–99, the disclosure of which is incorporated herein by reference, which is preferably used to interpolate between points on the lines. These digitized lines are converted to SVN format and added to the SVN file for hydrographic features. After sorting, this SVN file is also ready to use. Preferably, a separate SVN file is used for the hydrographic features, but since a flag is used in the SVN records to distinguish hydrographic features from soil regions, the SVN records could, alternatively, be placed in the same file as the soil regions.

FIG. 2 illustrates the flow of data between the various files used in the software. Each region is processed individually, in sequence. The sequence is the same as that found in the DLG file, namely, ascending numerical order. Another possibility is to sort regions according to area from smallest to largest. This ordering might remove some conflicts since small regions, which have fewer choices for label placement, will have their labels placed first, and also ensure that islands within regions will usually be labeled before their surrounding regions. After the DTS and LPS arrays have been produced, label positioning is performed. A list of place records, the place list, is produced, each one containing the coordinates of a location selected by the positioning module. Place records are given to the label placement module one by one so that each location can be checked. This module studies the neighborhood of the selected location to determine if there is enough room for a label and also checks whether there is conflict with any other features, such as hydrographic features. If the label can be placed, the label's location is updated in the place record and the flag is set to indicate that the location has had a label placed on it. After the place list has been checked, all the locations and the flags indicating successful or unsuccessful placement are added to the region's region record.

Figure 3:
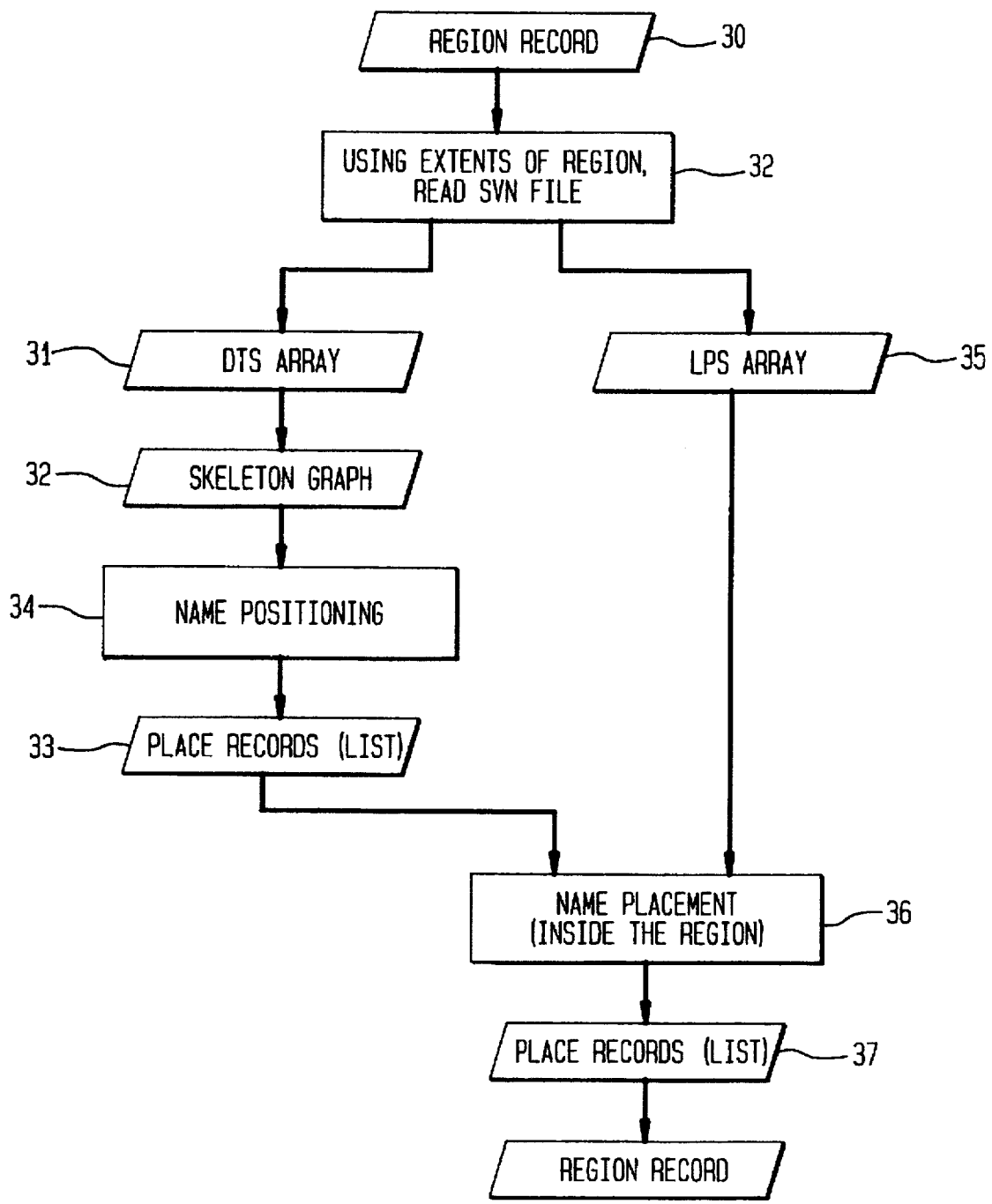
FIG. 3 shows the flow of data in memory during label positioning and placement.
Figure 4:
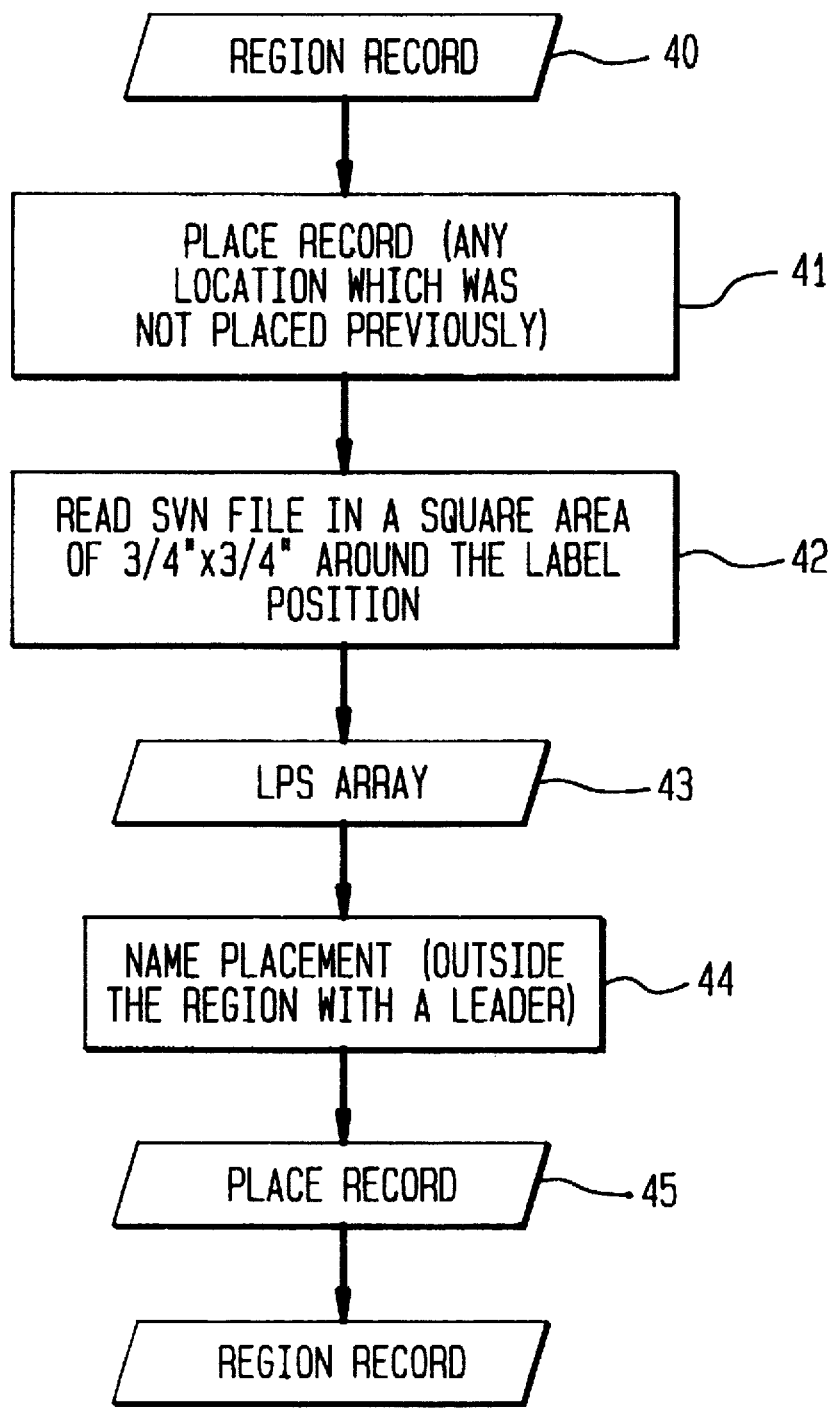
FIG. 4 shows the flow of data in memory during leader-in placement.

The flow of data in memory between the data structures used during label positioning and placement is illustrated in FIG. 3. The data structures include region record 30, DTS Array 31, Skeleton Graph 32, Place Records List 33, LPS Array 35, and Place Records List 37. After label positioning, process step 34, has been performed on all the regions, a second pass is made through all the region records. If a region has a location at which a label could not be placed inside the region, an LPS array is created and a second placement module, the lead-in process, is called to try to place the label outside the region. This process also checks that the label does not cross any boundaries or hydrographic features. FIG. 4 shows the manner in which the data structures including region record 40, place record 41, LPS array 43, and place record 45, are used for lead-in placement using processes 42 and 44.

At this point the position and orientation of all of the map's labels will have been completely determined and the software can then generate the site list files which can be used by GRASS/MAPGEN to plot the map. By default, preferably all intermediate and output-file names Consist of the DLG file name with an extension added. For example, if the DLG file is sst, the record file is named sst.rec, the SVN file is named sst.svn, and so on.

The record file stores the region record data structure which is used for processing. If the region records are stored after the SVN file is created, it is not necessary to recreate the SVN file every time the program is run.

To guard against the software occasionally crashing, the results that have been produced before the program crashed can preferably be stored in a crash file that is opened at the beginning of the program. As each region's labels are positioned and placed, its region record is appended to the crash file. If necessary, then, one needs merely to replace the records in the record file with the corresponding records in the crash file and to restart the program after the last region to be processed before the crash. The format of the crash file is identical to that of the record file except for the map extents present at the beginning of the record file. Further information about the state of a program can be found in an error file. This can be opened at the beginning of the program and contains all diagnostic messages produced by the program during execution. These messages provide information about debugging the logic of the software as well as the implementation.

Label positioning requires information about the size and shape of a region as a whole to determine the distribution and approximate locations for labels. This information is derived from various known techniques, including the distance transform, the skeleton transform, and the shortest-path algorithm for directed graphs. These techniques and their application to determining label locations in accordance with the present invention are described below.

Figure 6A:
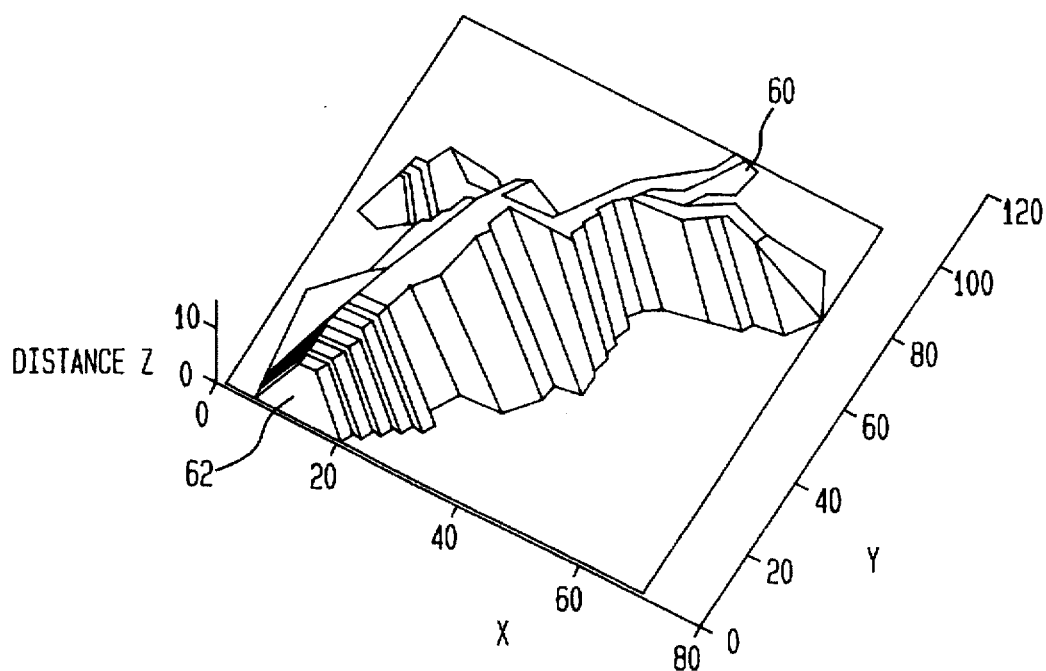
FIG. 6a shows a distance transform of a soil region represented as height above the x-y plane.
Figure 6B:
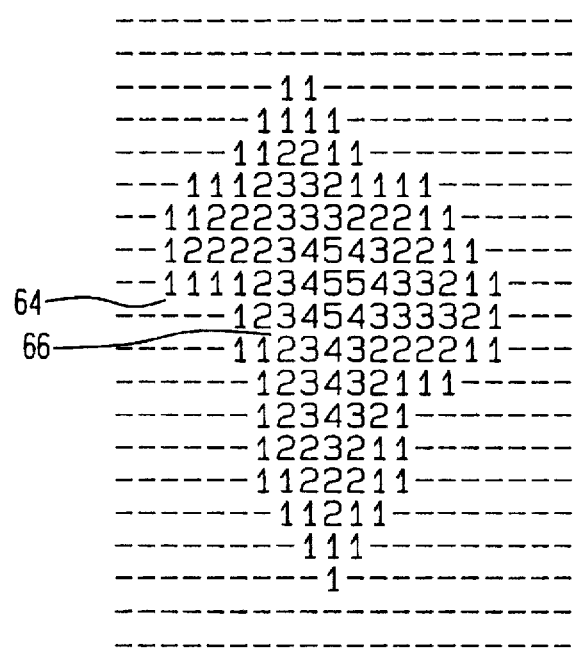
FIG. 6b shows a distance transform of a soil region represented as numeric values.

A distance transform is the transformation of a raster representation of a region. Preferably, the distance transform is calculated in a distance transform skeleton array or "DTS may." After computing the distance transform, the value of each cell in the transformed region is the distance in the x and y directions, in number of cells, from the cell to the nearest region boundary. The minimum amount of space around any cell in the region is known, and hence the size of the region at that cell is also known. Since the distance transform is a function of the location of a cell given in terms of x and y, the distance transform can be plotted in the z-direction. The value of distance transform is then referred to in terms of a "height" above the x-y plane of the region. FIG. 6a shows a three-dimensional view of the distance transform 60 of a region 62, with the distance transform represented as a height or distance above the x-y plane. FIG. 6b shows a numeric representation of a distance transform 64 of a region 66.

Figure 7:
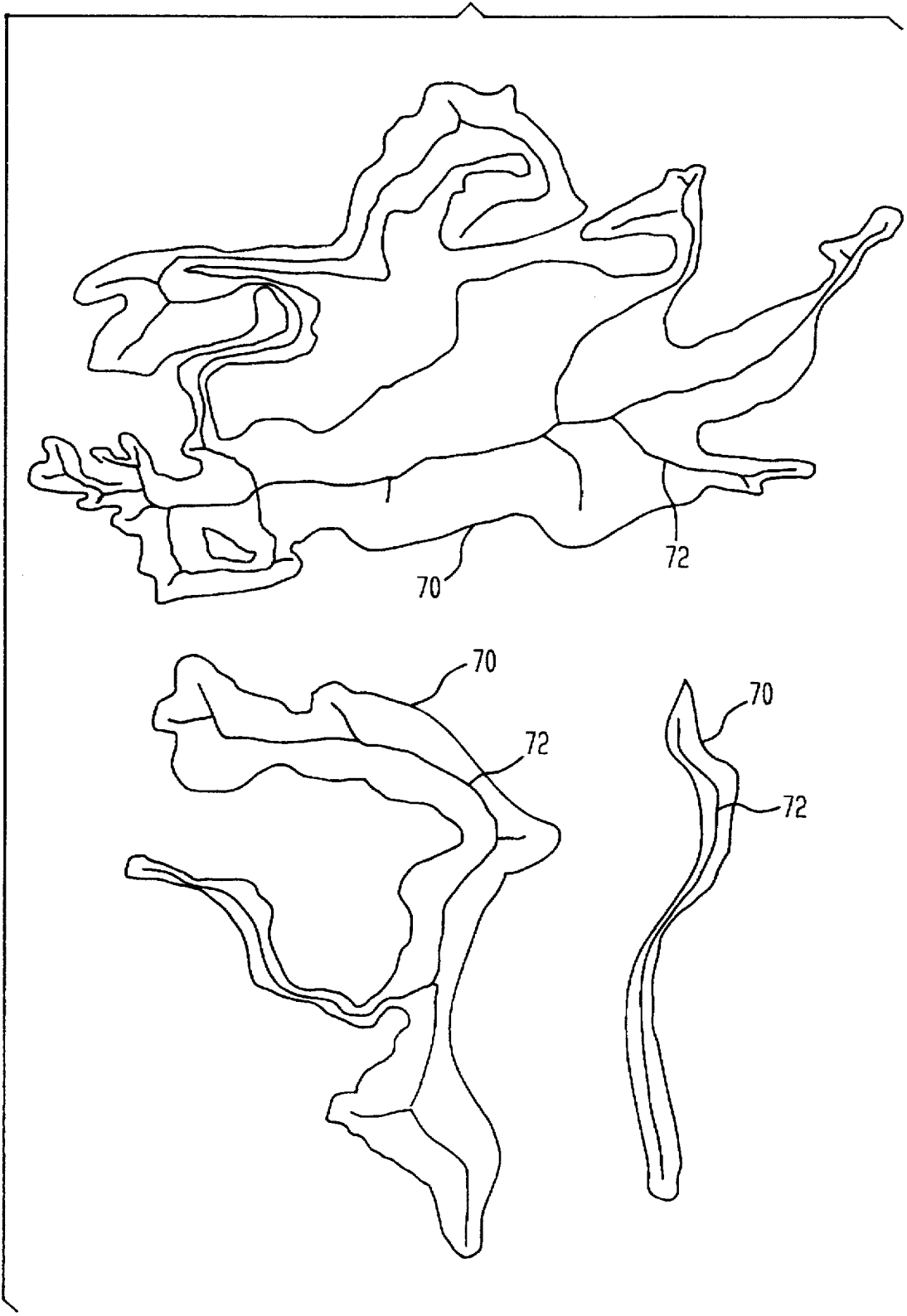
FIG. 7 shows several soil regions with superimposed skeletons.

The skeleton of a region is a set of lines consisting of all points which are midway between opposing boundaries of all parts of a region. There are many algorithms available for producing skeletons of regions. In a preferred prior an algorithm used by the present invention, the skeleton is computed by repeatedly eroding, or shrinking, the region until opposite boundaries meet. Depending on the complexity of the region, the skeleton may have several lines. Examples of regions 70 with their skeletons 72 superimposed thereon are shown in FIG. 7.

The skeleton is used as a means of describing the shape of the region, as well as for computing distances between points in a region. Skeletons can become very complicated, especially in the case of regions with islands in which the skeleton contains a loop around the island. A contrast to the complexity of some skeletons is found in the region at the bottom right corner of FIG. 7 in which the skeleton comprises a single line.

Figures 8, 9:
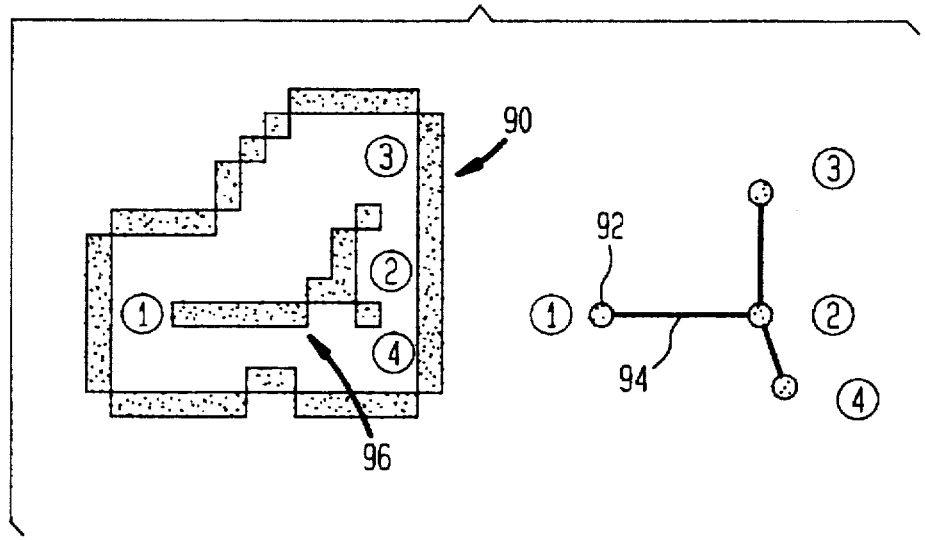
FIG. 8 shows a raster image of a skeleton.
FIG. 9 shows raster and graph representations of a skeleton.

Referring to FIG. 8, preferably, the skeleton is initially computed in an array 80 in which all background cells are 0 and all cells in the region are 1. In the resultant array, only cells in the skeleton have a value of 1 while all other cells are 0. The skeleton is then superimposed on the distance transform to produce a DTS array. Thus, as illustrated in FIG. 6 the "height" of every skeleton cell is determined and, therefore, the array used by the positioning functions contains both size and shape information. Since an array can be cumbersome to use in strategic computations, the skeleton is preferably converted and used in another format-the skeleton graph.

Whereas the skeleton is a series of cells in an array as shown in FIG. 8 the skeleton graph 90, shown in FIG. 9 is a directed graph consisting of vertices 92 (labeled as 1, 2, 3 and 4), edges 94, and points 96. A point is one cell in the skeleton of the region. An edge consists of all points on the skeleton which are adjacent to each other in the eight-connected sense, and which have only two neighbors. Edges begin and end at vertices; therefore, vertices may either have one neighbor or three or more neighbors. Vertices which have three or more neighbors, such as vertex 2, are junctions in the skeleton where three or more edges intersect.

Since the number of edges in the skeleton graph is usually much less than the square of the number of vertices, an adjacency list implementation can be used to describe the graph structure. Details of the graph structure described above are illustrated in Table 1 below.

TABLE 1

| Vertex | Edge | List (i, j) |
| --- | --- | --- |
| 1 | 1 to 2 | (8, 3) (8, 4) (8, 5) (8, 6) (8, 7) (7, 8) |
| 2 | 2 to 4 | (8, 10) |
|   | 2 to 3 | (5, 9) (4, 10) |
|   | 2 to 1 | reverse list = list of edge 1 to 2 |
| 3 | 3 to 2 | reverse list = list of edge 2 to 3 |
| 4 | 4 to 2 | reverse list = list of edge 2 to 4 |

In order to be able to traverse an edge in either direction, every edge from vertex A to vertex B has a duplicate edge added to the graph in the reverse direction from vertex B to vertex A.

The label positioning procedure in accordance with a preferred embodiment of the instant invention uses the criteria set forth above for soil maps. It should be appreciated, however, that different criteria can be used, for example, for different types of maps or to accommodate different cartographic preferences. To satisfy the requirement of placing the label near the geometric center of a region, an attempt is made to place the label on a point with the largest distance transform value. To satisfy the second requirement of multiple labels for large areas, the length and width of all parts of a region are determined and labels are then distributed evenly while following the spacing requirements. The preference in positioning is to find locations with high distance transform values because labels at these locations are good representatives of large parts of the region. To incorporate both requirements, therefore, a collection of weights and distances is used in choosing label locations.

Before describing in more detail the procedure for choosing label locations in accordance with the instant invention, some terminology is set forth as follows:

(1) "Shortest path" is the sequence of edges connecting two vertices such that the total distance traversed is less than the distance traversed on any other sequence of edges between the same two vertices.

(2) "All-pairs shortest paths" is the set consisting of the shortest path between every two vertices in the graph.

(3) "Length" is the distance traversed on an edge or a path, measured as the number of cells.

(4) "Height of path" is the average distance transform value computed over all the points on a path.

(5) "Total weight" is a measure of how desirable a path is for label placement. It is the sum of the height and length of the path.

(6) "Best path" is the previously unprocessed path with the highest total weight.

(7) "Unweighted lineal position" is a location for a label on a path which considers only the length of the path without considering the distance transform values on the path.

(8) "Height" is the distance transform value at a particular point. This value can refer to a vertex or a point on an edge.

(9) "Suitability" is a measure of how desirable a point is for label placement. This value depends on the proximity of the point to the unweighted position, as well as the distance transform value of the point.

(10) "Most suitable vertex" is the previously unprocessed vertex with the highest suitability value for any unplaced unweighted location on the chosen path.

(11) "Most suitable point" is the point with the highest suitability value for a particular unplaced unweighted location.

(12) "Weighted location" is the actual location, corresponding to an unweighted location, selected for a label based on suitability values as well as the proximity to previously placed labels.

Given a path P, the following can be determined:

L=the length of P $h_{ave}$=the average distance transform value on P

M=the most suitable vertex $w_i$=the weight of vertex i $p_i$=the distance of vertex i from beginning of P t=the total weight of P, where:

$$t = h_{ave} + L$$

$s_{ij}$=the suitability of vertex i for unweighted location j, where:

$$s_{ij} = w_i * d_{ij}$$

$S_j$=the maximum suitability for unweighted location j $S_j^P$=the difference between the maximum suitability value of any vertex at unweighted location j and the suitability of the most suitable vertex at that location, where:

$$S_j^P = \frac{S_j - S_{Mj}}{S_j}$$

$t_{max}$=the maximum total weight of all paths in the graph $t^P$=the difference between the maximum total weight of all paths and the total weight of P, where:

$$t^P = \frac{t - t_{max}}{t}$$

$d_{ij}$=the comparison of proximity of vertex i to unweighted location j, where:

$$d_{ij} = \frac{L - |p_i - u_j|}{L}$$

n=the number of unweighted labels on P $u_{sep}$=the distance between unweighted locations $u_{disp}$=the displacement of first unweighted location from beginning of P $u_j$=the distance of unweighted location j from beginning of P In a first case where the length of path P is greater than $U_{ave, area\ type}$ (L>$U_{ave, area\ type}$), i.e., the path requires more than one label, then the below steps are followed:

(1) Calculate the number of labels required:

$$n = L/U_{ave,\ area\ type} + 1$$

-continued $$diff = \begin{cases} \frac{inch}{n+2} & \text{if } L \bmod U_{ave, area\ type} < inch \\ \frac{L \bmod U_{ave, area\ type}}{n+2} & \text{otherwise} \end{cases}$$

(2) Calculate the separation between the labels:

$$u_{sep} = U_{ave,\ area\ type} - diff$$

(3) Calculate the distance of the first and last labels from the endpoints:

$$u_{disp} = \frac{L - U_{sep} * (n-1)}{2}$$

In the second case where the length of path P is less than or equal to than $U_{range,\ area\ type}$ (L<=$U_{ave,\ are\ type}$), i.e., the path requires only one label, then the below steps are followed:

(1) Calculate the number of labels required:

$$n = 1$$

(2) Calculate the separation between the labels:

$$u_{sep} = 0$$

(3) Place the single label in the middle of the path:

$$u_{sep} = L/2$$

The result for both cases is that the path offset of each unweighted location can be calculated as follows:

$$u_j = u_{disp} + j * u_{sep}$$

For simplicity, the distances can be given in terms of inches. Since maps may be printed at various scales, the distances can be converted to appropriate values of cells.

Figure 10:
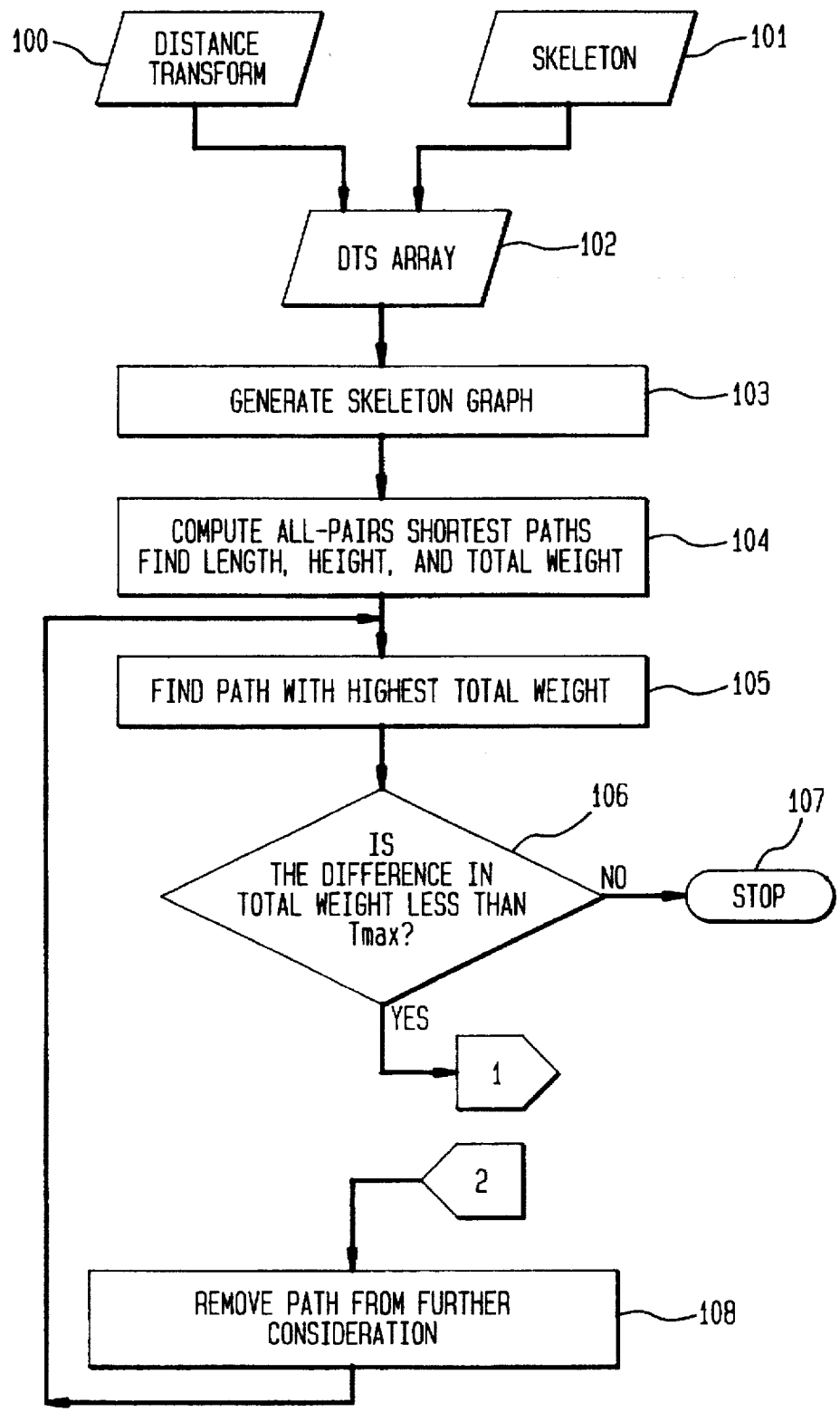
FIG. 10 shows a flow chart showing a procedure to choose paths using a skeleton graph.
Figure 11:
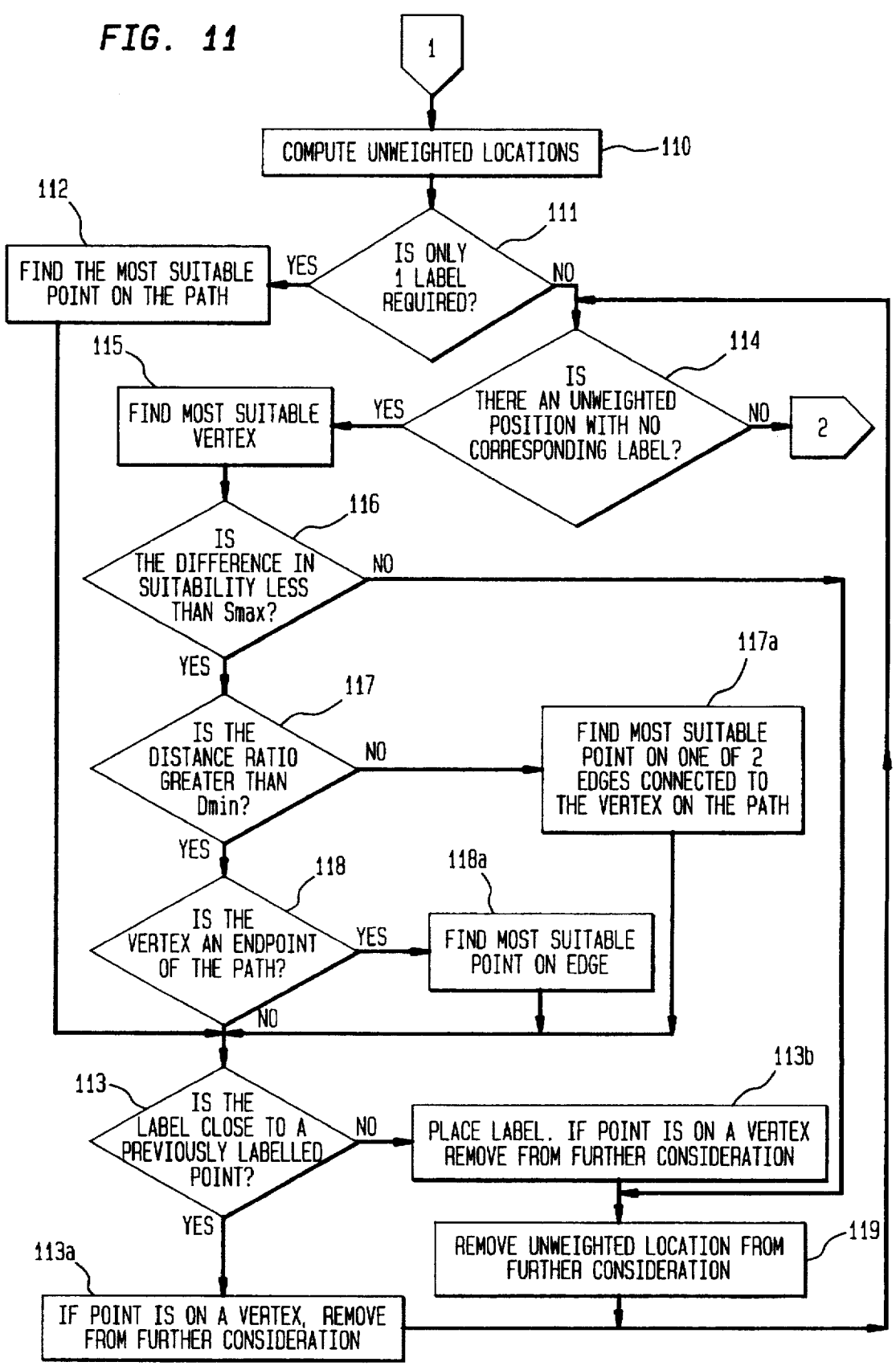
FIG. 11 shows a flow chart showing a procedure to choose label positions on the path.

The following steps describe the procedure for label positioning and are summarized in the flow charts of FIGS. 10 and 11. First the distance transform and skeleton are computed in steps 100 and 101 to produce the DTS array in step 102. The skeleton graph is then generated in step 103. The next step is to compute the all-pairs shortest paths in step 104. Preferably, Dijkstra's algorithm, as described in Shimon Even, "Graph Algorithms," *Computer Science Press*, Potomac (1979), p.13, the disclosure of which is incorporated herein by reference, is implemented for this purpose. During execution of step 104, the characteristics of each path are computed, namely, L, $h_{ave}$ and t.

After comparing values of t in step 106, the best path is chosen, i.e., the path having the highest total weight. If $t^P$ falls below the threshold value, i.e., $t^P < T_{max}$, the path is discarded and no further processing occurs (step 107). At least one path is always chosen since initially $t^P = 1$.

Referring to FIG. 11, the unweighted locations are now computed at step 110 using the equation:

$$u_j = u_{disp} + j * u_{sep}$$

If only one label is required (step 111), all points on the edges comprising the path are checked in step 112 to find the most suitable point. If the location is too close to an already placed label, the location is discarded in step 113 A.

Next for more than one label required (step 114) the most suitable vertex for each unweighted position is found in step 115. This step is a loop which repeats until all labels have been placed to correspond to all unweighted positions, or until no weighted positions can be found which satisfy the following conditions. After each iteration, if the weighted location is on a vertex, it is removed from consideration at step 113B. If $S_j^P$ falls below the threshold value, i.e. $S_j^P < S_{max}$, the vertex is eliminated from further consideration. If the weighted location is one of the endpoints of the path (step 118), the most suitable point on the edge is located in step 118A which is connected to the vertex. If the weighted location is too far from the unweighted location, i.e., $d_{i,j} > D_{min}$, the most suitable point on the two edges of the path which are connected to the suitable vertex is found in step 117A. In step 117, if the weighted location is too close to a previously selected one, it is not used. If the weighted location is acceptable, the unweighted location is removed from further consideration at step 119. Preferably, at first, only vertices are considered as label locations in order to save processing time. Because of the irregular shapes of the regions being labeled, generally the skeletons are complicated enough to give a good selection of vertices from which to choose. However, for simple skeletons, with few vertices, the search can be expanded our search for good weighted locations by considering points on edges as well.

The current path is then removed from further consideration in step 108 and the procedure then loops back to choose the next path.

Figure 12A:
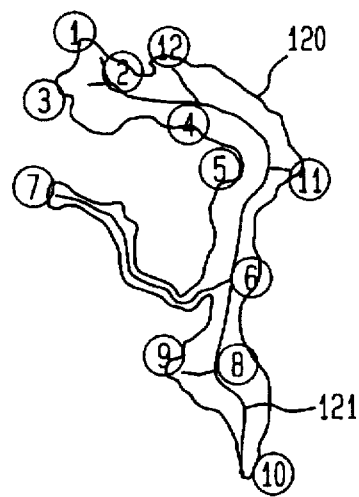
FIG. 12a shows a region with its skeleton contained therein.
Figure 12B:
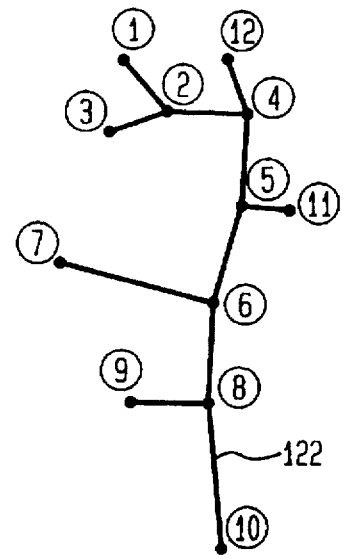
FIG. 12b shows the skeleton graph of FIG. 12a without the surrounding region.
Figure 12C:
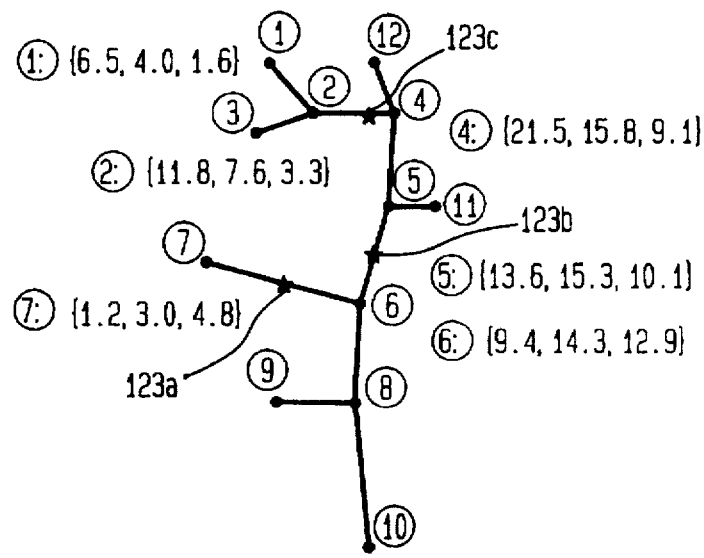
FIG. 12c shows unweighted locations and suitability values of a number of vertices.

Referring to FIGS. 12a–12c, an example of the label positioning procedure carried out on one region 121 is described below. Before beginning the procedure, the skeleton 121 is converted to graph form 122. The first step is to calculate all the shortest paths in the graph and to compute the weights of each. For example, path 7-6-5-4-2-1 yields L=419, h=12 and t=431, while path 10-8-6-5-4-2-1 yields L=415, h=15 and t=430. Each path is processed in turn, starting with the most heavily-weighted path, which is Path 7-6-5-4-2-1 in this case. The next step is to calculate the unweighted locations on the chosen path. In the example shown in FIG. 12C, the number of unweighted locations required on Path 7-6-5-4-2-1 is computed using the equation:

$$n = L/U_{ave, area\ type} + 1$$

$$diff = \begin{cases} \dfrac{inch}{n+2} & \text{if } L \bmod U_{ave, area\ type} < inch \\ \dfrac{L \bmod U_{ave, area\ type}}{n+2} & \text{otherwise} \end{cases}$$

In this case, three locations are required and are found at the path offsets 123a, 123b and 123c shown FIG. 12.

Using these unweighted locations, the suitability value of each vertex can be calculated corresponding to each unweighted location. Because there are three unweighted locations on the path, each vertex 1, 2, 4, 5, 6 and 7 has a triplet of suitability values set forth in parenthesis adjacent to such vertex. Starting with the most suitable vertex, each vertex is now processed:

Vertex 4 is processed first and selected as a label position corresponding to unweighted location 1. Suitability values corresponding to unweighted location 1 are set to 0 for all vertices. Since the suitability values are now 0, none of the vertices will ever again be considered as positions for unweighted location 1. Vertex 5 is processed next and discarded as it is too close to Vertex 4 which already was chosen as a label position. Vertex 6 is then processed and chosen as a label position corresponding to unweighted location 2. Suitability values corresponding to unweighted location 2 are set to 0. Vertex 7 is processed next. Since it is an endpoint, it is not used; however, the edge between Vertex 6 and Vertex 7 is checked for a more suitable point. The most suitable point on the edge is too close to Vertex 6 and, therefore, the point on the edge is discarded as a label position. Vertex 2 is processed next and is discarded since it is too close to Vertex 4. Vertex 1 is processed last. It is the last choice as a label position corresponding to unweighted location 3. The suitability difference, $S_j^P$, between Vertex 1 and Vertex 6, which is the most suitable vertex corresponding to unweighted location 3, falls below the threshold value of $S_j^P$. Vertex 1 is, therefore, discarded as a label position.

Figure 13:
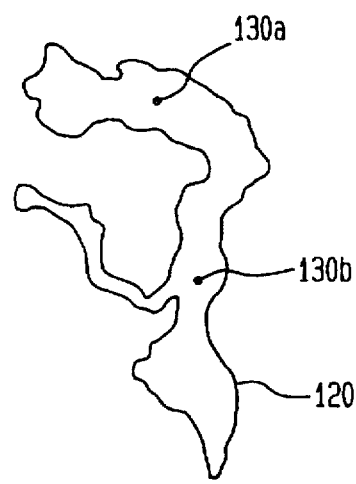
FIG. 13 shows final label positions selected in a region.
Figure 14:
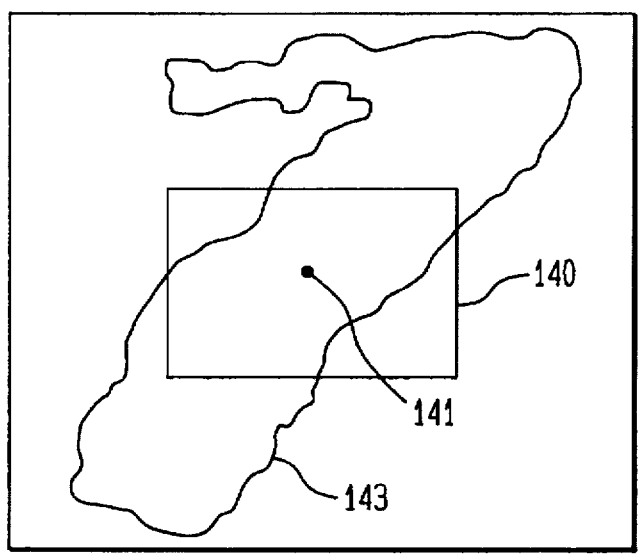
FIG. 14 shows a placement window partially covering a region in accordance with a preferred embodiment of the present invention.
Figure 15:
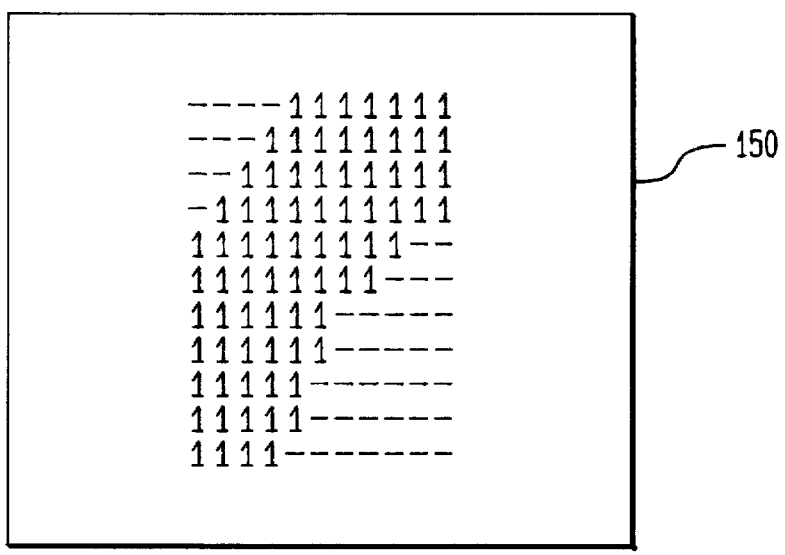
FIG. 15 shows a local placement search (LPS) array for a placement window partially covering a region.
Figure 16:
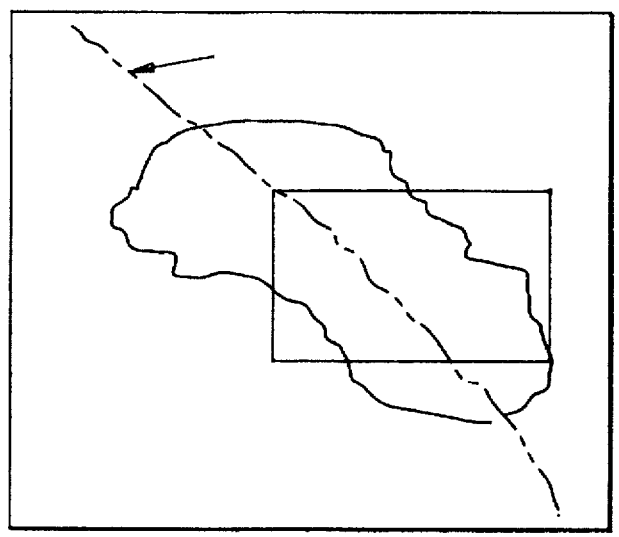
FIG. 16 shows a placement window for a region with a hydrographic feature.
Figure 17:
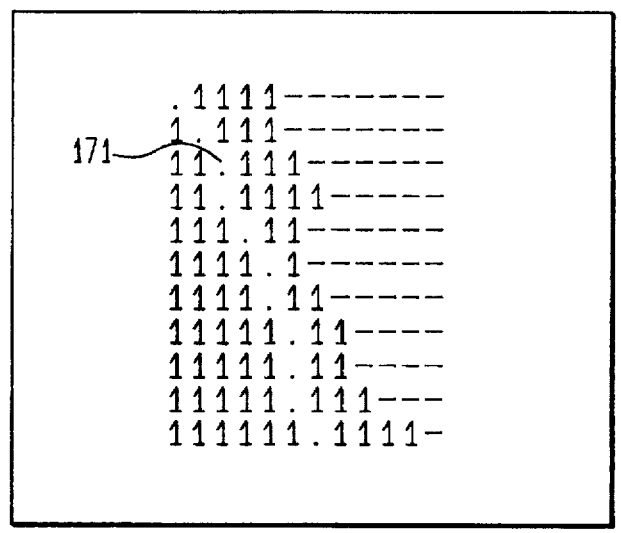
FIG. 17 shows an LPS array for a region with a hydrographic feature.

The next path to be processed is Path 10-8-6. All of the points on this path are too close to Vertex 6 to be used as label positions, and, therefore, no additional label position is chosen on this path. No more paths are present whose weight difference, $t^P$, is less than the threshold and processing stops. The chosen label positions 130a and 130b are displayed in original region 120 as illustrated in FIG. 13.

Distance constants and threshold values of variables used while processing paths and vertices are listed below in Tables 2 and 3 respectively:

TABLE 2

| | |
|---|---|
| $U_{ave,\ open}$ | 3 inches |
| $U_{min,\ open}$ | 2.5 inches |
| $U_{ave,\ narrow}$ | 1.5 inches |
| $U_{min,\ narrow}$ | 1 inch |

TABLE 3

| Variable | Threshold | Description |
|---|---|---|
| $d_{i,j}$ | $0.25 * \log_{10} L$ | minimum value of $d_{i,j}$ acceptable for placing on P |
| $S_j^P$ | 0.5 | minimum value acceptable for placing a label on a vertex i |
| $t^P$ | 0.6 | maximum value acceptable for using path P |
| $w_i$ | ½ inch | minimum value for vertex i when classifying an area as an open area, or maximum value to classify the area as narrow |
| $h_{ave}$ | ½ inch | minimum value for path P when classifying an area as an open area, or maximum value to classify the area as narrow |

For the method to be used for label positioning, it is preferable to first determine the best values for thresholds and constants and the best coarseness factor to use in positioning and placing labels. For example, if one integer unit measure of the data in the DLG file corresponds to 1 cell in a raster array, the array is said to have a coarseness factor of 1. If C units corresponds to 1 cell, C is said to be the coarseness factor of the raster array.

A coarseness factor of 10 may be found to be too coarse and yield poor results for small or narrow regions, especially for final placement of names. The potentially most precise placement possible would be achieved with a coarseness factor of 0.001, which corresponds to the limit in precision of the incoming map data. However, such a small coarseness factor can be impractical because of the extremely large arrays necessary for some regions and because it would lead to unacceptable long processing times. A good compromise is to use different coarseness factors for positioning labels and placement of labels, such as using a coarseness factor of 4 or 6 for positioning and a factor of 1 or 2 for label placement, which requires more precision.

If the software used to implement the label positioning method of the present invention is to be run on a computer without virtual memory, restricting memory usage is desired, and since restricted range from the map can be processed, a small enough range can be selected such that memory resources will not be exceeded. Another area in which some improvement can be made is in the use of disk space. SVN files are typically the largest files, and one possible change would be to fill regions and place the data directly into the DTS and LPS arrays just before label positioning is called instead of creating an SVN file. Finally, processing time can be rather long. Computing the distance transform and skeleton, reading the SVN file and writing into the DTS array are generally the most time-consuming task. A slow skeleton generation algorithm may be simple and yield good results. However, faster skeleton-generation algorithms can be used to significantly reduce processing time. Preferably, the distance transform and skeleton can be computed together using techniques known in the prior art, such as the teaching of Niblack, Gibbons and Capson in "Generating skeletons and centerlines from the distance transform", CVGIP: *Graphical Models and Image Processing*, 54(5), 1992, pp. 420–437, the disclosure of which is incorporated herein by reference. Also, the elimination of the SVN file could serve to reduce processing time. Filling regions tends not to be time-consuming and could offset the time to read a very large SVN file.

The implemented scan conversion function works well for most regions, but there can be problems in regions where there are self-intersections of the boundary. Self-intersections occur as a result of digitizing the map, or because of using a coarseness factor that is too large, such as greater than 8 for example. One correction for such problems is to check for self-intersections in regions where errors are observed during filling.

When only a small window of the map is being processed, regions can be clipped as they are extracted from the SVN source file. Often regions around the boundary of the window can become disconnected since they are cut by the boundary. These regions will have disconnected skeletons and thus will not be labeled. If software is used on a computer without sufficient memory or without virtual memory, this problem will have to be addressed to ensure correct labeling. A solution would be to ensure that each disconnected part of the region is treated as a separate region and that each part has at least one label in it.

The accuracy of label positioning depends greatly on the degree to which the skeleton of a region accurately represents the shape of the region. However, because many soil regions have very irregular shapes, the skeletons for these regions are very complex, with numerous small appendages. These small appendages are not indicative of the general shape of the region and yet they can affect the positioning strategy. To reduce their impact on the positioning results, the region boundaries can first be smoothed, which can eliminate many of the small appendages in the skeleton.

One possible solution for the problem of self-intersections of the boundary requires changes in preprocessing. Since the DLG file is generated from raster data which has already been checked for digitizing errors, it is advantageous to use the original raster data and convert these data to SVN format, although it would still be necessary to check that increasing the coarseness factor does not introduce or remove any islands or appendages in the region. Another solution is to use vector data for label positioning to eliminate the problem of disconnected regions. Since placement is done at a lower coarseness factor, the problems with coarseness of data do not affect it as much as positioning and placement can continue to be done with raster data.

Although the method of label positioning has been described above for region labeling, the method is equally applicable to positing a label on a line feature, such as a river or a street. For such line features, however, a skeleton need not be computed since the line feature itself will serve as the skeleton and the recommended label position would be somewhere on the line feature. Moreover, although the recommended label position is preferably located on the skeleton itself, it is possible to recommend a position that is slightly off the skeleton, such as plus or minus a few pixels away. Of course, choosing a point on the skeleton typically results in a good center position from which to start from when beginning label placement described below, and is therefore preferable.

Label Placement

The specifications to be followed in labeling soil survey maps have been defined by the Soil Conservation Service of the U.S. Department of Agriculture. In placing names, hydrographic features, labels and region boundaries are considered obstacles and must be avoided. For example, a label should not be placed on or in the gap of a hydrographic feature. A label must not be rotated if there is sufficient space to place the label horizontally. In case of vertical placement the label must be placed from bottom to top rather than top to bottom. If a label overlaps the boundary of the region, it must be placed in the neighboring region accompanied by a leader.

The following are label positioning specifications from the soil map finishing guide:

(1) If the region is a convex geometric shape, the label should be placed near the centroid.

(2) If the region is large, irregular, or very elongated, multiple copies of the label may be required within the region. "Large" is defined as being greater than 3 inches long in any direction. In broad regions, labels should be placed 3–4 inches apart. In narrow, elongated regions, labels should be placed 1.5–2 inches apart.

The following are label placement specifications from the soil map finishing guide:

(1) Labels should be placed horizontally in a straight line. Soil symbol labels tend to be short and of a fixed 6 Pt. News Gothic C/L font size. Proportional spacing is used. Kerning is not allowed. Descending characters are not used in labels.

(2) If the region is too small to accommodate a horizontally placed label, the label should be placed at an angle. Preference is given to angles nearer to zero (horizontal). Labels need not conform to the shape of the region.

(3) If the above two requirements cannot be met, the label must be placed outside the region with a short line, a leader, pointing into the region. The leader should be perpendicular to the soil boundary and centered across the boundary. The leader must cross the least number of boundaries possible.

(4) Labels cannot overlap hydrographic features, region boundaries, other labels or leaders.

(5) If a label is placed between a hydrographic feature and a region boundary, it should be placed as near to the hydrographic feature as possible. If the label is between two hydrographic features, it should be placed at equal distance from both hydrographic features.

(6) Labels are alphanumeric. The first character is always a capital letter but the remaining ones need not be capital.

It should be appreciated that while the present invention is illustrated in a preferred embodiment using soil survey maps and criteria developed by the U.S. Department of Agriculture, other criteria for other types of maps can be used in accordance with the present invention.

The label positioning and label placement processes interact with one another during the labeling of a map mostly through data structures. Unlike label positioning, label placement is concerned only with a local area of the region. Preferably, the local areas are obtained from a pixel array of the region and the output is stored in files which can later be used for display purposes on a display such as a computer monitor.

The local area search carried out during label placement uses a modified version of the distance transform referred to as a "horizontal distance transform" described in more detail below.

Referring now to FIGS. 14–21, for each recommended or appropriate label location specified by the label positioning step, a small, rectangular placement window 140 is opened around the recommended location 141 of region 143. Placement window 140 can be described in array form by a local placement search array ("LPS array") such as LPS array 150 of FIG. 15, which preferably is approximately 200 pixels by 200 pixels in size, or about 0.5 inches×0.5 inches at the chosen resolution. The recommended location found in the label positioning step above determines the center of the window. All the pixels belonging to the region of interest are 1-pixels (pixels of value 1) while pixels belonging to neighboring regions are 0-pixels (pixels of value 0). Pixels representing hydrographic features or other labels are considered as obstacles which the label placement must avoid, and are denoted by dots 171 and 211 of FIGS. 17 and 21, respectively.

Figure 18:
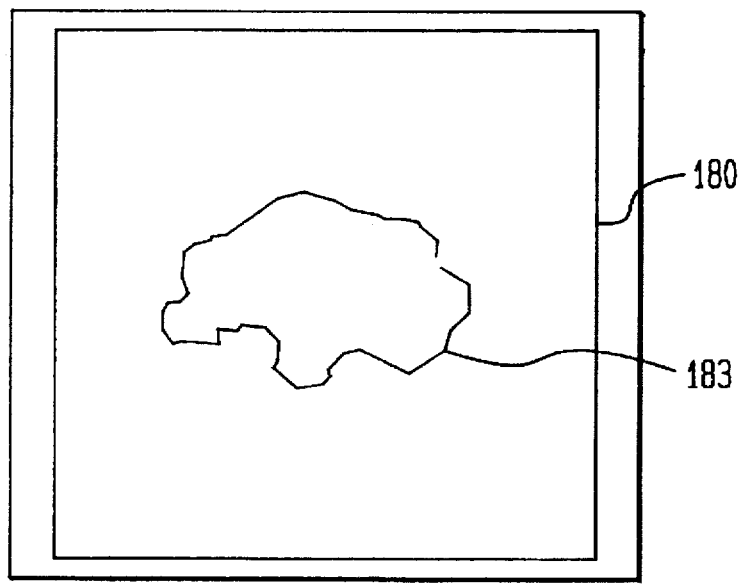
FIG. 18 shows a placement window fully containing a region.
Figure 19:
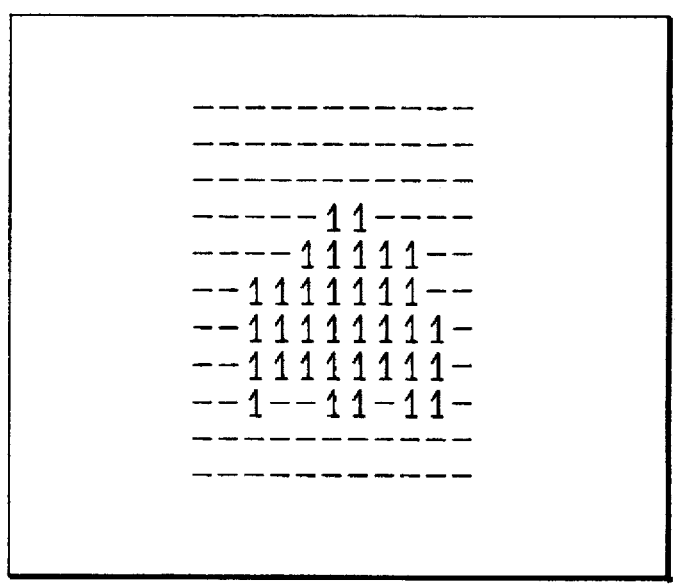
FIG. 19 shows an LPS array for a placement window fully containing a region.
Figure 20:
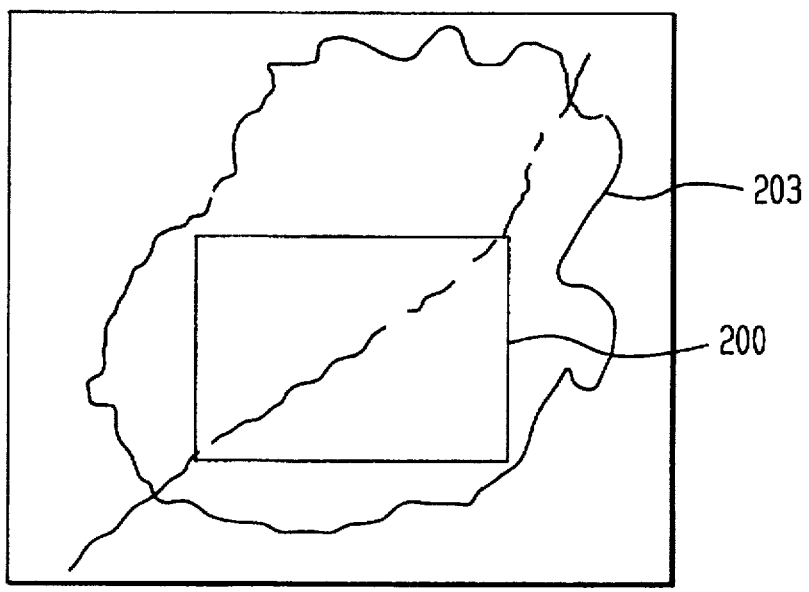
FIG. 20 shows an LPS window entirely within a region.
Figure 21:
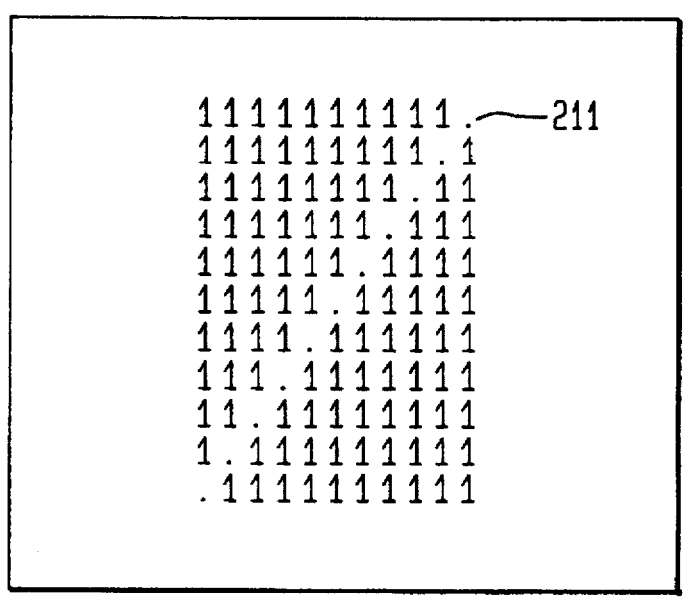
FIG. 21 shows an LPS array for a window entirely within a region.

As shown in FIG. 18, sometimes the region of interest 183 is so small that it can be fully accommodated in the window 180. In other cases, as shown in FIG. 20, the region 203 may be bigger than the window 200.

Since the label placement procedure is localized, information on the region is required locally. This means that the window needs only a part of the entire region. Each region has its own region record which contains all the relevant information about the region required during processing. The region record includes the extents of the region and any label information generated by the label placement process. The record of each region is stored in memory until the map is completely labeled. The records are stored in a record file and the fields of the region record contain: (1) the X coordinate of the label after placement; (2) the Y coordinate of the label after placement; (3) the recommended X location; (4) the recommended Y location; (5) the angle at which the label is to be placed; (6) the font size of the label; (7) a "flag" to indicate whether or not placement was successful; and (8) the total number of characters in the label.

A label record is also used, which comprises a packet of data sent back and forth between the label positioning and label placement routines. The label record contains the recommended location, final location, orientation and a flag indicating whether or not placement was successful. The fields of the label record include: (1) the area of the region; (2) the length of the region boundary (perimeter); (3) the X and Y extents of the region; (4) a list of adjacent regions; (5) the name string attached to the region; (6) offsets of the region; and (7) file names of the region.

A site list file is generated by the label placement procedure and consists of an output file which contains the x coordinate, y coordinate and label. Preferably, the x and y coordinates are specified in terms of absolute map coordinates in UTM (a unit in meters). Depending on the type and version of map plotting program used, there may be a seraprate site list file for each angular orientation, or there may be only a single side-list file, within which the orientation of each label is explicitly specified.

Figure 22:
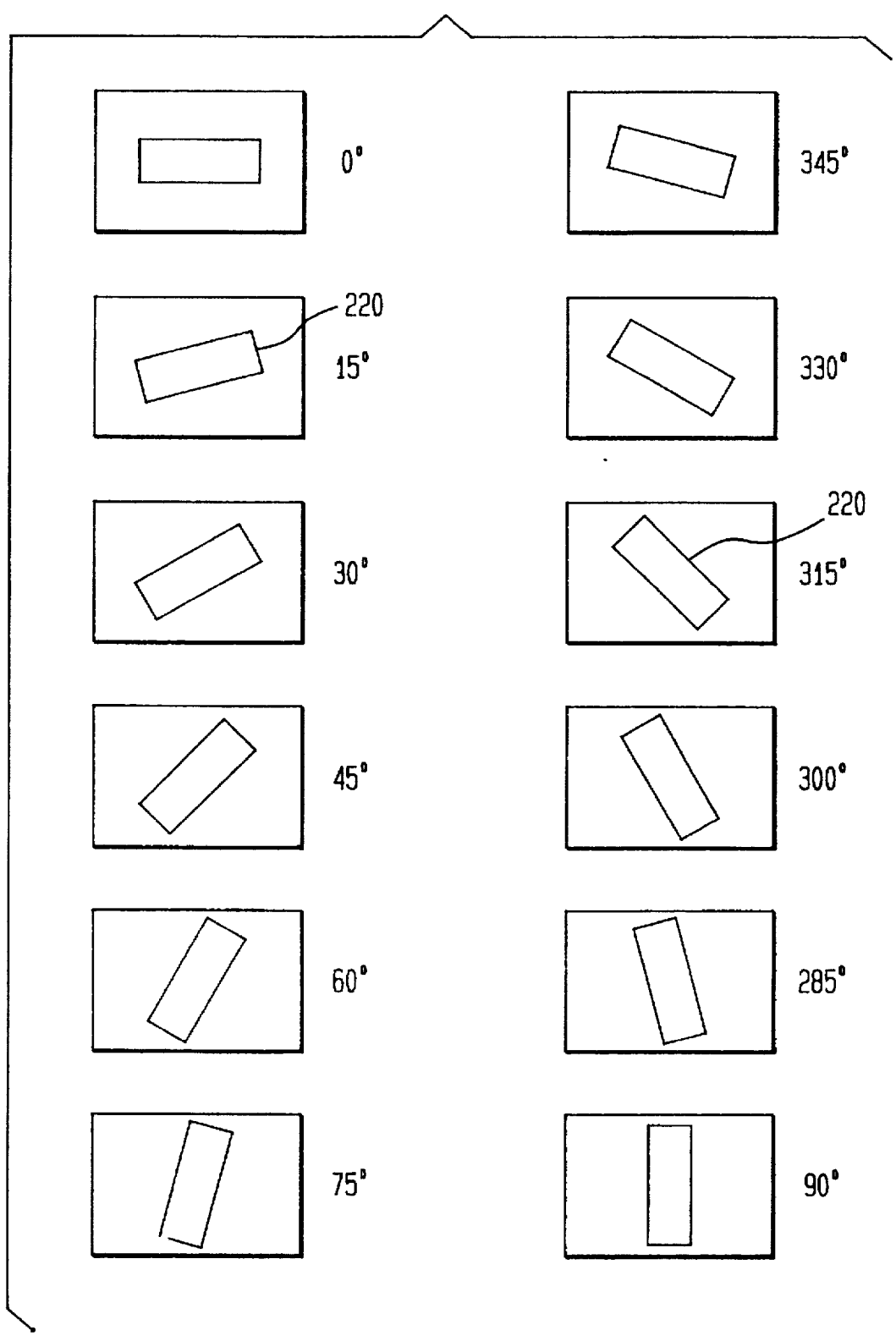
FIG. 22 shows a number of possible templates used in the label placement method of the present invention.

Associated with each region is a label of alphanumeric characters, which are preferably stored in square pixel arrays which are called templates. The length of the label in characters and angular orientation in degrees or radians is known a priori. It is possible to make use of this information to do some precalculations and save time. For soil maps, there are 12 orientations for each label, as shown in FIG. 22, because labels can be placed in only the first or fourth quadrants. The numbers adjacent each template 220 indicate degrees in a counterclockwise manner. The label length according to soil map guidelines can vary from 1 to 6 characters. Therefore, 72 templates (12 angles, each of 6 lengths) can be stored in memory preferably as arrays of 120 pixels×120 pixels. The label within the template is centered.

Figure 23:
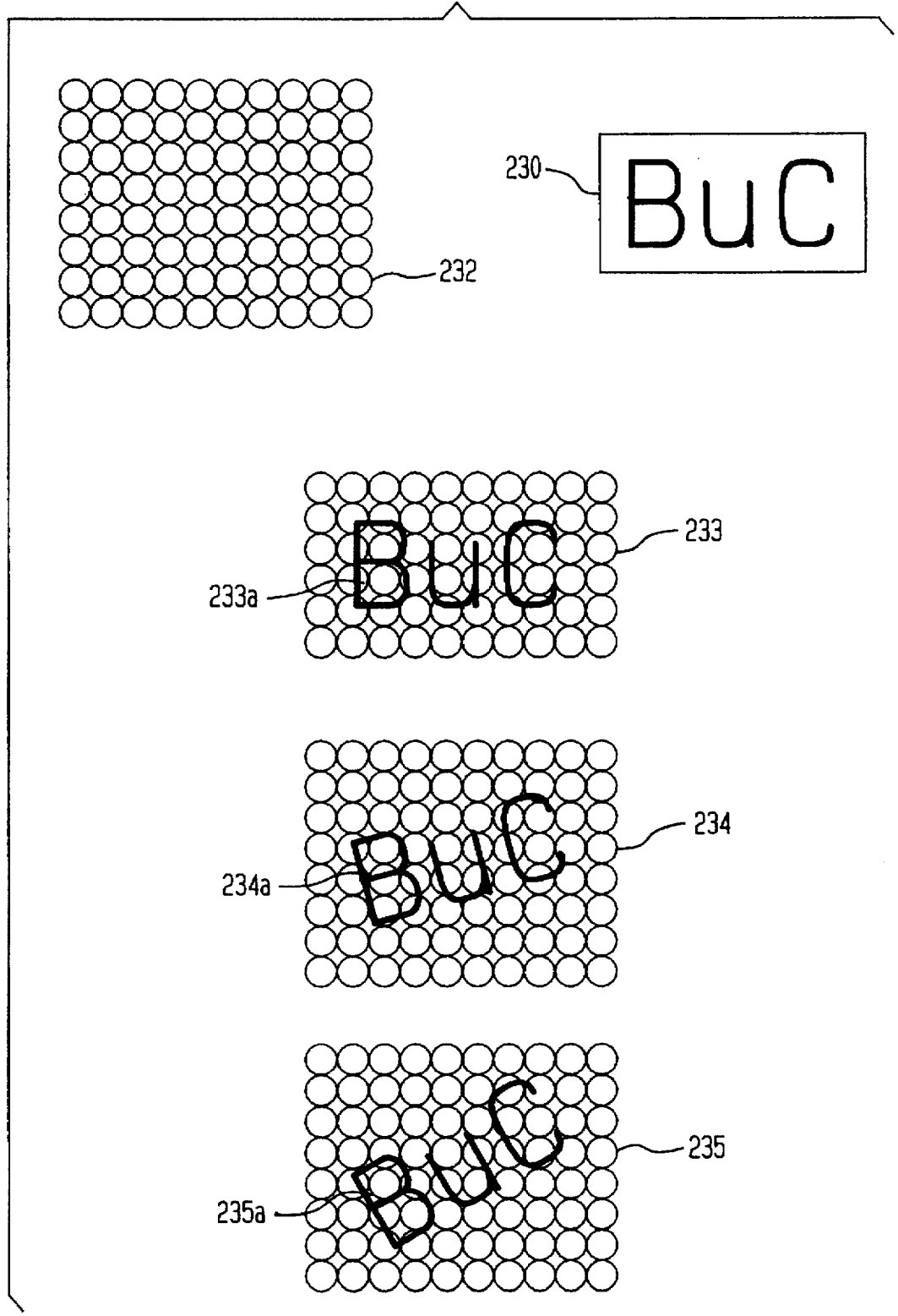
FIG. 23 shows several templates described at a pixel level.

Example templates are shown at pixel level in FIG. 23. Label 230 and pixel array 232 are combined to form templates 233–235. Those pixels which are completely or partially covered by the label, such as pixels 233a–235a are required to place that label. From the templates, it is possible to know how many pixels are required to insert a label of given length at a particular orientation. However, many pixels need to be compared. The number can be reduced by generating a length-offset linked list by starting from the bottom row as follows:

Step 1. The bottom row is set at offset zero.

Step 2. Note the length of active pixels needed in the bottom row.

Step 3. Move one row upward and note the length of that row.

Step 4. If the leftmost pixel of the current row is to the right of the leftmost pixel of the bottom row, the offset is positive, otherwise it is negative.

Step 5. If there are more rows, go to Step 3.

Step 6. Stop.

Figure 24:
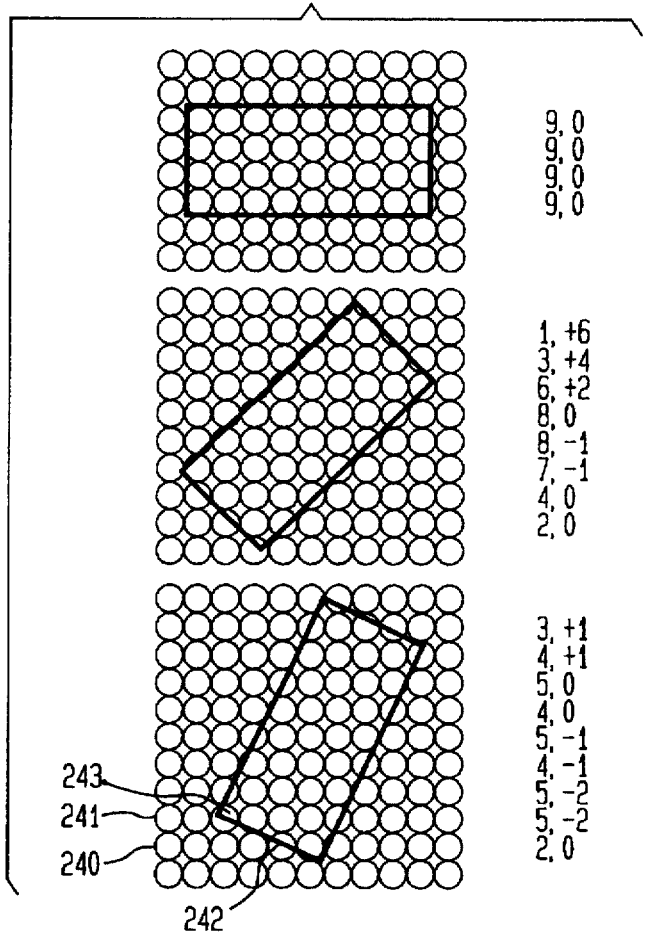
FIG. 24 shows several examples of length-offset linked lists.

The linked list generated from the above steps is called the Length-offset linked list and is illustrated in FIG. 24. For example, row 240 can be described as (2, 0), when 2 represents the number of necessary pixels and 0 represents the offset from the bottom left most pixel 242. Likewise, row 241 can be described as (5, −2) since 5 pixels are required for this row and the left-most pixel 243 is offset −2 from the pixel 242.

Figure 25:
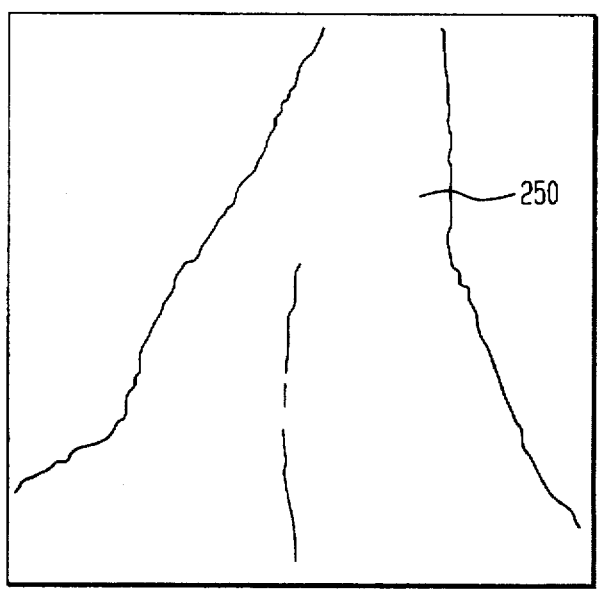
FIG. 25 shows a placement window containing a portion of a region with a hydrographic feature.

The horizontal distance transform is derived from the distance transform. The distance transform gives the distance from the nearest 0-pixel (pixel of value 0) in any direction. Unlike the distance transform, the horizontal distance transform applies only in the x direction and gives the distance from the nearest 0-pixel in the horizontal direction, as shown in FIGS. 26 and 27, where FIG. 27 illustrates the horizontal distance transform of the region 250 shown in FIG. 25.

Figures 26, 27:
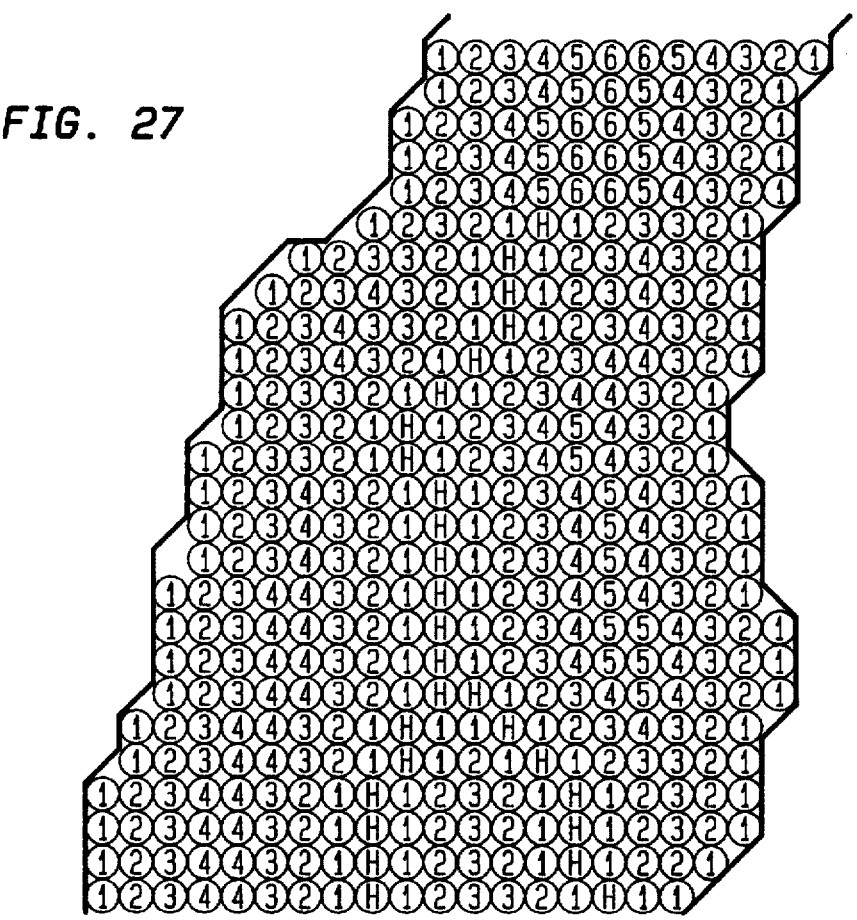
FIG. 26 shows the application of a horizontal distance transform to a region with a hydrographic feature.
FIG. 27 shows another application of a horizontal distance transform to a region with a hydrographic feature.

The computation of the horizontal distance transform is carried out row by row as shown in FIG. 27 where the hydrographic feature pixels 271 are denoted by "H". The steps the carried out are as follows:

(1) Select a row.

(2) Move from left to right, beginning with a count of 1.

(3) Store count in pixel, shift right and increment the count.

(4) Repeat the above step until the right boundary is reached.

(5) Again initialize count to 1 and move from right to left.

(6) Store count in pixel, shift left and increment the count.

(7) Repeat the above step until the value of the count is equal to or would exceed a stored pixel count.

If there is a pixel corresponding to a hydrographic feature in-between, then the horizontal distance transform is computed separately for each disjoint group of pixels, as illustrated in FIG. 27.

The horizontal distance transform gives the distance to the nearest boundary in either the left or right direction, and the-highest-valued pixel within any row will mark the central position for that row. A pixel value of 9, for example, indicates that there are at least 8 pixels to the left and right of the pixel which are available for label placement; that is, at least a horizontal pixel run of 17 pixels. Information about the lengths and offsets of the set of horizontal pixel rows of a template are stored in the length-offset linked list as described above. The length-offset linked list for a template describes a pattern which is just large enough to accommodate the predefined length label at a given orientation.

To achieve label placement, the LPS array is searched for a pattern that equals or exceeds that of the length-offset linked list of the template. The advantage of using a horizontal distance transform is that the total number of comparisons required is greatly reduced and that placing the template centrally, in a horizontal sense, is greatly facilitated. Instead of making a comparison for every pixel, one needs to check for only a few pixels indicated in the length-offset linked list.

The label placement procedure preferably does not shift the label beyond a certain range, which determines the size of the window surrounding the recommended location. The so-called "library" of templates is available a priori. The region record provides information about the length of the label and, subsequently, about the applicable templates. A search is performed within the window to find the actual placement location. A search for placing a horizontal label template is carried out before any angular label template is considered and continues until a successful location is found or all options are exhausted. If a suitable location is found, the procedure terminates. Otherwise the region of interest does not contain enough space to place the label. The label must then be placed in the neighboring region, together with a leader as described in more detail below. The procedure is repeated for all the recommended locations in the position's list, as shown in FIG. 28.

Figure 28:
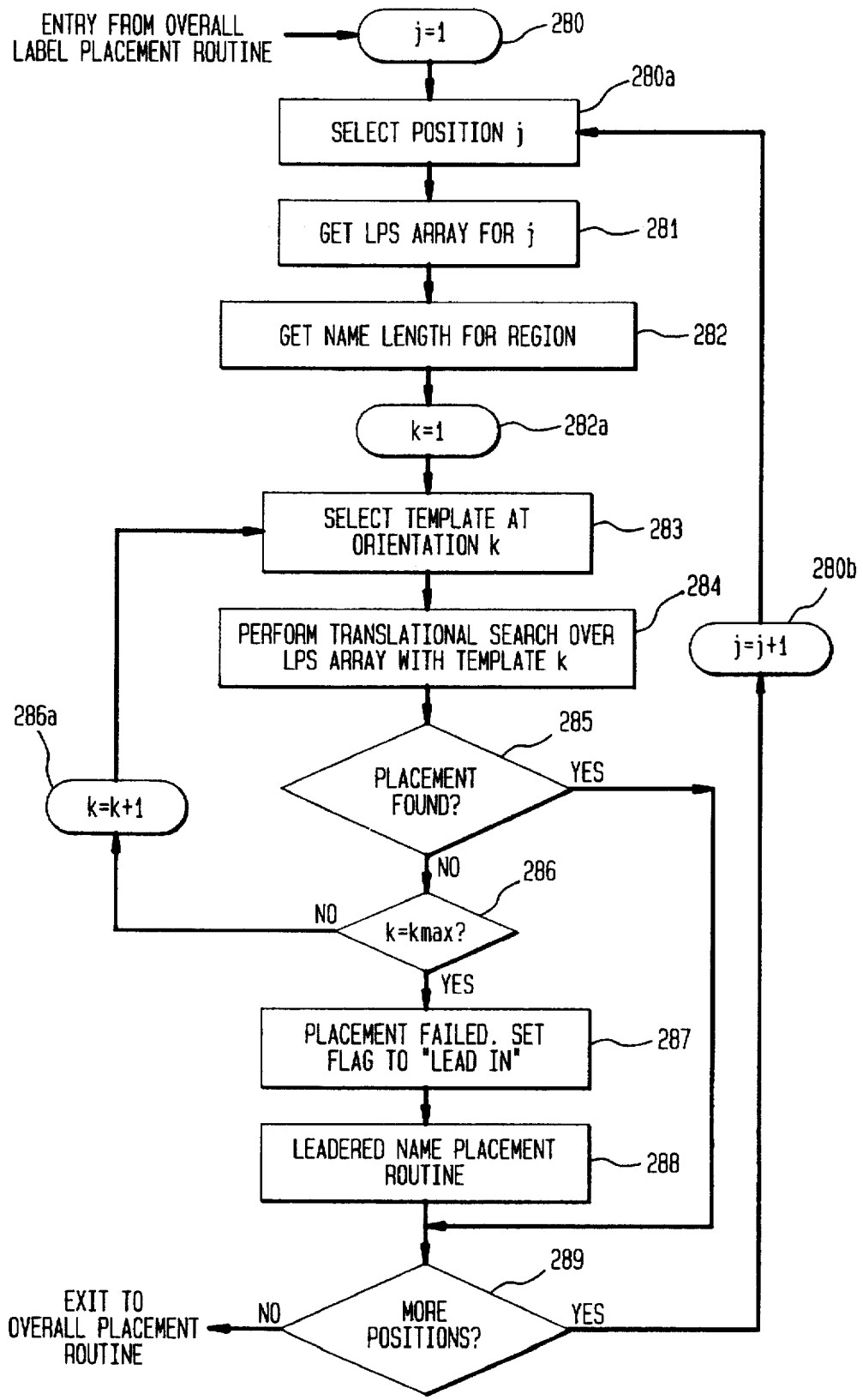
FIG. 28 shows a flow chart of the general label placement procedure in accordance with the present invention.

Referring to FIG. 28, a flow chart for the label placement process is illustrated. First, at step 280, an incremental counter j representing a possible label position is set to 1, then at step 280a position j is selected for attempted placement, and j is advanced to j+1. Next, at steps 281 and 282, the LPS array for position j and label length for the region are retrieved. Counter k, representing a given template, is then set to 1 in step 282a and a template at orientation k is selected at step 283. Next, a transitional search over the LPS array associated with template k is performed at step 284, and if placement is found at step 285, the next location is then selected for label placement at step 289. If placement at step 285 is not found, and there are still templates available (step 286), then a different template is tried at steps 286a and 283. If placement fails, a flag is sent to "lead in" at step 287 and the leadered name placement routine, discussed below, is initiated at step 288.

The computations which are independent of the map to be labeled can preferably be carried out before the actual placement begins. With soil maps, the label length varies from 1 to 6 characters and the standard font size is 6 point Gothic News. Since the length and font size are fixed, the label templates can be preprocessed and stored in memory. The angles for the labels can belong to only the first and fourth quadrants, and be limited to integer multiples of 15 degrees, reducing to 12, the number of angles to which a label can be rotated. The angles are selected at a discrete interval of 15 degrees because this is sufficient to meet the requirement for soil survey maps. The conversion of label templates to length-offset linked lists is also carried out. The length-offset linked list reduces the total number of checks to be made to find a suitable position.

Figure 29:
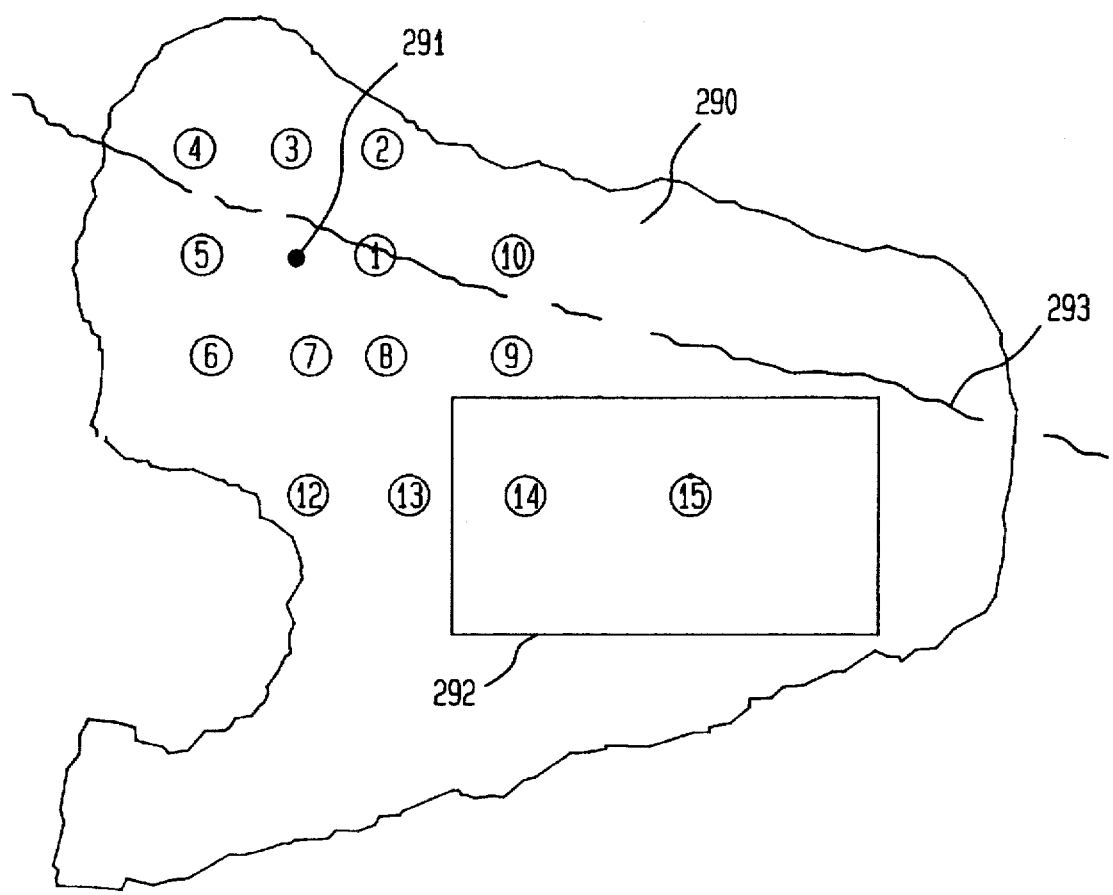
FIG. 29 shows a representation of a spiral search performed within a placement window procedure in accordance with the present invention.

The label placement procedure searches for an actual location as near as possible to the recommended location during the search. To accomplish this, preferably, the direction of search is selected to spiral outwardly. It should be appreciated that other search strategies can be used, such as searching in concentric circles or squares of progressively increasing size centered about the recommended location. For the spiral search, every time a new search is initiated, the search begins from the recommended location. For the first time, the search is carried out for horizontal label placement; i.e., with the label at angle 0 degrees and beginning from the recommended location. If a suitable location is not found, the search is repeated for a different angle starting from the recommended location. For every angle, the search continues only within the square window. As soon as the search goes out of the square window, it means that the label cannot be placed at that angle. The spiral search is depicted in FIG. 29, which shows the initial recommended location 291 for region 290, spiral positions 1–15, hydrographic future 293 and label template 292. During the search, all the locations outside the region of interest, such as location 11, are preferably skipped.

Figure 30:
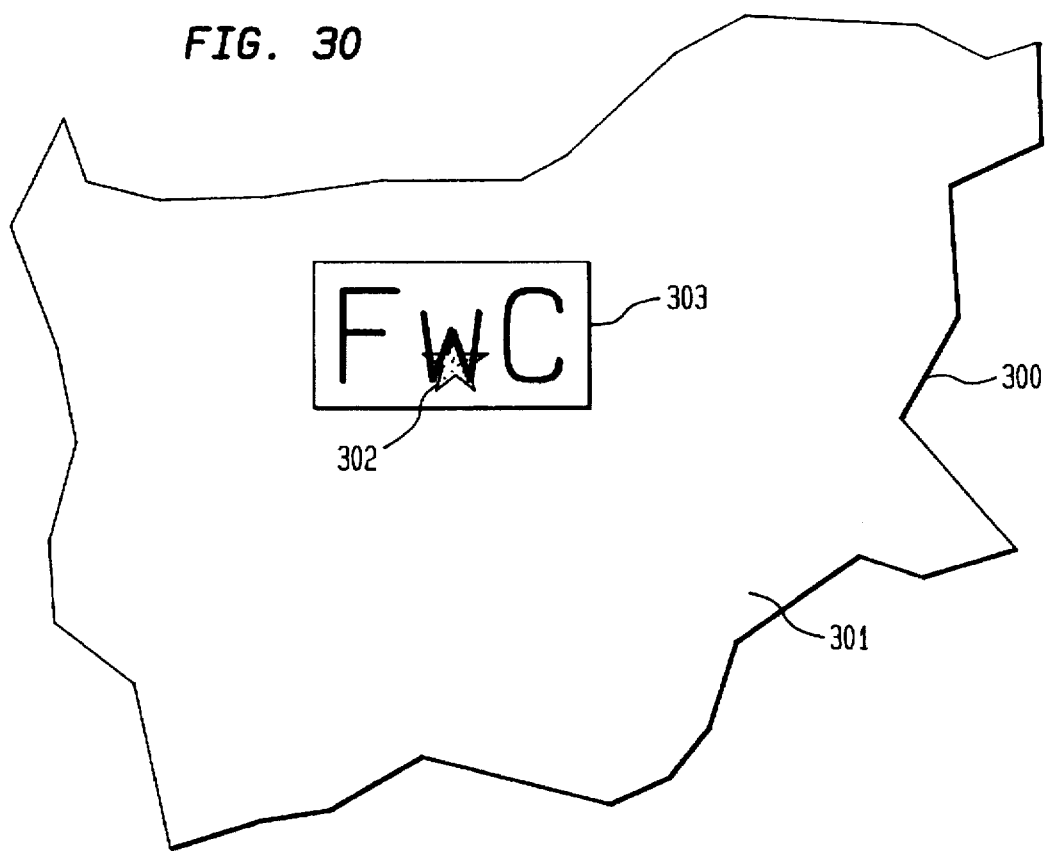
FIG. 30 shows a successful internal label placement without shift in accordance with the present invention.

The horizontal distance transform is applied to the binary array passed to the label placement procedure. The horizontal distance transform gives an idea of the number of pixels that are unclaimed and assists in the search because the total number of comparisons between the LPS array and the length-offset linked list are reduced. If the label can be placed within the region, it is referred to as internal label placement. Internal label placement can be either horizontal or at an angle. Initially, attempts are made to place the label horizontally i.e., oriented at zero degrees. Only if horizontal placement is not successful is a label placed at an angle. In many cases the recommended location is suitable to place the label. If the space around the recommended location is sufficient to place the label horizontally then the search terminates. The actual location then becomes equal to the recommended location. This is shown in FIG. 30, where the star 302 indicates the recommended location for region 300. Since the space 301 around the recommended location 302 does not contain any obstacles, such as region boundaries, hydrographic features or other labels, the label 303 can be placed at the recommended location.

The positioning operation does not consider the possible presence of obstructions like hydrographic features, other labels or region boundaries. It is possible that the recommended location may fall on an obstacle. The placement operation then performs the necessary fine adjustment to avoid the obstacles. If there is sufficient space in the region to place the label horizontally but only after translation, a search begins from the recommended location in a spirally outward manner. If the pixels in the label template have at least one pixel overlapping the obstacle, the label cannot be placed. As soon as all the pixels marked in the label template avoid the obstacles, the search terminates.

Before beginning the label placement step, a label position refinement step is preferably used. In this step, each approximately label position is processed an adjusted to determine a final label location and orientation that is free of overlap with map features or other labels, and conforms to applicable label placement specifications and conventions.

The first step in this refinement process is to refine process is to refine the approximately label position, by centering a small window (such as a ½"×½" region) at each approximately label location and determining the distance from the center of said window to the nearest point on the region boundary. In creating this window, more distant from the boundary than the center, is selected as the "ideal point" for the label's position. Thus, when the label placement process begins, it first attempts to place the label at said ideal position, and only begins the spiral search around the ideal location for a feasible placement location if the initial position is found not to permit overlap-free placement.

A sample search is shown in FIG. 29. The numbers as placed indicate the order of the locations in which the search was carried out. Certain locations, such as location 11, were skipped because they were outside the region of interest. Location number 15 was finally selected.

Figure 31:
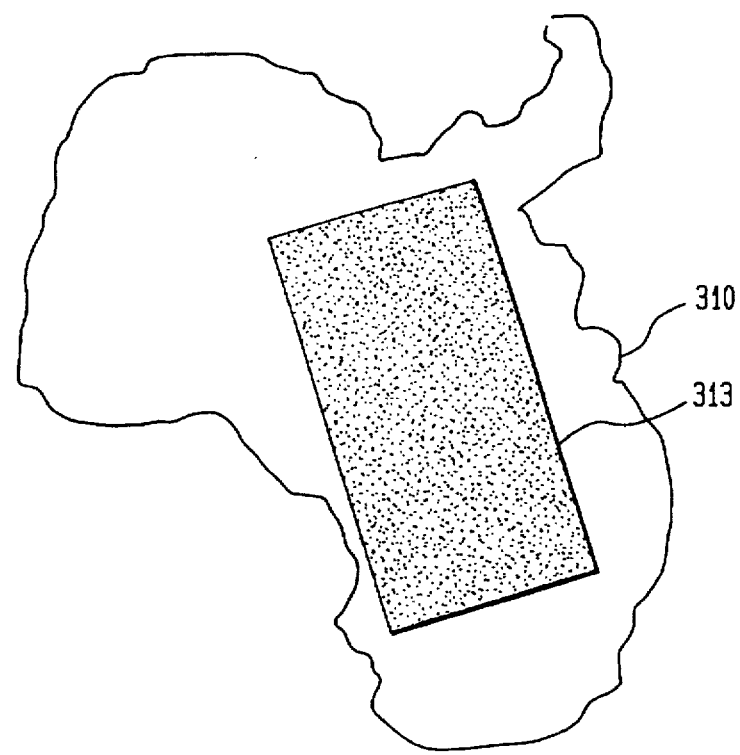
FIG. 31 shows a successful internal label placement with translation and rotation in accordance with the present invention.

Narrow regions or the presence of obstacles may require that a label be rotated before it can be placed. When all possible horizontal placements are exhausted without finding a suitable location, labels are tried at various angles. These angles can only belong to first and fourth quadrant. If a label cannot be placed horizontally, angles closer to zero are preferred over angles further away from zero. For this reason label templates are tried in a particular sequence. The soil map guidelines prefer near to horizontal placement even though the placement may be further from the recommended location than some angular placement near the recommended location. Angular placement is illustrated in FIG. 31, in which label 313 is located at an angular placement position within region 310.

Figure 32:
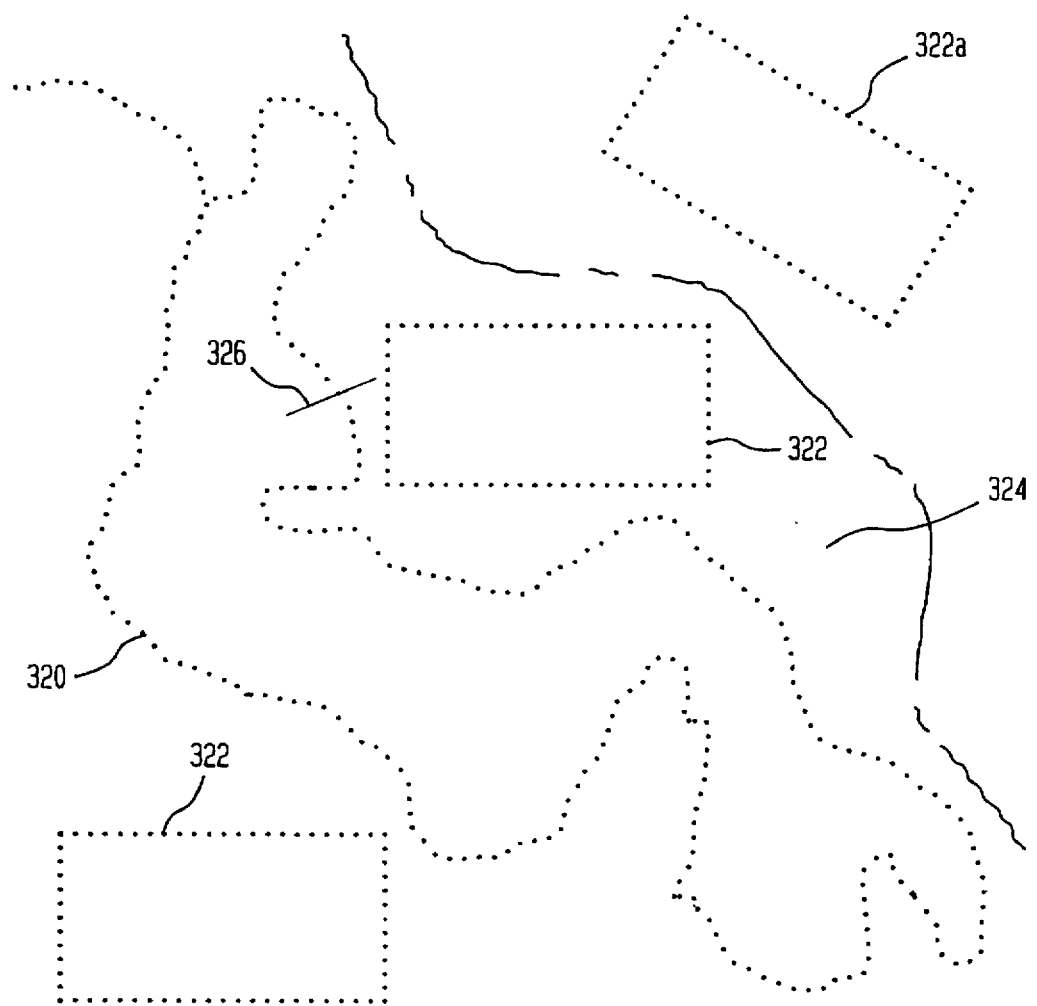
FIG. 32 shows a successful external label placement with leadering in accordance with the present invention.

Referring to FIG. 32, when a region 320 is too small to accommodate the label 322, the label is placed in the neighboring region 324. Since the label is placed external to the region, the placement is referred to as external label placement. When a label is placed in the neighboring region, information about the neighbors must be examined. If the neighbor has already been labeled, it will have internal labels 322a and perhaps also externally placed labels from some other neighbor. These placed labels act as obstacles to external label placement. In addition, since the recommended location is within the region but the label is to be placed in the neighboring region, the window around the recommended location for external label placement must be greater than the one used for internal label placement. The LPS array prepared for external label placement contains all the relevant information of the neighboring regions. The spiral search is similar to the search carried for internal label placement and a leader 326, a solid line of predefined length and thickness, is used to relate the label to its region, as shown in FIG. 32. The closest boundary of the region to the label is determined. The slope of the boundary is computed locally. The leader is placed approximately perpendicular to the boundary. After the slope is calculated, the point of intersection of the leader with the boundary is selected. The leader is then placed half inside and half outside the region.

Figure 33:
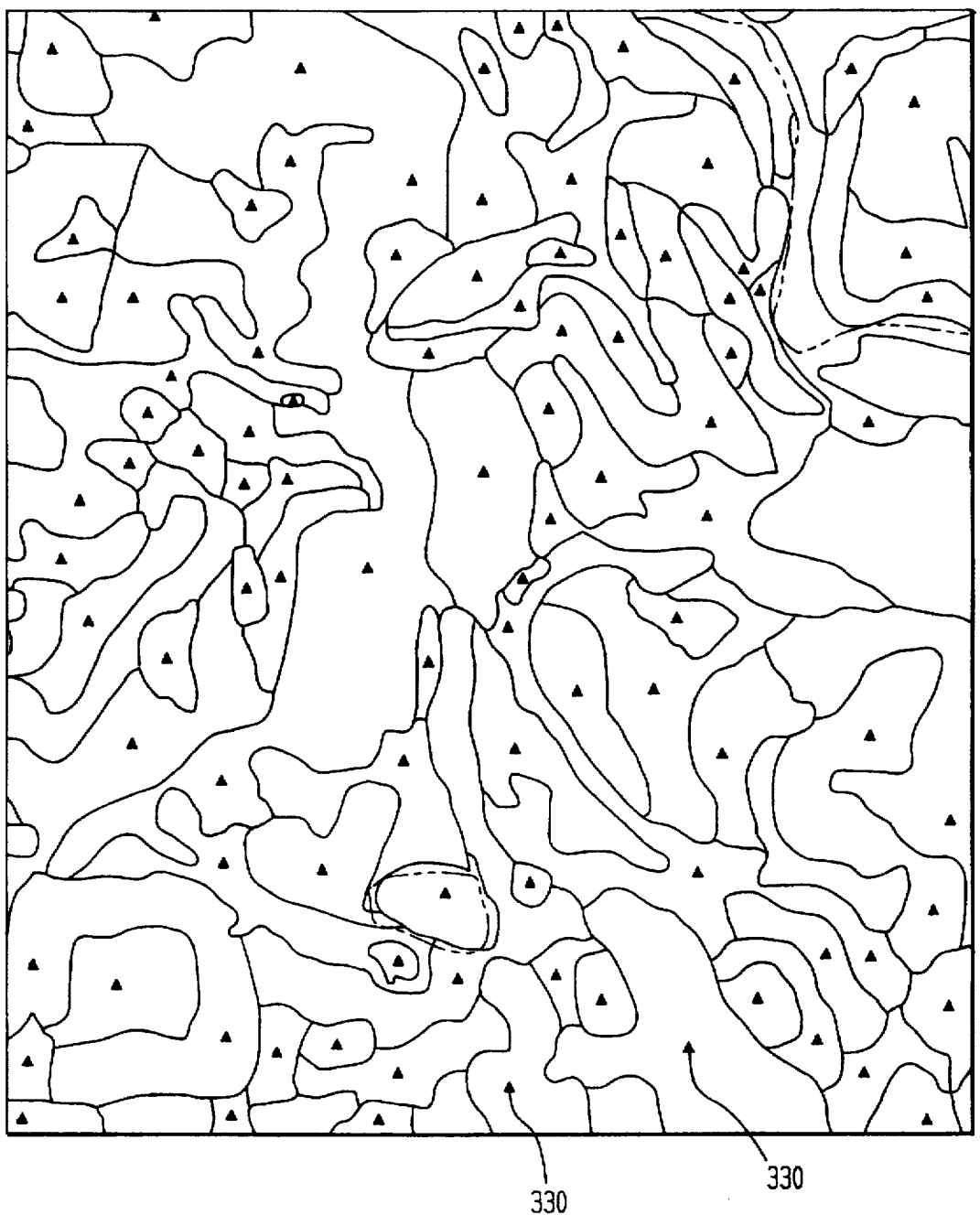
FIG. 33 shows a portion of a map showing approximate label positions.

The final output obtained after positioning and placement are illustrated in FIGS. 33 and 34. FIG. 33 illustrates the initial recommended positions 330 suggested by the label positioning method, while FIG. 34 shows the final positions 340 determined by the label placement method, abiding by the rules from the soil map specification guide.

Software which implements the label placement system was developed in a C/UNIX environment on a SUN SPARCv 2 and is listed at the end of this section.

Point Feature Labeling

Figure 35A:
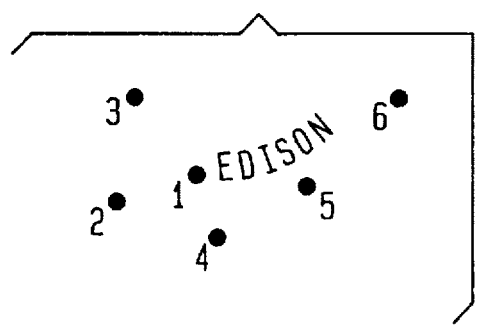
FIGS. 35a and 35b show labeling of point features with curved name placement.
Figure 35B:
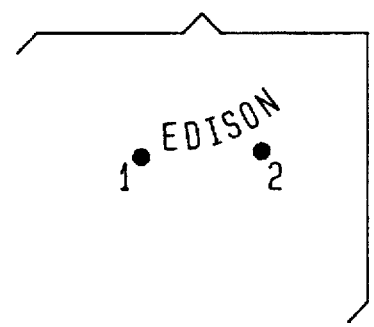

Not only is the present invention applicable to labeling region features such as those on soil maps, but it is also applicable to labeling maps with point features, such as cities. For point features, however, there is no need to first conduct a label positioning step since the recommended location would generally be at or near the point feature itself. Thus, point feature name placement becomes the crucial problem to address. Thus, one aspect of the present provides curved point feature name placement The advantages of curved point feature name placement of point feature can readily be seen from FIGS. 35a and 35b. In FIG. 35a, there are six points (labeled 1–6 which are very close to each other. Placing the name "Edison" (the label for point 1) horizontally results either in overlapping or in an ambiguity. Curving it, however, creates a prominent relation between the point feature name and the point. As shown in FIG. 35b, a slight curve in "Edison" helps to place it away from the other point 2.

The placement of the name for a point feature is a delicate process because, on one hand, the name should be placed close to the point so as to identify with it, and on the other hand it must be a certain distance away from the point so that it can be easily read and understood. In accordance with generally acceptable cartographic principles, there are two ways to preferably place a name near its point feature: horizontally and curved. For horizontal name placement, the name should be placed a small, fixed distance from the point feature. For curved name placement the arc of the name's curvature should begin from the horizontal. Curved name placement as described herein should be distinguished from names which are placed along curved grid lines of the map (such as latitude lines). As used herein, "curved name placement" refers to specially or separately curving the name in order to fit it within an area surrounded by obstacles or to improve ambiguous association among spaced point features, such as the curved point feature names shown in FIGS. 35a and 35b. Although horizontal and curved placement is preferred, names can also be placed at an angle to the horizontal without curving the name, if this is desired.

A set of rules for labeling a map exists which is generally accepted. However, depending on different properties oft map (e.g., density, scale, type), some of the rules might not be fulfilled. These rules are enumerated as follows:

(1) Names should be placed close to the point feature, but not so close that it gives the impression of overlapping with the point feature, and not so far from the point feature that it is not associated with the point feature.

(2) Names should not be spread out or split into two lines.

(3) Names should be placed horizontally or along the flow of latitude lines.

(4) The best position for name placement is to the right and somewhat above the point.

(5) Names placed to the right of the point feature should be given preference over names to the left of the point feature.

(6) "Titles" instead of "signatures" should be used where possible (i.e., names should be located above the point feature instead of below the point feature).

(7) Names of larger font size should be placed further away from the point feature than names of smaller font size.

Figure 36:
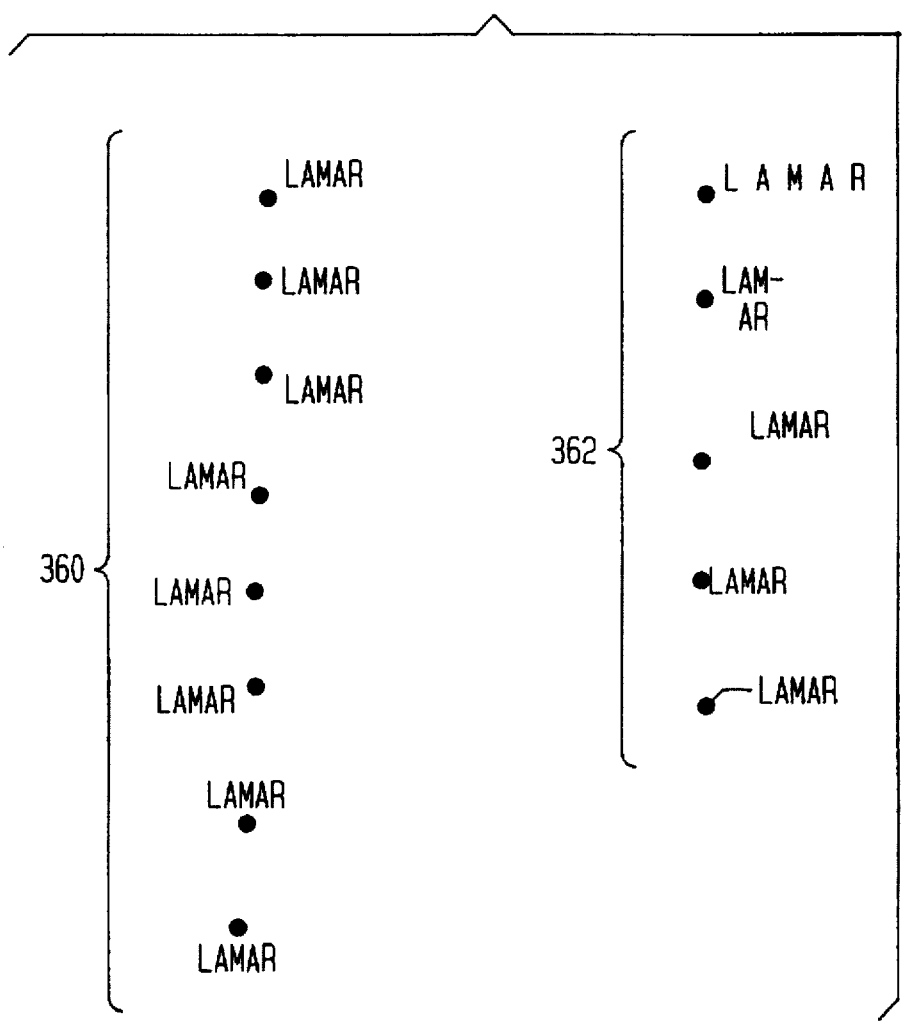
FIG. 36 shows desirable and undesirable name placement positions for a point feature.

These rules are illustrated in FIG. 36, which shows desirable name placement locations 360 and undesirable name placement locations 362.

Preferably, points and their names are represented by rectangular regions. A rectangular region is created around each point feature, each of which, on a given map, are fixed and free of overlaps. However, rectangular regions around names can be moved and rearranged until placed at the best possible location near the point so that no overlap occurs with any other rectangular region. The name regions can be horizontal or oblique, representing horizontal name placement and angled placement or curved name placement.

Figure 37:
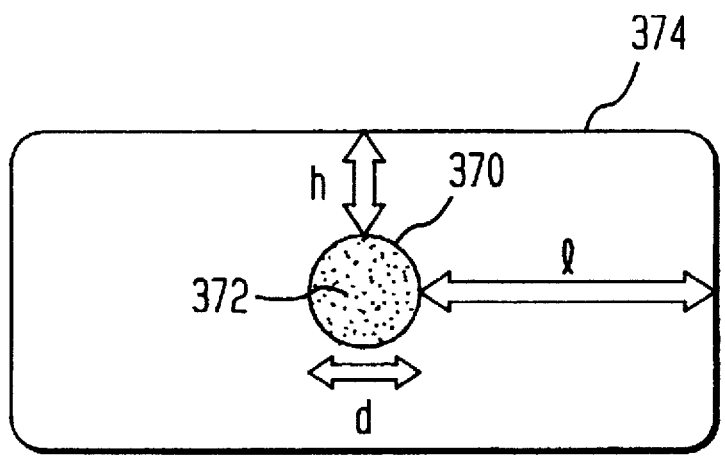
FIG. 37 shows a rectangular region around a point feature.

A name can be placed horizontally, either to the left, right, above or below the point feature. The name should not be so close to the point that it would overlap or give the impression of overlapping. Also, the name should not be too far away from the point feature; otherwise it will appear not share any relation with it. Referring to FIG. 37, to ensure an overlap-free name placement, and an appropriate distance between the name and point feature 372 is surrounded by an imaginary circle 370 of a given radius. The name is then placed tangent to it. The larger the point, the larger the radius of the circle. Given the size of the name, a quasi-rectangular region 374 in which the name fits is created around the point 370. This rectangular region is called the "main" rectangular region. Any horizontal orientation of the name fits within the boundaries of this rectangular region.

Figure 38:
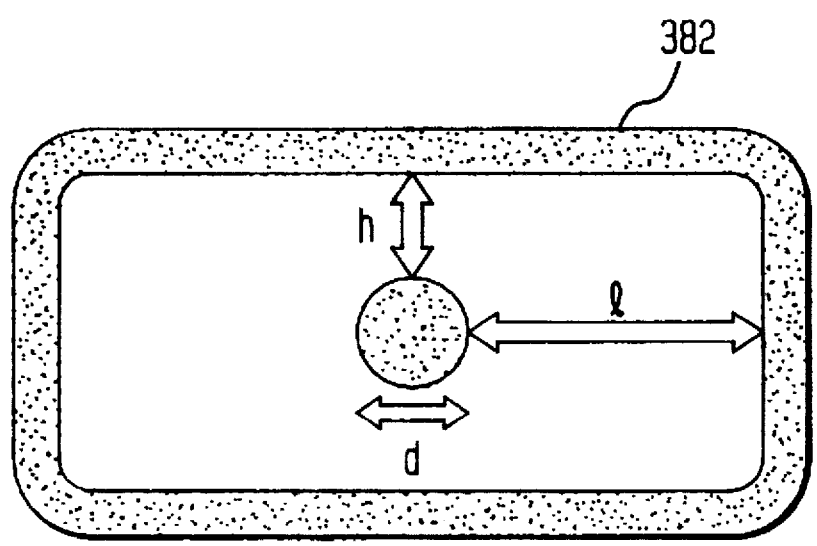
FIG. 38 shows a rectangular region around a point feature after adding a "cushion" in accordance with the present invention.

In order to remove any overlapping or potential ambiguity that may result when two points or names are very close to each other, a "cushion" is added around the rectangular region. This cushion, designated as 382, can be seen in FIG. 38, and represents an increase in the size of the rectangular region.

Figure 39:
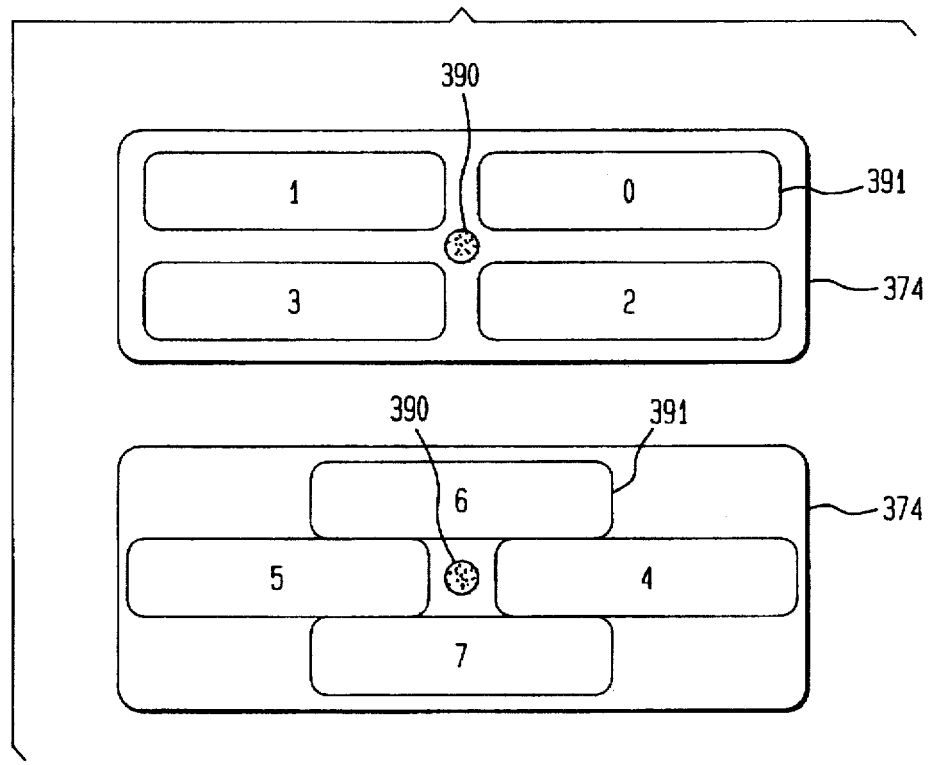
FIG. 39 shows eight possible positions for name placement about a point feature.

There are eight basic positions where a name can be placed, as shown in FIG. 39. Each position is represented by a rectangular region 391, and each region's size depends on the length and height of the name. These regions fit in the "main" rectangular region 394 and do not cross the boundaries of it. The order of (descending) priority for these places are right, left, top and bottom, i.e., positions 0, 1, 2, 3. This means that the name of point feature 390 is first placed at the right side of the point, then at the left, then at the top and lastly at the bottom. The best position is "0", which is to the right and a bit above the point. Less popular are positions "6" and "7" which are just above or below the point. Each position is given a cost value depending on its priority. The higher the priority, the lower the cost.

Two kinds of overlaps are not allowed: (1) overlap between two names, and (2) overlap between a name and a point feature. If the rectangular region of a position overlaps with any other such region (i.e., the rectangular region of a position of another name or the rectangular region of a point-feature), it is shifted in a direction away from the overlap and made into a new region with a new cost value. If the shifting results in moving it beyond the boundaries of the "main" rectangular region, then it is disregarded by changing its cost value to −99. A position with a cost of −99 is never a potential selection for name placement, thus, automatically avoiding overlaps.

Figure 40:
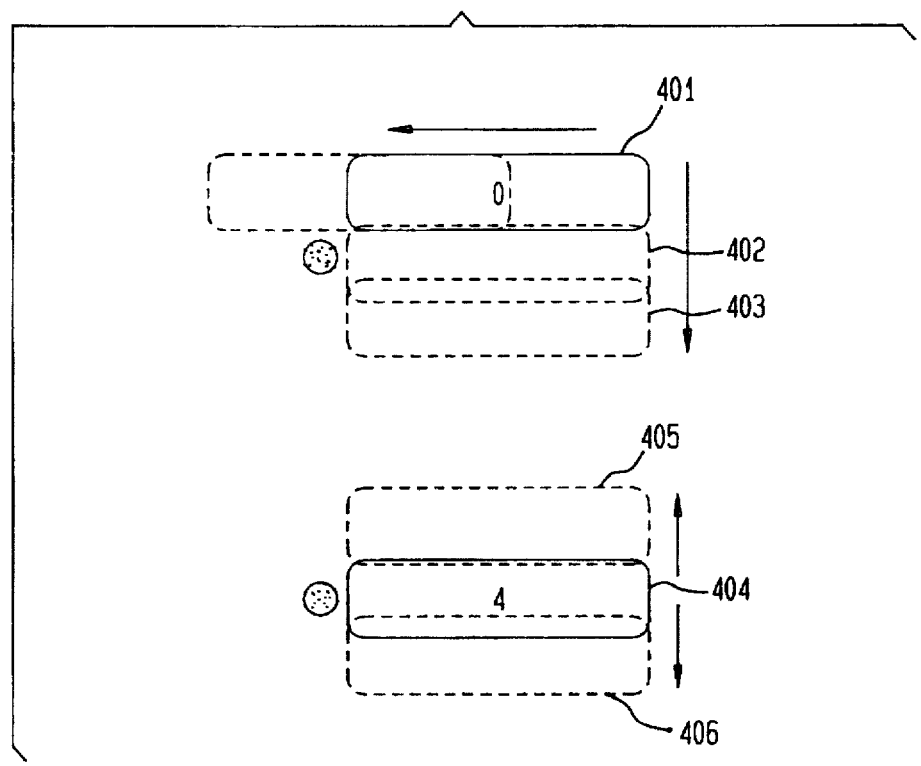
FIG. 40 shows the sliding of two of the positions shown in FIG. 39.

For example, as seen in FIG. 40, a rectangular region 401 of position "0" can be shifted down to positions 402 and 403, whereas the rectangular region 404 of position "4" can slide vertically in both directions to positions 405 and 406. Each position can slide in specific directions within the vicinity of its point. Different positions and a relative cost value chosen for each are listed in Table 4 below, where the arrow represents the direction in which the position is shifted.

TABLE 4

| Position | Cost |
|---|---|
| 0 | 1 |
| 2 | 2 |
| 4 | 3 |
| 1 | 4 |
| 3 | 5 |
| 5 | 6 |
| 6 | 7 |
| 7 | 8 |
| 0↓ | 9 |
| 2↑ | 10 |
| 4↑ | 11 |
| 4↓ | 12 |
| 1↓ | 13 |
| 3↑ | 14 |
| 5↑ | 15 |
| 5↓ | 16 |
| 6→ | 17 |
| 6← | 18 |
| 2← | 19 |
| 1↓ | 20 |
| 7→ | 21 |
| 7← | 22 |

Figure 41:
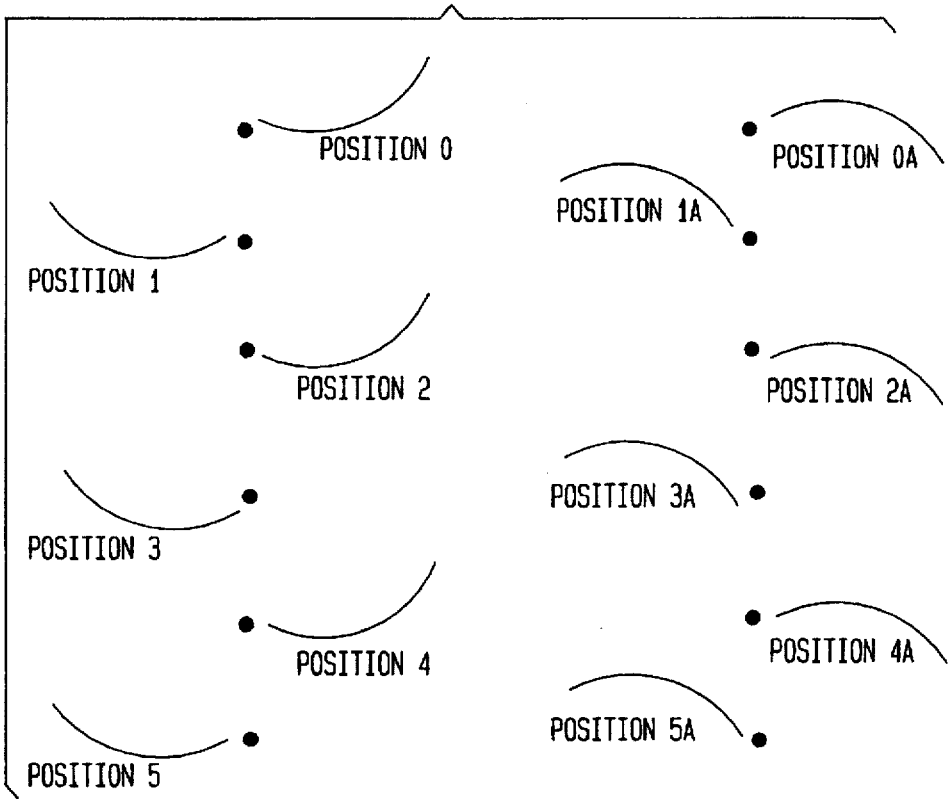
FIG. 41 shows possible concave and convex positions for curved name placement in accordance with the present invention.
Figure 42:
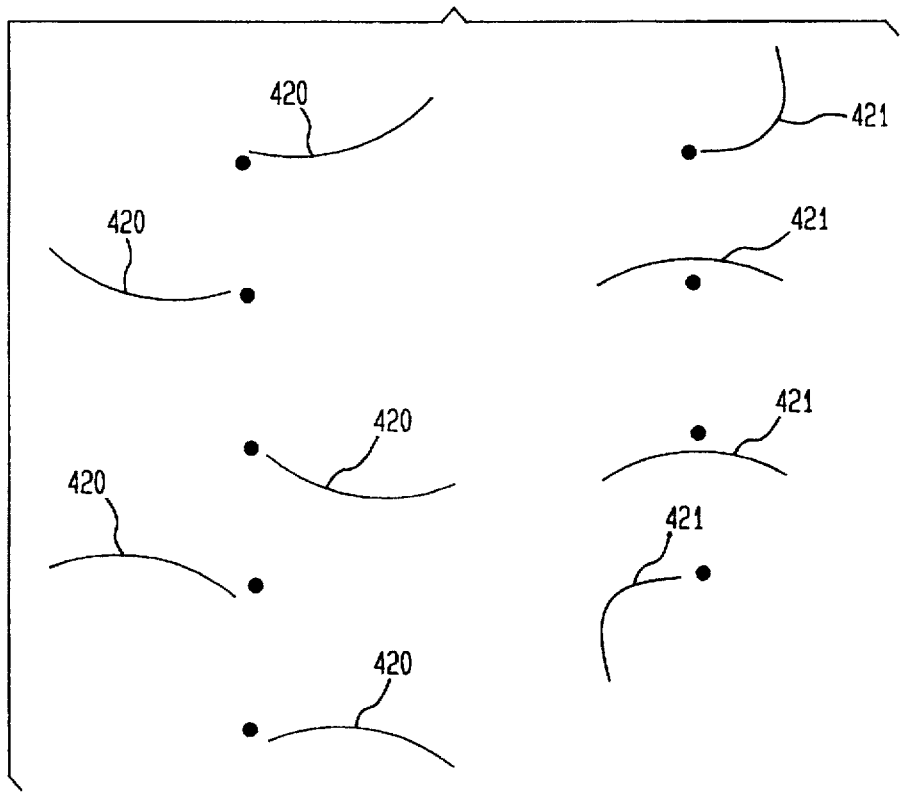
FIG. 42 shows desirable and undesirable curvatures near a point location.

If there is insufficient free space at a point feature to fit its name horizontally, the name is curved. Preferably, there are six positions near the point feature where a curved name can be placed. Three positions are at the right hand side of the point: "0", "2" and "4"; and three positions are at the left hand side of the point: "1", "3" and "5", as shown in FIG. 41. FIG. 42 shows some desirable curves 420 that can be used in maps and some undesirable curves 421 that are to be avoided. Acute curves and curves just above or below the point, which do not seem to represent the point clearly, are not acceptable.

Figure 43:
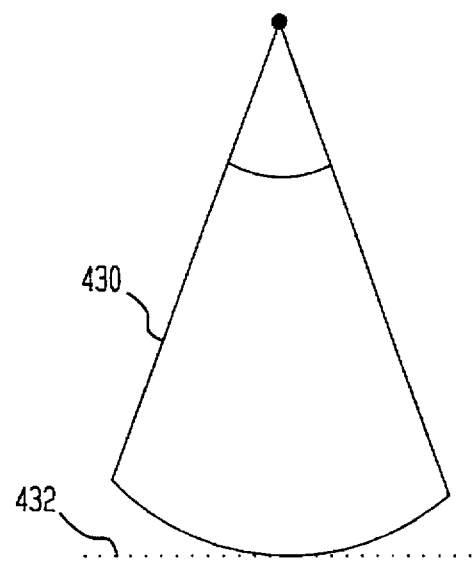
FIG. 43 shows an example of a selected curvature.

In order to create curved names that are aesthetically acceptable, a certain set of angles are preferably used for concave and convex curvature. The curvature angle preferably varies from 10 to 40 degrees for concave curves and from 335 to 350 degrees for convex curves. These curvatures are prioritized; curvatures at the positions to the right are given priority over those to the left. The angles of curvature are placed in angle tables and are selected according to the priority assigned to them. The following steps are executed for curving a name:

(1) Pick an angle and the position with the highest priority from the angle table.
(2) Calculate the total length of the name to be curved.
(3) Find the radius of curvature using the equation:

$$R\Theta_c = W$$

where R=radius of curvature, $\Theta_c$=angle of curvature in radians, and W=the width of baseline 432 of FIG. 43, i.e., the length of the name being curved.

(4) Execute the following steps for each character in the name as follows
   (a) Find the length and height of the character.
   (b) Create a rectangular region around the character.
   (c) Calculate the step angle, $\Theta_s$, by dividing the length of the character by the radius of curvature.
   (d) Let $\Theta_r = \Theta_s + \Theta_c$.
   (e) Rotate the rectangular region by angle $\Theta_r$.
   (f) Place the rectangular region for the next character at the end-point of this rectangular region, i.e., where the end-point is the lower right coordinates of the rectangular region
(5) Once all the characters are rotated, create two intersecting rectangular regions to contain the curved name.

(6) The first region will be from the starting point of the first character to the ending point of the middle character of the name, and the second region will be from the starting point of the middle character to the ending point of the last character of the name.

Figure 44:
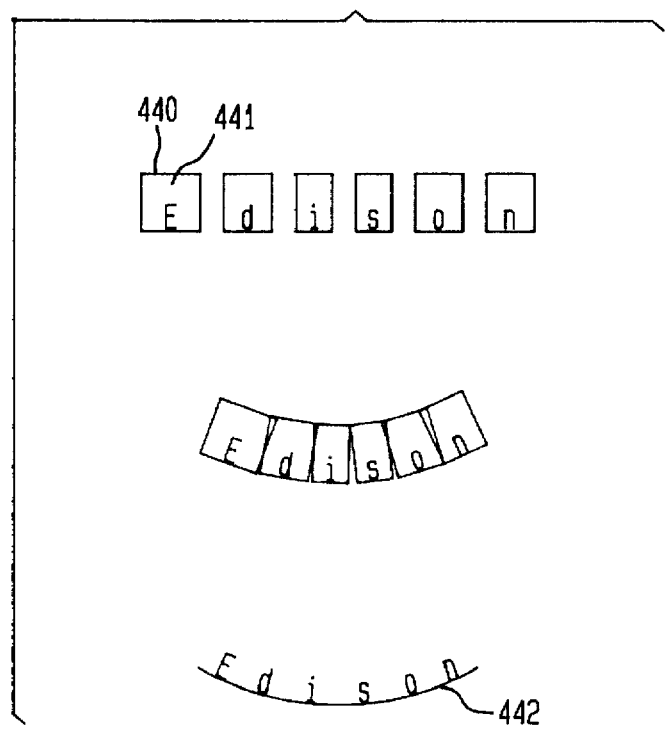
FIG. 44 shows an example of a curved name placement conducted in accordance with the present invention.

Examples of curvature and name curving are shown in FIGS. 43 and 44. After calculating the radius of curvature 430 and the rectangular regions 440 around each character 441, each rectangular region is rotated individually and fit it on the curve 442. The name "Edison" has 6 different characters, each of different width. The character "E" takes more space than the character "i"; hence, the angle of curvature for "E" is greater than that for "i".

Figure 45:
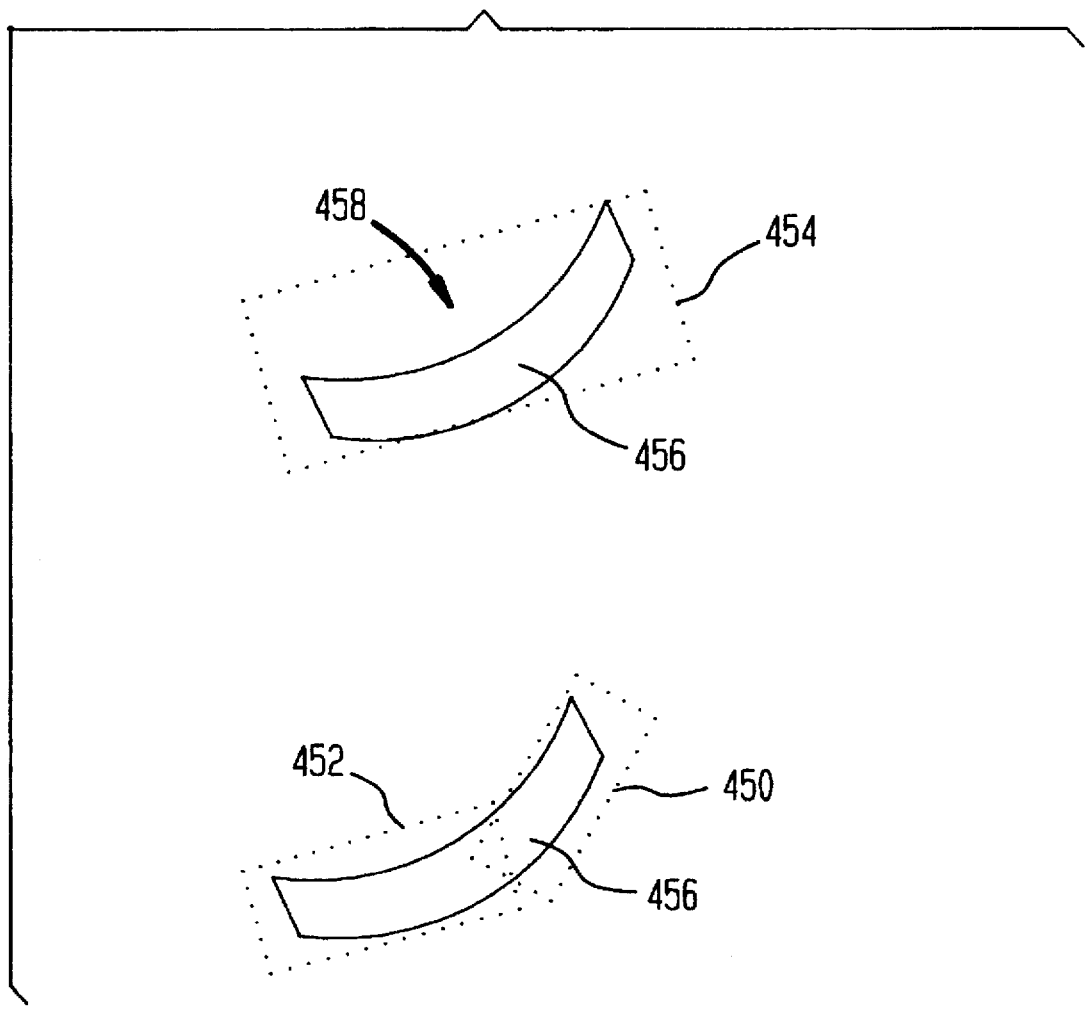
FIG. 45 shows the usage of two rectangles to contain a curved name in accordance with a preferred embodiment of the present invention.

As shown in FIG. 45, if only one rectangular region 454 were created to contain the curved name 456, a large mount of free space 458 would be consumed and the advantage of curved name placement would be lost. Therefore, the curved name 456 is preferably enveloped in two rectangular regions 450 and 452. Of course, this concept can be extended to use more than two rectangular regions to more precisely represent the curved name.

Preferably, there are three stages of the point feature name placement program, including (1) preprocessing, (2) name placement and (3) output file creation which are preferably implemented on a computer. Preprocessing requires reading different attributes of the point features, creating the rectangular regions for their name placement and grouping the points into different sets. These sets of points are read by the name placement procedure that applies the algorithm and produces a list of positions and angles of orientation for each name. This list is then send to an output file creation where output files are produced and maps are plotted.

Input to the program is preferably either be a combination of DLG and ATT files or a POINT file. A DLG file (digital line graph) consists of complete geographical information for a region. For point-feature name placement, the only portion of interest in this file is the set of point features, which are represented by lines starting and ending at the same node, where nodes are defined as points at which a line starts, ends or intersects. This file gives the index, unique for each point feature, and the x and y coordinates of all point features. An attribute (ATT) file consists of the name and classification associated with each point feature. Classification shows the type of a point feature; i.e., a town, city, capital etc. A POINT file is a file with all the information of point features; i.e., the index, x and y coordinates, the associated name, and the classification.

Two font sizes are preferably used in the name placement program, one to represent cities and another to represent towns. For each font size, the height and width of characters, and the radius of the imaginary circle around the point-feature are defined. Depending on the classification, the three variables are read and the coordinates of the "main" rectangular region around a point feature are calculated. Letting x=the x coordinate of a point, y=the y coordinate of a point, l=the length of the name associated with the point-feature, r=the radius of the circle around the point-feature, and h=the maximum height of a name, the coordinates of the rectangular region can be seen in Table 5 below.

TABLE 5

| Coordinates | Value |
| --- | --- |
| lower left x | x − l − r − cushion |
| upper left y | y − h − r − cushion |
| upper right x | x + l + r + cushion |
| upper right y | y + h + r + cushion |

Each of the eight positions for name placement occupies a rectangular region, and their lower left and upper right coordinates are calculated. Each position is given a cost value depending on its priority. If the coordinates of a point fall within the rectangular region of a position, the latter region is shifted away fore the direction of overlap, creating a new region with a new cost value. If, however, shifting results in moving the region beyond the boundaries of the "main" rectangular region, then the position is invalidated and its cost value is changed to −99. A position with negative cost is never chosen for name placement, which ensures that there will be no name labeling at that position.

Figure 46A:
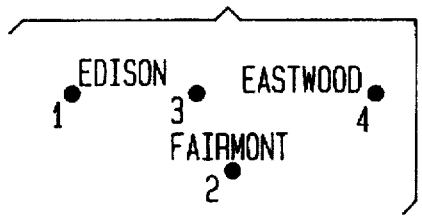
FIGS. 46a–d show the interdependency of point features on one another.
Figure 46B:
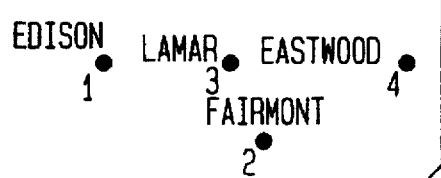
Figure 46C:
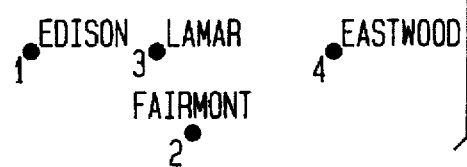
Figure 46D:
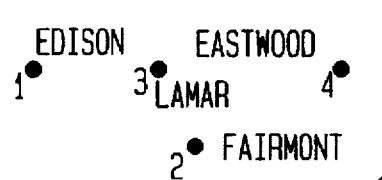

Name placement of a point feature greatly affects and depends on the name placement of its neighboring point features. This is illustrated in FIG. 46. Placements for points 1, 2 and 4 block off free space that was available for point 3. By moving any of the names of point 1, 2 or 4, a good amount of space is created for "Lamar"—the name for point 3—as shown in FIGS. 46b–46d.

Figure 47:
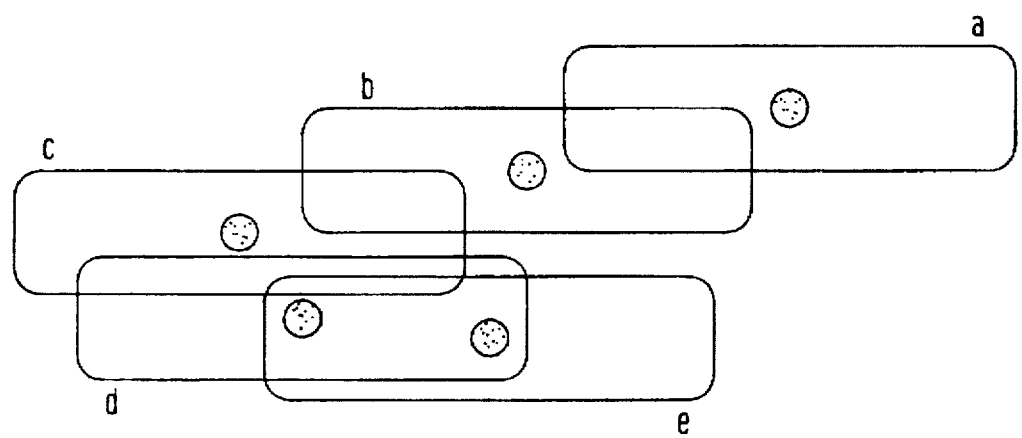
FIG. 47 shows overlapping rectangular regions which can be used to formulate an SCCL and GCCL in accordance with the present invention.

Every unsuccessful placement results in backtracking; i.e., if a name cannot be placed, one or more neighboring names are repositioned to create space for the name under consideration. To facilitate backtracking, points are preferably sorted in a list where each point has its neighboring point as a previous entry of the list. To accomplish this, points are sorted by ascending y coordinate. Points with overlapping rectangular regions are grouped together to form a Single Connected Component List (SCCL). Common points of single connected component lists are further grouped together to create a Group Connected Component List (GCCL). Each GCCL is thus a chain of points with overlapping rectangular regions such as regions a–e shown in FIG. 47. Here we have five points, a, b, c, d and e, with overlapping rectangular regions. There are five SCCLs, one for each point, and one GCCL created by points with common rectangular regions. For point a, the SCCL is b; for point b, the SCCL is a, c; for point c, the SCCL is b, d, e; for point d, the SCCL is c, e; and for point e, the SCCL is d. The GCCL is merely a-b-c-d-e.

Figure 49:
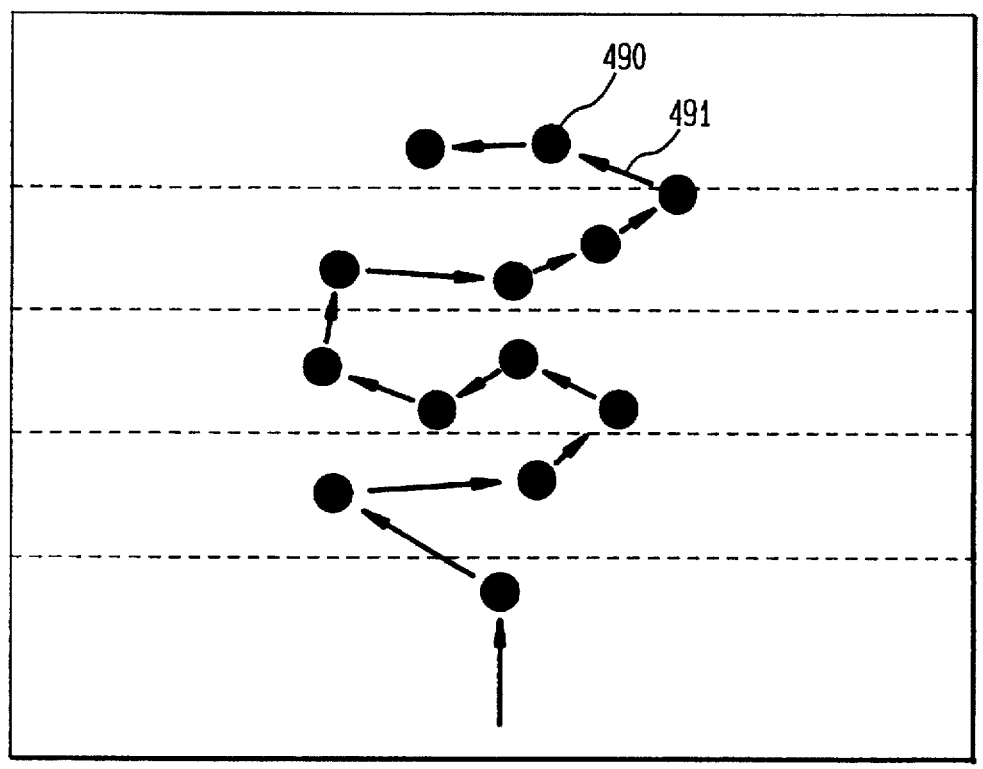
FIG. 49 shows the sorting of points in a GCCL in accordance with the present invention.
Figure 50:
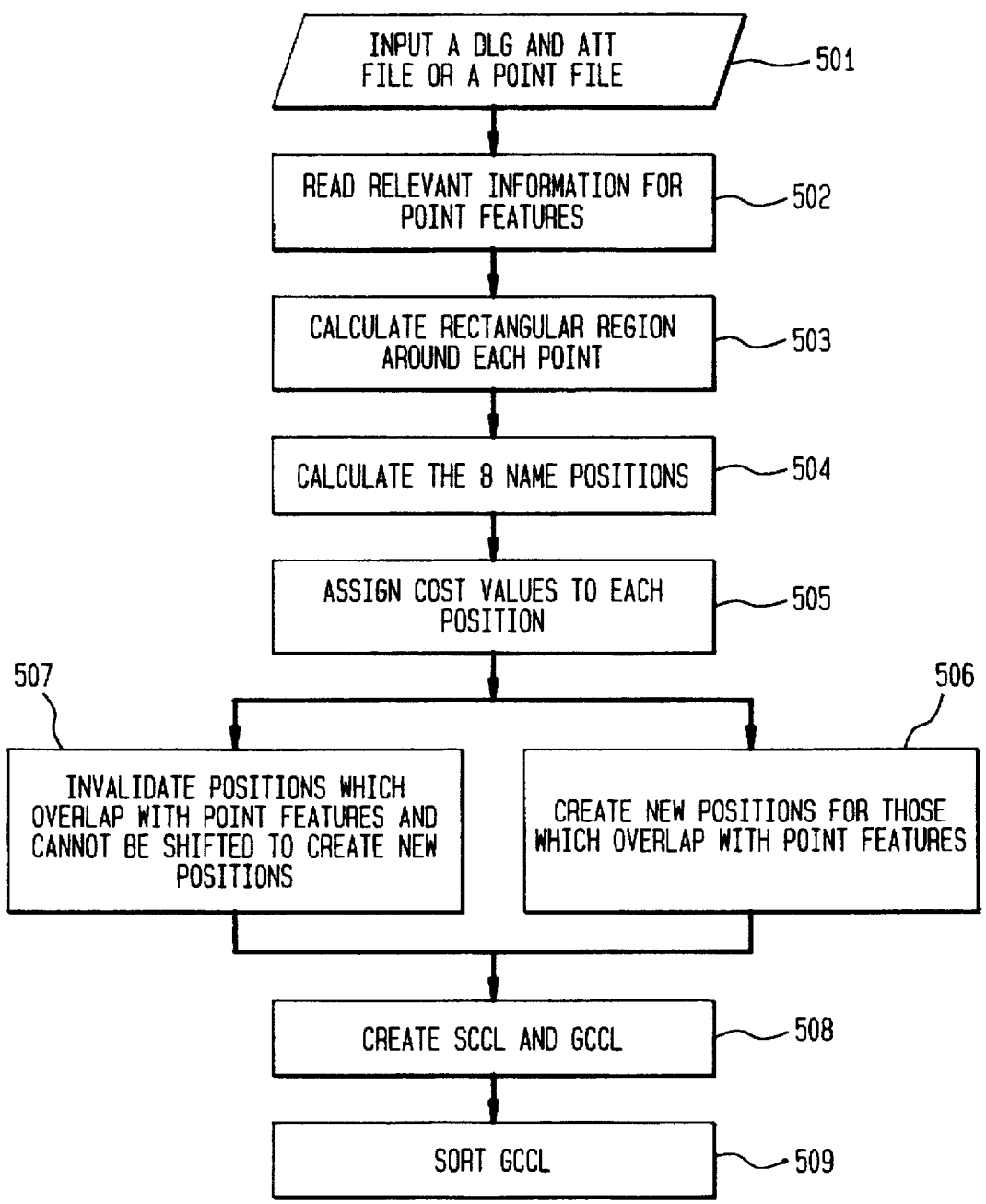
FIG. 50 shows a flow chart the preprocessing routine in accordance with the present invention.

Each GCCL is further divided into subsections which are sorted first with respect to their y coordinate and then with respect to their x coordinate. The sorting of subsections according to the x coordinates is done alternately, where one subsection will be sorted according to ascending x coordinates and the other according to descending x coordinates. Sorting of a GCCL this way helps in reading points that have overlapping rectangular region, one after the other from the list. Thus, if a name cannot be placed anywhere near its point, the previously placed name is repositioned, which frees some space, and the former name has more space. An example of GCCL sorting is shown in FIG. 49. Here the direction of the arrows 491 shows the sorting of a small number of points 490. A flow chart for the complete Preprocessing stage is shown in FIG. 50.

First, in step 501, a DLG and ATT file or POINT file in inputted into the computer and relevant information for the point features is read in step 502. Next, the rectangular region around each point is calculated at step 503 and the 8 name positions are calculated in step 504. Next, at step 505, cost values are assigned to each position. At step 507, positions which overlap with point features and cannot be shifted to create new positions are invalidated, while at step 506, new positions for those which overlap with point features are created. Next, SCCLs and GCCL are created and in step 509 the GCCL is sorted.

The main objective of the name placement stage of the present invention is to place rectangular regions (representing horizontal and curved name placements) near their respective points in such a way that they create a prominent relation with the point and do not overlap any other rectangular region. There are two kinds of rectangular regions that are preferably used: horizontal rectangular regions for names with horizontal orientation, and pairs of oblique rectangular regions for names with angular orientation. There are four vertices (or corners) defining a horizontal rectangular region. However, only two vertices-the lower-left (0,y0) coordinate and the upper-right (x1,y1) coordinate are stored. This information is enough to reconstruct the rectangular region, because these coordinates can be interchanged to form lower-right (x1,y0) and upper-left (x0,y1) coordinates. Overlap between two rectangular regions is found in the following way. First, determine whether any y coordinate of rectangular region 1 falls within the y bounds of rectangular region 2. Next, if any of the x coordinates of rectangular region 1 is within the x bounds of rectangular region 2, then an overlap or intersect is detected.

Figure 48:
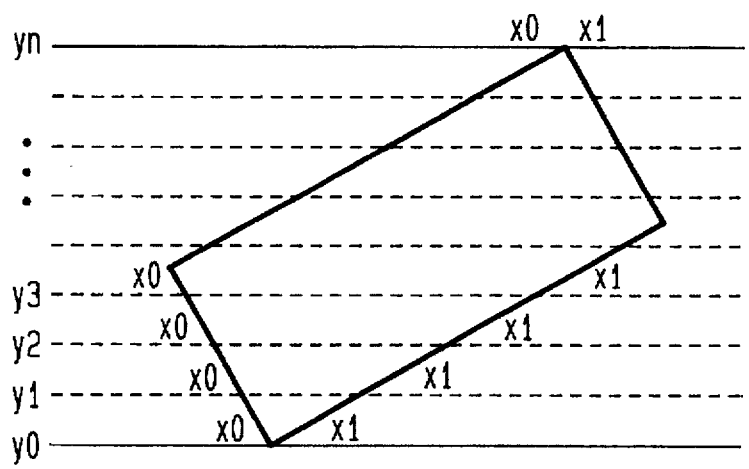
FIG. 48 shows the raterization of an oblique rectangle.

This procedure is used to find overlaps between points and horizontally placed names or between any two horizontally placed names. Oblique rectangular regions are defined in the form of a "raster". Rasterization is a process of determining each pixel value within a geometrical figure, as shown in FIG. 48. For all the y coordinates falling within an oblique rectangular region, the x extents are calculated. To find an overlap between two oblique regions or between an oblique and a horizontal rectangular region, the following steps are executed. First, the regions under consideration are rasterized. Next, check for a common y coordinate, and if found, check for a common x coordinate. If a common x coordinate is found, the regions overlap. If there is no common y coordinate, or common x coordinate, the regions do not overlap. An example of rasterization can be seen in FIG. 48. Here, the y0, y1 ... yn represent the y coordinates, and the x0, x1 at each line represent the x extents for each y coordinate.

Preferably, the software which implements the present invention maintains three lists throughout its operation, including an ancestor list, a state list and an angular list. The fields stored in the ancestor list are: (1) index of a point-feature, (2) angle of orientation for the associated name, (3) position at which the name is placed, and (4) coordinates of the rectangular region for that position. This list consists of the point features with successful name placement and is updated after every name placement.

A successful name placement for a point-feature may overlap with the rectangular regions of positions of other point-features (whose names have not yet been placed) which are found in its SCCL. Every time a name is placed, any position of a neighboring point which may have been destroyed due to overlap is reconstructed by sliding the rectangular region of that position away from the overlap. This either creates a new rectangular region with a new cost value, or invalidates the position by assigning to it a cost of –99. For each name placement, we calculate the above information and store it in the state list. The number of state lists is equal to the number of successful placements. They act as a quick look-up table, showing the positions available for the name placement of point features whose names have not yet been placed.

The angular list consists of data pertaining to those point-features whose names are placed on a curve. At the end of name placement for all the points in a GCCL, the angular list is updated with the following information: (1) index of the point-feature, (2) angle of curvature for its associated name, (3) position at which the name is placed, and (4) coordinates of the rectangular regions for that position.

Figure 51:
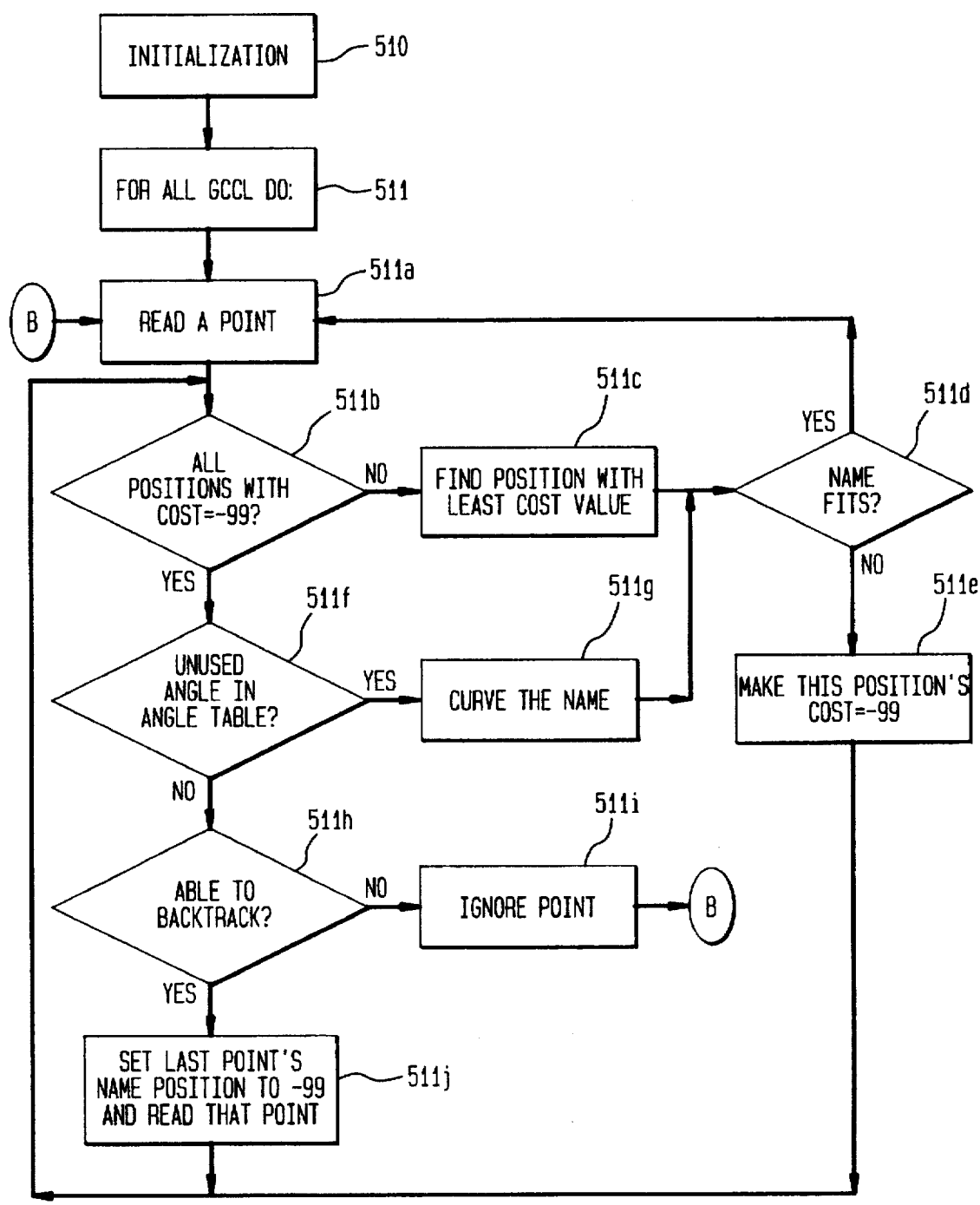
FIG. 51 shows a flow chart for the steps used for point feature labeling in accordance with the present invention.

Referring to FIG. 51, after initialization at step 510, name placement for each GCCL starts with the first point in the first GCCL at step 511. This is the lower-most and left-most point on the map. For each GCCL, the following steps are then executed:

(1) Read a point at step 511a and select its horizontal position with the least cost value at step 511c (greater than –99).

(2) At step 511d, check whether the position overlaps with:
  (a) names of the point features in the same GCCL that have already been placed and are also in its SCCL, and
  (b) names entered in the angular list from a previously considered GCCL.

(3) If any of the above is true, make the cost value of this position –99 at step 511e and select another position with the least cost value (greater than –99).

(4) If a successful placement is found, place the point and the position in the "ancestor list." Find its effect on placement positions of neighboring points and create its "state list."

(5) If the cost values of all the positions are –99, then try to fit the name on a curve at step 511g. For all the angles in the angle table, repeat steps (2) through (4) above until a successful placement is found or until all angles in the angle table have been exhausted (step 511f).

(6) If a successful placement is found, place the coordinates of the point feature, its name and its angle of curvature in the ancestor list.

(7) If all its positions have cost=–99 (unsuccessful horizontal placement) and its name cannot fit at any curvature (unsuccessful curved name placement), redo name placement for the last entry in the ancestor list. Delete its state list and the last entry in the ancestor list, and make its position invalid by changing its cost value to –99 at step 511j.

(8) In case of futile name placement for a point feature, the program backtracks (step 511h) up to "n" previous successfully labeled points in the ancestor list, or up to the first point in ancestor list (whichever comes first), to search for a good pattern of name placements. For the high point-feature density maps created here, the value of "n" was set to 2.

(9) If a name cannot be placed near its point neither horizontally nor obliquely, even after backtracking, make it an ignore point at step 511i; it is then ignored throughout the program. It is not included in any of the list, and is deleted from the map entirely.

(10) Once the names of all the points of a GCCL have been placed, update the angular list.

(11) Once all points are placed, read the ancestor list and create the output files.

The final maps can be viewed on a computer terminal and can be plotted using MAPGEN, a public domain software package used for map plotting. To use MAPGEN, the output files, known as site list files, are created in GRASS (Geographic Resources Analysis Support System) format, and are then exported to MAPGEN. MAPGEN requires a separate site list file for each font size and each curvature angle. Hence the maximum number of site list files created by the program is: number of fonts * number of angles.

Figure 52:
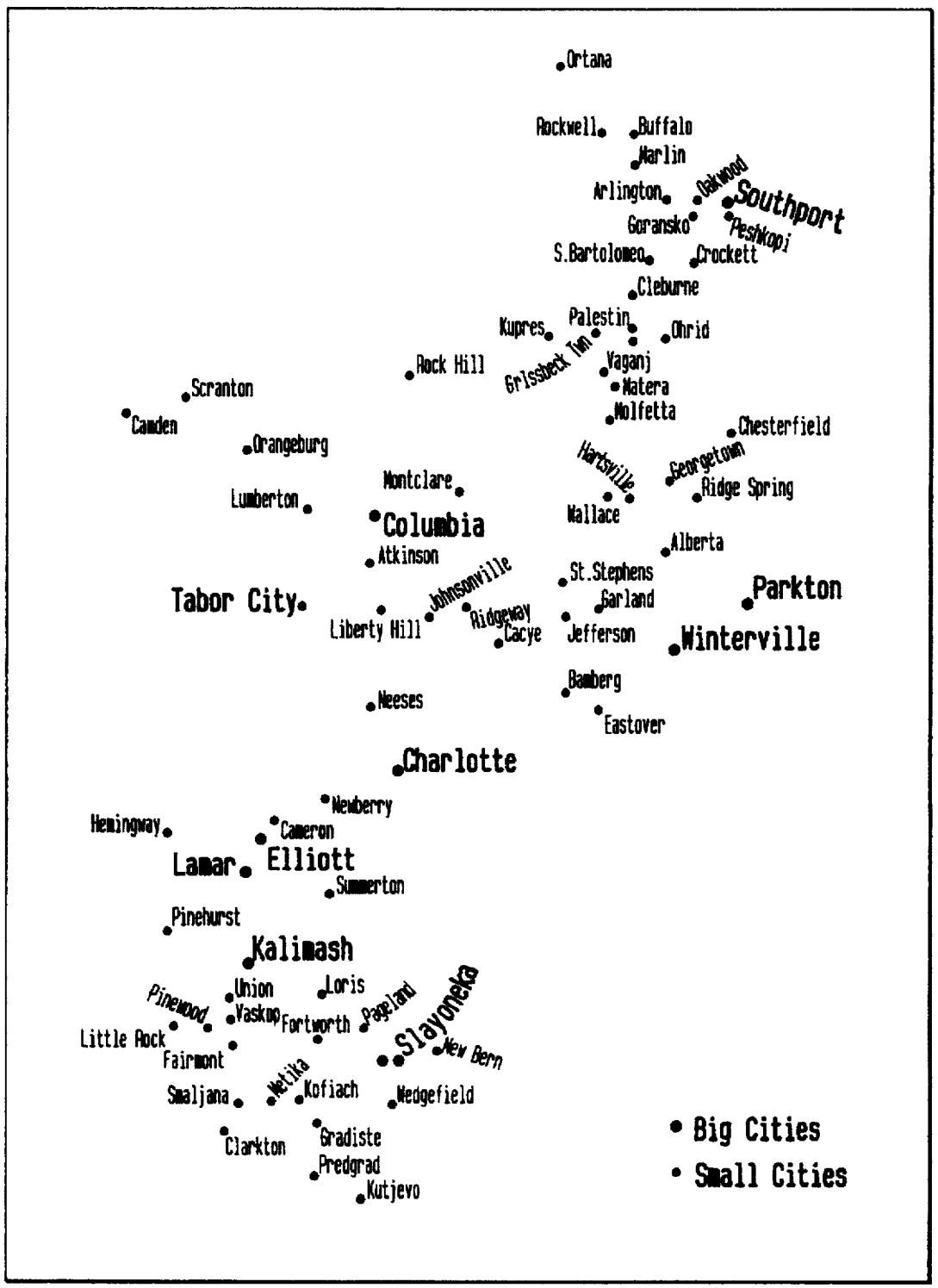
FIG. 52 shows a map with horizontal and curved name placement.

The advantages of curved name placement can be seen in FIG. 52. Curved name placement permits a higher density of point features and enhances the aesthetic quality of a map.

Usually, names of coastal point features are curved, but, if an inland point feature's name cannot fit horizontally, it may be curved as well. If point features are located close to each other, using curved name placement may enhance the association between a point feature and its name, thereby reducing ambiguous name placement.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the claims below.

What is claimed is:

1. A computer-implemented method of automatically labeling a map in accordance with predefined label positioning and placement criteria, the map including a plurality of regions encompassing points within said region and bounded by region boundary points to be labeled with corresponding labels in accordance with said label positioning and placement criteria, said method comprising the steps of:

(a) entering into the computer (i) map data including region data for said plurality of regions to be labeled and (ii) label data including said corresponding label for each of said plurality of regions;

(b) performing a first approximate label positioning step for each of said regions by analyzing said input data with the computer, computing a skeleton graph for each of said regions, said skeleton graph having a contour defined by one or more points within said region which are midway between opposing said boundary points of said region, and determining at least one approximate label position proximate said skeleton graph for each of said regions satisfying said label positioning criteria; and (c) performing a second final label placement step for each said determined approximate label position without regard to said skeleton graph by (i) selecting at least one label test location in the vicinity of said approximate label position, (ii) testing whether the label placed at the selected label test location satisfies said label placement criteria, selecting said label test location as said final label position if said label placement criteria are satisfied and the label at said final label position in a predetermined position and orientation independent of said contour of said skeleton graph, and (iii) repeating said selecting and testing steps with a different said label test location until said label placement criteria are satisfied if possible.

2. A method as claimed in claim 1, wherein testing step of said label placement step includes the step of creating a primary placement window centered about said recommended label position point, said test locations being disposed within said primary placement window, and said step of testing said label test locations is conducted in an increasingly outwardly spiraling fashion within said primary placement window beginning from said recommended label position.

3. A method as claimed in claim 1, further including the step of determining one or more possible angular label orientations for each said label in accordance with said label placement criteria and repeating said step of testing in a predetermined order with one or more of said angular label orientations at said different said label test locations until said label placement criteria are satisfied if possible.

4. A method as claimed in claim 1, further including the step of generating output data containing said final label position of each said label.

5. A method as claimed in claim 4, wherein said output data is inputted into a map plotting program and each said label is plotted on the map at its corresponding said final label position.

6. The method as claimed in claim 1, wherein said first approximate label positioning step performed for each said region further includes the steps of:

(a) computing a distance transform for said region by incorporating for each of said points within said region a height which is a measure of the distance from a given point to the nearest region boundary point;

(b) combining said distance transform and said skeleton to generate a skeleton graph comprising a set of vertices between each pair of mutually adjacent ones of said vertices and edges defining one or more paths, each of said paths consisting of one or more said edges and having a corresponding path length;

(c) computing a shortest path for each pair of said vertices, said shortest path comprising a sequence of said edges connecting said vertices such that the path length of said shortest path is less than the path length of any other possible paths between said vertices;

(d) determining a total weight of each said shortest path from said path length and said height of said points along said selected shortest path and choosing a best path corresponding to said shortest path with the largest said total weight;

(e) computing at least one unweighted location on said best path based only said path length;

(f) testing one or more of said points included in said best path and determining a suitability value for each said tested point providing a measure of how desirable the point is for placing the label; and (g) selecting a weighted location corresponding to each unweighted location selected on the basis of said suitability value as well as proximity to previously placed labels so as to satisfy said label positioning criteria.

7. A method as claimed in claim 6, wherein said suitability value is a function of distance from the desired label position to such point and a function of height of such point, wherein height is a measure of the distance from such point to the nearest region boundary point.

8. A method as claimed in claim 6, wherein said unweighted positions for each said region are determined by the steps of:

(a) calculating the number of labels required for said region;

(b) calculating a separation distance $u_{sep}$ between said labels;

(c) calculating the displacement $u_{sep}$ of the first and last labels from the beginning and end of said path; and (d) choosing said unweighted positions in accordance with the formula:

$$u_j = u_{disp} + j * u_{sep}$$

wherein $u_j$ is the distance of the unweighted location j from the beginning of the path.

9. A computer-implemented method of automatically placing a label on a map comprising the steps of:

(a) providing map data defining at least one region encompassing a plurality of points within said region and bounded by region boundary points, said region having a skeleton graph having a contour defined by one or more said points within said region which are midway between opposing said boundary points of said region;

(b) providing data defining one or more desired label positions within the region;

(c) selecting a best label position corresponding to each desired label position by calculating a suitability value for one or more of said points within said region adjacent to the desired label position so that said suitability value is a function of distance from the desired label position to such point and a function of height of such point, wherein height is a measure of the distance from such point to the nearest region boundary point; and (d) placing the label at a recommended label location at said best label position on the map in an orientation and position independent of said contour of said skeleton graph of said region.

10. A computer-implemented method of automatically positioning labels on a map in accordance with predefined label positioning criteria, said method comprising the steps of:

(a) providing to the computer (i) map data defining at least one region encompassing a plurality of points within said region and bounded by region boundary points and (ii) label data including said corresponding label for each said region;

(b) computing a skeleton graph for said region having a contour defined by one or more said points within said region which are midway between opposing said boundary points of said region;

(c) combining said distance transform and said skeleton to generate a skeleton graph comprising a set of vertices between each pair of mutually adjacent ones of said vertices and edges defining one or more paths, each of said paths consisting of one or more said edges and having a corresponding path length;

(d) computing a shortest path for each pair of said vertices, said shortest path comprising a sequence of said edges connecting said vertices such that the path length of said shortest path is less than the path length of any other possible paths between said vertices;

(e) determining a total weight of each said shortest path from said path length and said height of said points along said selected shortest path and choosing a best path corresponding to said shortest path with the largest said total weight;

(f) computing at least one unweighted location on said best path based only said path length;

(g) testing one or more of said points included in said best path and determining a suitability value for each said tested point providing a measure of how desirable the point is for placing the label;

(h) selecting a weighted location corresponding to each unweighted location selected on the basis of said suitability value as well as proximity to previously placed labels so as to satisfy said label positioning criteria; and (i) placing the label at said selected weighted location on the map in an orientation and position independent of said contour of said skeleton graph of said region.

11. A computer system for automatically labeling a map in accordance with predefined label positioning and placement criteria, the map including a plurality of regions encompassing points within said region and bounded by region boundary points to be labeled with a corresponding label in accordance with said label positioning and placement criteria, said system comprising:

(a) input means for inputting map data including region data for said plurality of regions to be labeled and label data including said corresponding label for each of said plurality of regions;

(b) first memory means for storing said map data and said region data;

(c) processor means responsive to a control program for generating digital signals corresponding to approximate label positions for each of said regions satisfying said label positioning criteria and digital signals denoting final label positions for each of said locations satisfying said label placement criteria, said processor means being adapted to:

compute a skeleton graph for each of said regions having a contour defined by one or more points within said region which are midway between opposing said boundary points of said region, analyze said map data and said region data to determine said approximate label positions located proximate to said skeleton graph for each of said regions, select at least one label test location in the vicinity of said approximate label position and test whether the label placed at the selected label test location in a predetermined position and orientation independent of said contour of said skeleton graph and satisfies said label placement criteria, generate said digital signals corresponding to said final label position if said label placement criteria are satisfied, and repeat selecting and testing said approximate label positions with a different said label test location until said label placement criteria are satisfied if possible; and (d) second memory means for storing said digital signals corresponding to said final label position of each said label.

12. A computer system as claimed in claim 11, further comprising display means for displaying a graphic image of said map data together with a graphic image generated from said digital signals corresponding to said final label positions of each said label.

* * * * *

UNITED STATES PATENT AND TRADEMARK OFFICE
CERTIFICATE OF CORRECTION

PATENT NO. : 5,684,940

DATED : November 4, 1997

INVENTOR(S) : Freeman et al.

Page 1 of 3

It is certified that error appears in the above-identified patent and that said Letters Patent is hereby corrected as shown below:

On the cover page after [73], "States" should read --States--.

Column 2, line 46 "system" should read --systems--.

Column 4, line 62, "only path" should read --only on path--.

Column 5, line 33, "include" should read --includes--.

Column 6, line 1, "on map" should read --on the map--.

Column 6, line 32, "satisfied if" should read --satisfied, if--.

Column 7, line 52 "satisfied if" should read --satisfied, if--.

Column 8, line 6, "of present" should read --of the present--.

Column 9, line 16, "procedure present" should read --procedure of the present--.

Column 9, line 51, "chart the" should read --chart of the--.

Column 11, line 4, "such" should read --such,--.

Column 11, line 32, "coveting" should read --covering--.

Column 13, line 31, "pan" should read --part--.

Column 13, line 38, "form" should read --from--.

Column 15, line 57, "reference. which is" should read --reference, is--.

Column 16, line 43, "Consist" should read --consist --.

Column 17, line 12, "may" should read --array--.

Column 17, line 30, "an" should read --art--.

Column 21, line 22, "expanded our search" should read --expanded--.

Column 23, line 12, "task" should read --tasks--.

Column 24, line 1, "positing" should read --positioning--.

Column 26, line 59, "steps the" should read --steps that are--.

UNITED STATES PATENT AND TRADEMARK OFFICE
CERTIFICATE OF CORRECTION

PATENT NO. : 5,684,940

DATED : November 4, 1997

INVENTOR(S) : Freeman et al.

It is certified that error appears in the above-identified patent and that said Letters Patent is hereby corrected as shown below:

Column 27, line 10, "the-highest" should read --the highest--.

Column 29, line 1, "an" should read --and--.

Column 29, line 5, "is to refine process" should read --is to--.

Column 29, line 6, "is to refine" should read --refine--.

Column 29, line 10, "is selected as the "ideal point"" should read --the "ideal point" is selected--.

Column 30, line 7, "itself" should read --itself.--.

Column 30, line 10, "placement The" should read --placement. The--.

Column 30, line 14, "other." should read --other.)--

Column 30, line 41, "oft" should read --of a--.

Column 31, line 13, "appear not" should read --appear not to--.

Column 32, line 58, "$_8$" should read --$_s$--.

Column 32, line 60, "$_8$" should read --$_s$--.

Column 33, line 9, "fit it" should read --fit--.

Column 33, line 15, "mount" should read --amount--.

Column 33, line 67, "fight" should read --right--.

Column 34, line 53, "file in" should read --file is--.

Column 35, line 8, "(0.y0)" should read --(x0,y0)--.

Column 37, line 46, "and the" should read --and placing the--.

Column 38, line 33, "only said" should read --only on said--.

UNITED STATES PATENT AND TRADEMARK OFFICE
CERTIFICATE OF CORRECTION

PATENT NO. : 5,684,940

DATED : November 4, 1997

INVENTOR(S) : Freeman et al.

It is certified that error appears in the above-identified patent and that said Letters Patent is hereby corrected as shown below:

Column 38, line 55, "$u_{sep}$" should read --$u_{disp}$--.

Column 39, line 52, "only said" should read --only on said--.

Column 40, line 38, "orientation" should read --orientation is--.

Signed and Sealed this

Thirty-first Day of March, 1998

BRUCE LEHMAN

*Attest:*

*Attesting Officer*    *Commissioner of Patents and Trademarks*